US011323048B2

(12) United States Patent
Kwon et al.

(10) Patent No.: US 11,323,048 B2
(45) Date of Patent: May 3, 2022

(54) DEVICE FOR DRIVING A PLURALITY OF MOTORS AND ELECTRIC APPARATUS INCLUDING THE SAME

(71) Applicant: LG ELECTRONICS INC., Seoul (KR)

(72) Inventors: Sunku Kwon, Seoul (KR); Chaseung Jun, Seoul (KR); Jaehoon Jeong, Seoul (KR); Sehwa Choe, Seoul (KR); Wookjin Lee, Daejeon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/087,789

(22) Filed: Nov. 3, 2020

(65) Prior Publication Data

US 2021/0135606 A1 May 6, 2021

(30) Foreign Application Priority Data

Nov. 4, 2019 (KR) .................. 10-2019-0139602

(51) Int. Cl.
*H02P 1/54* (2006.01)
*H02P 5/505* (2016.01)

(52) U.S. Cl.
CPC .................... *H02P 5/505* (2016.02)

(58) Field of Classification Search
CPC .... H02P 5/505; H02P 5/00; H02P 5/46; H02P 5/74

See application file for complete search history.

(56) References Cited

U.S. PATENT DOCUMENTS

2008/0084171 A1* 4/2008 Leehey ............... G05B 19/414
318/34

FOREIGN PATENT DOCUMENTS

| DE | 10342049 A1 | 5/2005 |
| EP | 2908425 A2 | 8/2015 |
| KR | 10-2017-0087271 A | 7/2017 |

OTHER PUBLICATIONS

European Search Report dated Feb. 22, 2021, for European Patent Application No. 20205589.3, 7 pages.

* cited by examiner

*Primary Examiner* — Karen Masih
(74) *Attorney, Agent, or Firm* — Birch, Stewart, Kolasch & Birch, LLP

(57) ABSTRACT

A device for driving a plurality of motors and an electric apparatus includes a first and a second capacitor, an inverter connected to a DC terminal, a multi-phase motor connected to the inverter, a single-phase motor serially connected with the multi-phase motor, and a controller configured to control the inverter. For starting the single phase motor during operation of the multi-phase motor, the controller is configured to perform, during an alignment period, an alignment of a rotor of the single-phase motor and perform, during a voltage compensation period, a voltage compensation for compensating a voltage change of a DC terminal neutral point between the first capacitor and the second capacitor based on the alignment of the rotor of the single-phase motor.

20 Claims, 62 Drawing Sheets

(a)

(b)

(a)

(b)

(a)

(b)

DEVICE FOR DRIVING A PLURALITY OF MOTORS AND ELECTRIC APPARATUS INCLUDING THE SAME

BACKGROUND

1. Field

The present disclosure relates to a device for driving a plurality of motors and an electric apparatus having the same, and to a device for driving a plurality of motors capable of stably starting a single-phase motor while reducing the rotational torque ripple of the multi-phase motor during operation of multi-phase motor, and an electric apparatus having the same.

Meanwhile, the present disclosure relates to a device for driving a plurality of motors capable of compensating a voltage change when starting a single-phase motor during operation of a multi-phase motor, and an electric apparatus having the same.

Meanwhile, the present disclosure relates to a device for driving a plurality of motors capable of driving a plurality of motors serially connected with each other at a different speed, by using a single inverter, and an electric apparatus having the same.

Meanwhile, the present disclosure relates to a device for driving a plurality of motors capable of stably driving a plurality of motors, while preventing the reduction of the voltage utilization of an inverter by using a single inverter, and an electric apparatus having the same.

Meanwhile, the present disclosure relates to a device for driving a plurality of motors capable of driving only any one of a plurality of motors serially connected with each other by using a single inverter, and an electric apparatus having the same.

2. Description of the Related Art

A motor driving device is a device for driving a motor having a rotor that rotates and a stator wound around with a coil.

In recent years, in electric apparatuses, the use of motor is increasing, and in particular, a plurality of motors are employed to perform respective operations.

In order to drive a plurality of motors, when an inverter that supplies AC power to each of the motors, and a processor or microcomputer that controls the inverter are used, due to an increase in the number of inverters or an increase in the number of processors or microcomputers, an efficient structural design of an electric apparatus is difficult, and the manufacturing cost increases.

Meanwhile, for driving a plurality of motors, "IEEE Transactions on Industrial Electronics, vol. 62, no. 10, pp. 6096-6107, 2015 (hereinafter, a prior document 1)" discloses a method of driving a plurality of three-phase motors by using a common inverter.

However, according to the prior document 1, since the same current flows through a plurality of three-phase motors, the plurality of three-phase motors rotate at the same speed. Accordingly, it is impossible to drive the motors at different speeds.

Meanwhile, for driving a plurality of motors, Korean Patent Application No. 10-2018-0025167 (hereinafter, a prior document 2) discloses that a plurality of motors are driven by using a single inverter, while a relay for switching is provided between the inverter and any a single motor.

According to the prior document 2, when the relay is turned on, a plurality of motors are driven in the same direction at the same speed by the same current, and when the relay is turned off, the plurality of motors are rotated in different directions at the same speed. Accordingly, it is impossible to drive motors at different speeds, when a plurality of motors are operated.

Meanwhile, Korean Patent Publication No. 10-2017-0087271 (hereinafter, a prior document 3) discloses that, for driving a plurality of motors, a plurality of motors are connected in parallel by using a single inverter.

However, according to the prior document 3, since a plurality of motors are connected in parallel, and the current output from a single inverter is distributed to each motor, the voltage utilization of the inverter decreases to almost half, and voltage imbalance may occur in between the plurality of capacitors disposed in a DC terminal. According to the imbalance, the driving efficiency of the motor may be reduced due to current harmonics, torque pulsation of the motor, speed pulsation of the motor, or noise increase, or the like. In addition, it is difficult to simultaneously drive a plurality of motors at different speeds.

Meanwhile, according to the prior art document 3, when a single-phase motor is started during operation of a three-phase motor among a plurality of motors, a single inverter is used. Therefore, the torque ripple of the three-phase motor becomes large and a DC terminal becomes unstable.

SUMMARY

The present disclosure has been made in view of the above problems, and provides a device for driving a plurality of motors capable of stably starting a single-phase motor while reducing rotational torque ripple of the multi-phase motor during operation of multi-phase motor, and an electric apparatus having the same.

The present disclosure further provides a device for driving a plurality of motors capable of compensating a voltage change when starting a single-phase motor during operation of a multi-phase motor, and an electric apparatus having the same.

The present disclosure further provides a device for driving a plurality of motors capable of driving a plurality of motors serially connected with each other at different speeds by using a single inverter, and an electric apparatus having the same.

The present disclosure further provides a motor driving device which can stably drive a plurality of motors while preventing a reduction in voltage utilization of inverter by using a single inverter, and an electric apparatus having the same.

The present disclosure further provides a device for driving a plurality of motors capable of driving only any one of a plurality of motors serially connected with each other by using a single inverter, and an electric apparatus having the same.

A device for driving a plurality of motors and an electric apparatus having the same according to an embodiment of present disclosure include a first capacitor and a second capacitor serially connected to both ends of a DC terminal; an inverter connected to both ends of the DC terminal; a multi-phase motor connected to the inverter; a single-phase motor serially connected with the multi-phase motor, and through which at least a part of current flowing through the multi-phase motor flows; and a controller to control the inverter, wherein, for starting the single phase motor during operation of the multi-phase motor, the controller controls to perform an alignment period for alignment of a rotor of the single-phase motor and a voltage compensation period for compensating a voltage change of a DC terminal neutral point between the first capacitor and the second capacitor based on the alignment of the rotor of the single-phase motor.

Meanwhile, the controller controls, during the alignment period, to turn on all of a plurality of upper arm switching elements of the inverter and controls to turn off all of a plurality of lower arm switching elements of the inverter, and controls, during the voltage compensation period, to decrease a voltage of the DC terminal neutral point.

Meanwhile, the controller controls, during the alignment period, to turn off all of a plurality of upper arm switching elements of the inverter and controls to turn on all of a plurality of lower arm switching elements of the inverter, and controls, during the voltage compensation period, to increase a voltage of the DC terminal neutral point.

Meanwhile, the controller changes the voltage compensation period or changes a voltage change an amount of voltage change according to the voltage compensation, based on an amount of voltage change of the DC terminal neutral point between the first capacitor and the second capacitor during the alignment period.

Meanwhile, the controller controls to increase the voltage compensation period, or controls to increase the voltage change amount of voltage change according to the voltage compensation, as the amount of voltage change of the DC terminal neutral point during the alignment period increases.

Meanwhile, when a voltage of the DC terminal neutral point increases during the alignment period, the controller controls to decrease the voltage of the DC terminal neutral point during the voltage compensation period.

Meanwhile, the controller controls to sequentially perform the voltage compensation period and the alignment period, when the voltage of the DC terminal neutral point is within a first range based on a first level during a pre-alignment constant voltage period before the alignment period, and controls to increase a speed of the single-phase motor, when the voltage of the DC terminal neutral point is within the first range based on the first level during a post-alignment constant voltage period after the alignment period.

Meanwhile, the controller controls to sequentially perform the alignment period and the voltage compensation period, when the voltage of the DC terminal neutral point is within a first range based on a first level during a pre-alignment constant voltage period before the alignment period, and controls to increase a speed of the single-phase motor, when the voltage of the DC terminal neutral point is within the first range based on the first level during a post-alignment constant voltage period after the alignment period.

Meanwhile, the controller controls to turn on all of a plurality of upper arm switching elements of the inverter, controls to turn off all of a plurality of lower arm switching elements of the inverter, during the alignment period, and controls to decrease the voltage of the DC terminal neutral point during the voltage compensation period.

Meanwhile, the controller controls to increase the voltage of the DC terminal neutral point during the voltage compensation period, when the voltage of the DC terminal neutral point decreases during the alignment period.

Meanwhile, the controller controls to sequentially perform the voltage compensation period and the alignment period, when the voltage of the DC terminal neutral point is within a first range based on a first level during a pre-alignment constant voltage period before the alignment period, and controls to increase a speed of the single-phase motor, when the voltage of the DC terminal neutral point is within the first range based on the first level during a post-alignment constant voltage period after the alignment period.

Meanwhile, the controller controls to sequentially perform the alignment period and the voltage compensation period, when the voltage of the DC terminal neutral point is within a first range based on a first level during a pre-alignment constant voltage period before the alignment period, and controls to increase a speed of the single-phase motor, when the voltage of the DC terminal neutral point is within the first range based on the first level during a post-alignment constant voltage period after the alignment period.

Meanwhile, the controller controls to turn on all of a plurality of lower arm switching elements of the inverter, controls to turn off all of a plurality of upper arm switching elements of the inverter, during the alignment period, and controls to increase the voltage of the DC terminal neutral point, during the voltage compensation period.

Meanwhile, the controller performs an unbalancing control to change a voltage of the DC terminal neutral point between the first capacitor and the second capacitor, for starting the single phase motor, during operation of the multi-phase motor, and after the unbalancing control, aligns a rotor of the single-phase motor.

Meanwhile, it is preferable that the alignment period is greater than or equal to a switching period of the inverter.

Meanwhile, the number of frequency of current input to the multi-phase motor when the single-phase motor and the multi-phase motor are driven at a different speed is greater than the number of frequency of current input to the multi-phase motor when the single-phase motor and the multi-phase motor are driven at the same speed.

Meanwhile, a neutral point of the multi-phase motor is connected to one end of the single phase motor, and the other end of the single-phase motor is connected to a node between the first capacitor and the second capacitor.

Meanwhile, a device for driving a plurality of motors and an electric apparatus having the same according to an embodiment of present disclosure may further include a first voltage detector for detecting a DC voltage of both ends of a first capacitor, a second voltage detector for detecting a DC voltage of both ends of the second capacitor, a first current detector for detecting a first current input to the multi-phase motor, and a second current detector for detecting a second current input to the single-phase motor Meanwhile, the controller controls a frequency of current input to the multi-phase motor to be one, when the single-phase motor and the multi-phase motor are driven at the same speed, and controls a frequency of current input to the multi-phase motor to be two or more, when the single-phase motor and the multi-phase motor are driven at a different speed.

Meanwhile, the controller controls an electric potential between a motor neutral point of the multi-phase motor, and the DC terminal neutral point between the first capacitor and the second capacitor to be the same, when only the multi-phase motor is driven.

Meanwhile, the controller controls the inverter to perform a zero vector switching, and controls an electric potential between a motor neutral point of the multi-phase motor, and the DC terminal neutral point between the first capacitor and the second capacitor to be different, when only the single-phase motor is driven.

A device for driving a plurality of motors and an electric apparatus having the same according to another embodiment of present disclosure include a first capacitor and a second capacitor serially connected to both ends of a DC terminal; an inverter connected to both ends of the DC terminal; a multi-phase motor connected to the inverter; a single-phase motor serially connected with the multi-phase motor, and through which at least a part of current flowing through the multi-phase motor flows; and a controller to control the inverter, wherein, for starting the single phase motor during operation of the multi-phase motor, the controller controls to perform an unbalancing control to change a voltage of a DC terminal neutral point between the first capacitor and the second capacitor, and after the unbalancing control, aligns a rotor of the single-phase motor.

Meanwhile, when the voltage of the DC terminal neutral point increases during the rotor alignment period of the single-phase motor, the controller controls to decrease the voltage of the DC terminal neutral point, during the unbalancing control period, and controls to increase the voltage of the DC terminal neutral point, during the unbalancing control period, when the voltage of the DC terminal neutral point decreases, during the rotor alignment period of the single-phase motor.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
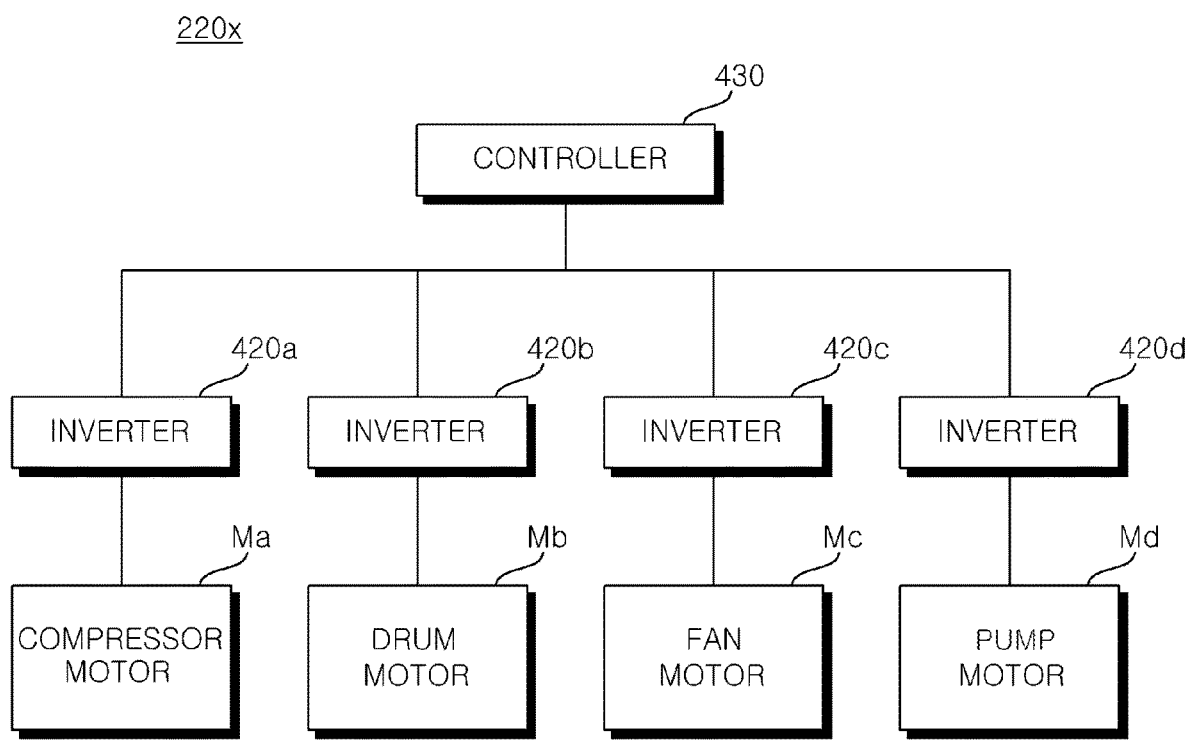
FIG. 1 is an example of a device for driving a plurality of motors.

FIG. 1 is an example of a device for driving a plurality of motors.

Referring to the drawing, a device 220x for driving a plurality of motors may include a single controller 430, a plurality of inverters 420a to 420d, and a plurality of motors Ma to Md.

Each of the inverters 420a to 420d can individually drive each of the motors Ma to Md.

However, in this case, since the inverters require corresponding motors respectively, in some sense, there is unnecessary cost in terms of manufacturing cost. Accordingly, there is a need for a method of stably driving each motor while reducing the number of inverters rather than the number of motors.

FIGS. 2A to 4D are diagrams showing various motor driving devices.

Figure 2A:
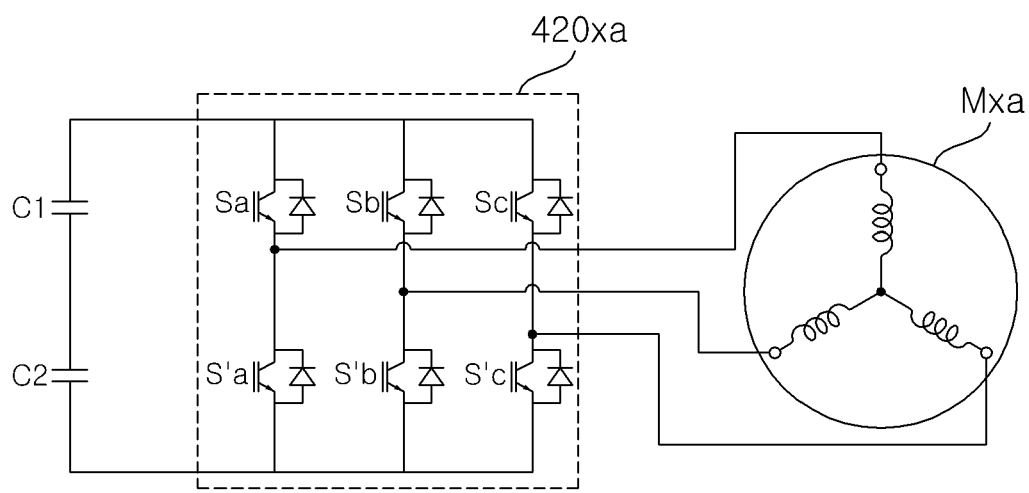
FIGS. 2A to 4F are diagrams showing various motor driving devices.

First, FIG. 2A illustrates a motor driving device 220xa including a three-phase motor Mxa and an inverter 420xa for driving the three-phase motor Mxa. At this time, the inverter 420xa may include six switching elements.

Figure 2B:
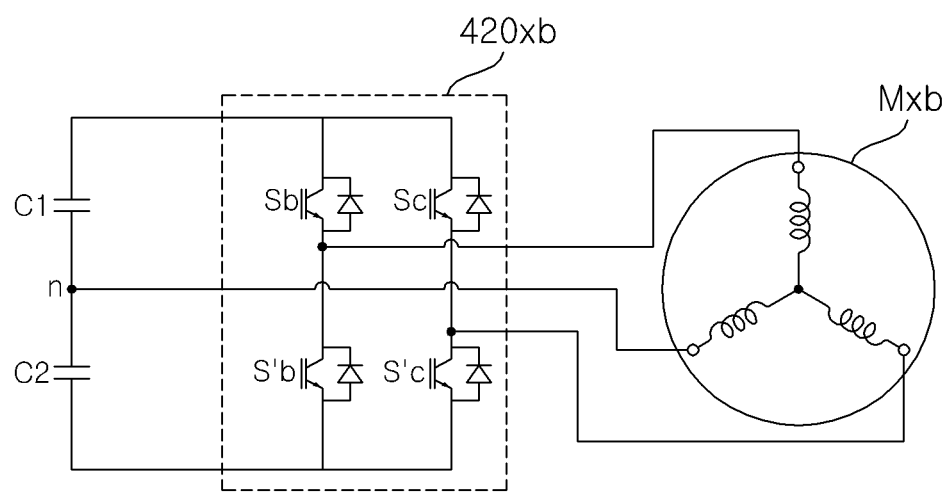

Next, FIG. 2B illustrates a motor driving device 220xb including a three-phase motor Mxb, and an inverter 420xb for driving the three-phase motor Mxb. In this case, the inverter 420xb may include four switching elements to reduce manufacturing cost.

Meanwhile, since the inverter 420xb has four switching elements, two phases of the three-phase motor Mxb are connected to the inverter 420xb, but the remaining one phase is connected to a n-node that is a node between a plurality of DC terminal capacitors C1 and C2.

The voltage synthesized by the inverter 420xb for driving the motor is reduced to half the level of the inverter 420xa of FIG. 2A.

In addition, due to the current flowing through the n node which is a DC terminal neutral point, the voltage of the plurality of DC terminal capacitors C1 and C2 may be changed. Due to a difference in voltage between the DC terminal capacitors C1 and C2, a difference between a command voltage and the actually generated voltage may occur, and the output voltage of the inverter 420xb may be distorted. In addition, more harmonics may flow in the motor phase current due to the distortion of the output voltage from the inverter 420xb.

Figure 2C:
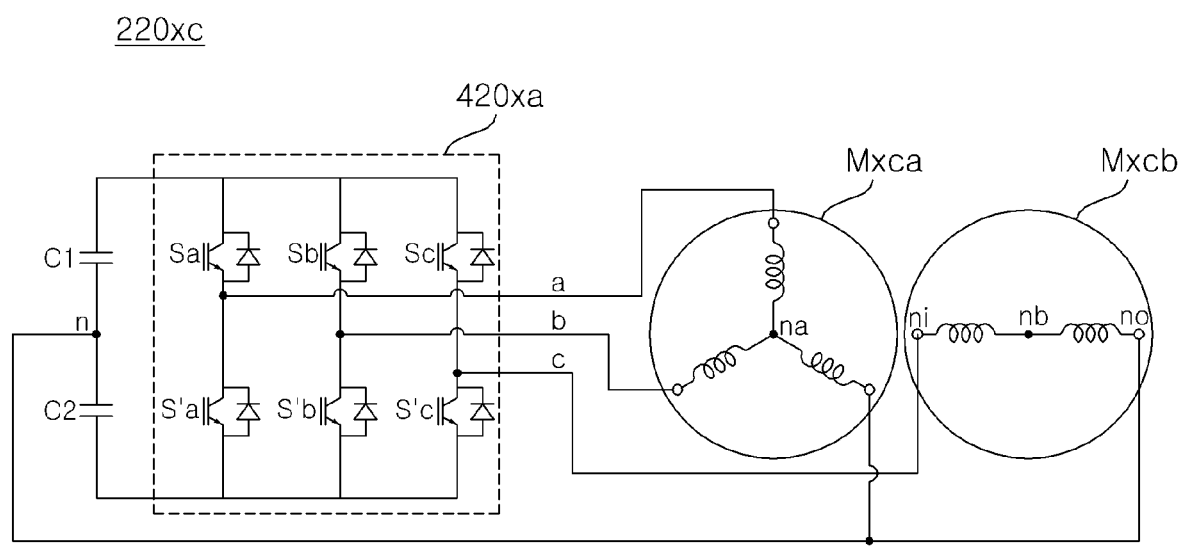

FIG. 2C illustrates a motor driving device 220xc that has the three-phase motor Mxca and the single-phase motor Mxcb which are connected in parallel to each other and includes a single inverter 420xc.

Referring to the drawing, the three-phase motor Mxca and the single-phase motor Mxcb are connected in parallel with each other to the inverter 420xc.

Specifically, a node and b node of the inverter 420xc are connected to a-phase coil and b-phase coil of the three-phase motor Mxca, and the c-phase coil is connected to the n-node that is a DC terminal neutral point.

Meanwhile, the na node, which is a motor neutral point of the three-phase motor Mxca, is not electrically connected to an external node separately.

Further, the input terminal of the single-phase motor Mxcb is connected to the c node of the inverter 420xc, and the output terminal of the single-phase motor Mxcb is connected to the n node which is the DC terminal neutral point.

Similarly to FIG. 2B, the three-phase motor Mxca of FIG. 2C is driven by four switching elements Sa, S'a, Sb, and S'b among the six switching elements of the inverter 420xc, and the single-phase motor Mxcb is driven by the remaining two switching elements Sc and S'c.

That is, two legs (Sa and S'a, Sb and S'b) among three legs (Sa and S'a, Sb and S'b, Sc and S'c) in the inverter 420xc are used for a three-phase motor Mxca, and one leg (Sc and S'c) is used for a single phase motor (Mxcb).

According to this method, since both the three-phase motor Mxca and the single-phase motor Mxcb are driven by some of the six switching elements of the inverter 420xc, the voltage utilization of the inverter 420xc is lowered to about half.

In addition, since the current flowing through the single-phase motor Mxcb flows to the n node which is the DC terminal neutral point, the voltage imbalance of the DC terminal capacitors C1 and C2 is intensified.

Meanwhile, when performing a control for suppressing such voltage imbalance, the inverter 420xc must perform a complementary control, and, consequently, the three-phase motor Mxca and the single-phase motor Mxcb cannot be operated independently.

Figure 3A:
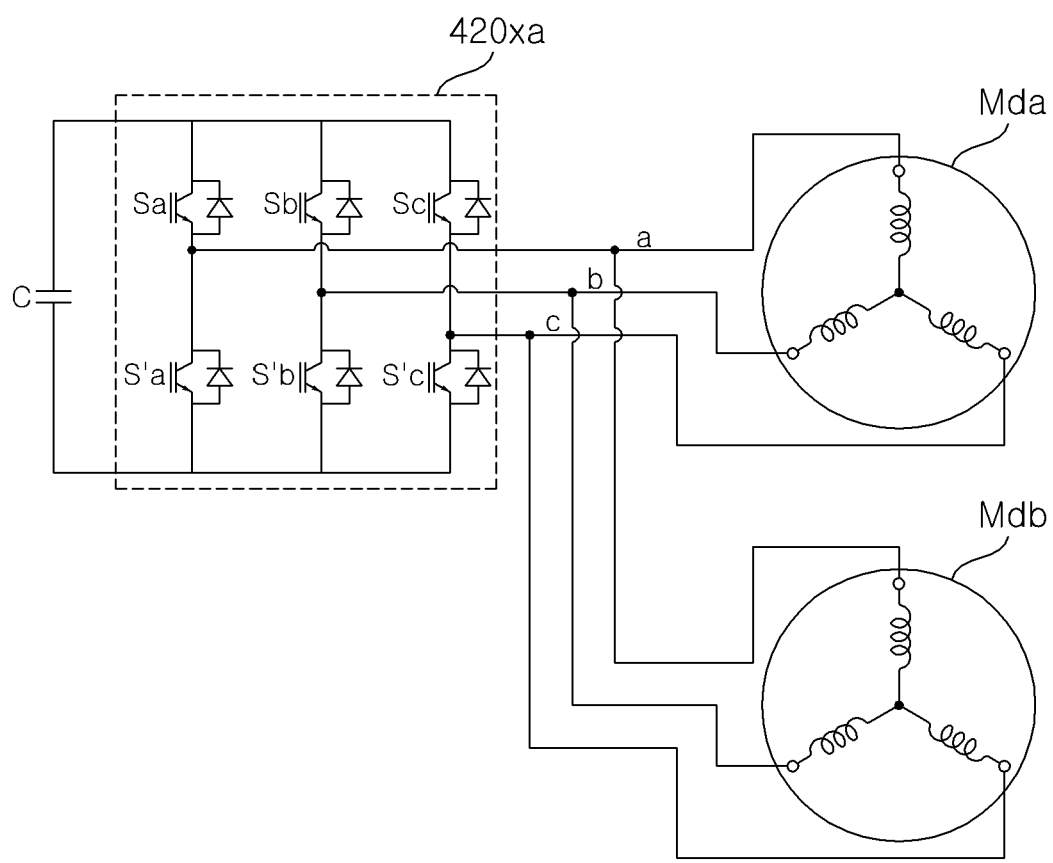

FIG. 3A illustrates a motor driving device 220xd having three-phase motors Mda and Mdb connected in parallel with each other to a single inverter 420xa.

According to this method, two three-phase motors Mda and Mdb have to operate at the same speed.

Figure 3B:
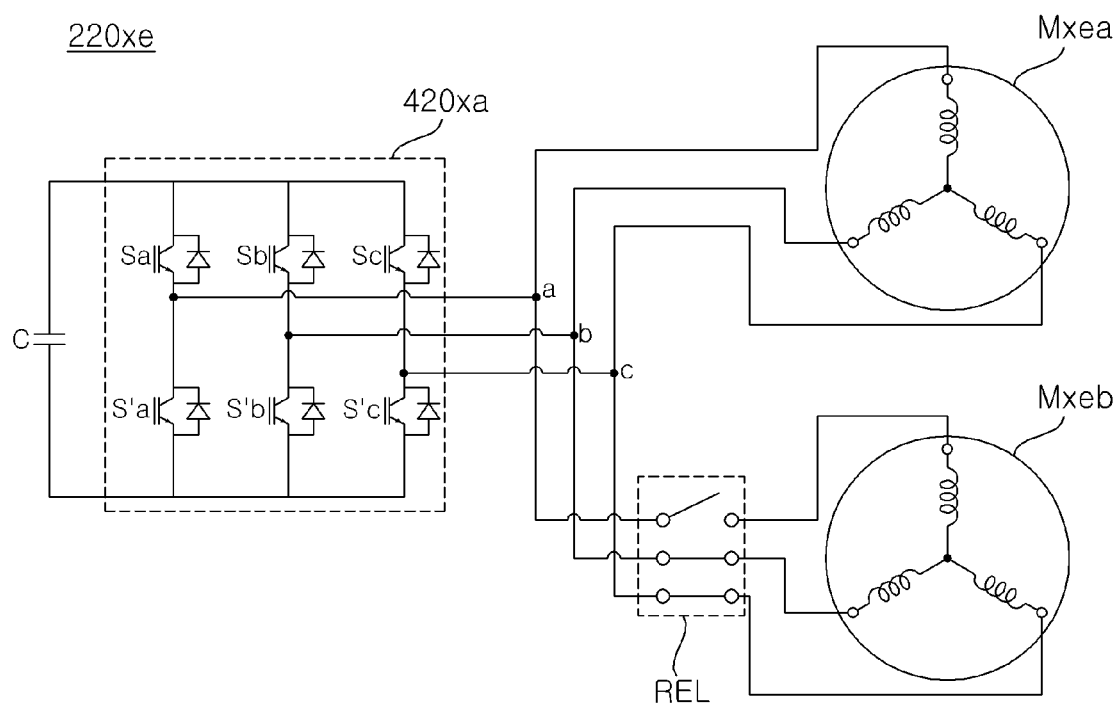

FIG. 3B illustrates a three-phase motor Mxea and Mxeb connected in parallel to each other to a single inverter 420xa, and a motor driving device 220xc having a relay REL that performs switching between the inverter 420xa and one motor Mxebb.

According to this method, when the relay REL is turned off, only one motor Mxea of the two three-phase motors Mxea and Mxeb is operated, and when the relay REL is turned on, two three-phase motors Mxea and Mxeb are operated at the same speed.

Meanwhile, according to this method, the three-phase motor Mxeb to which the relay is connected, among the two three-phase motors Mxea and Mxeb, cannot operate alone. In addition, the voltage utilization of the inverter 420xa is halved.

Figure 3C:
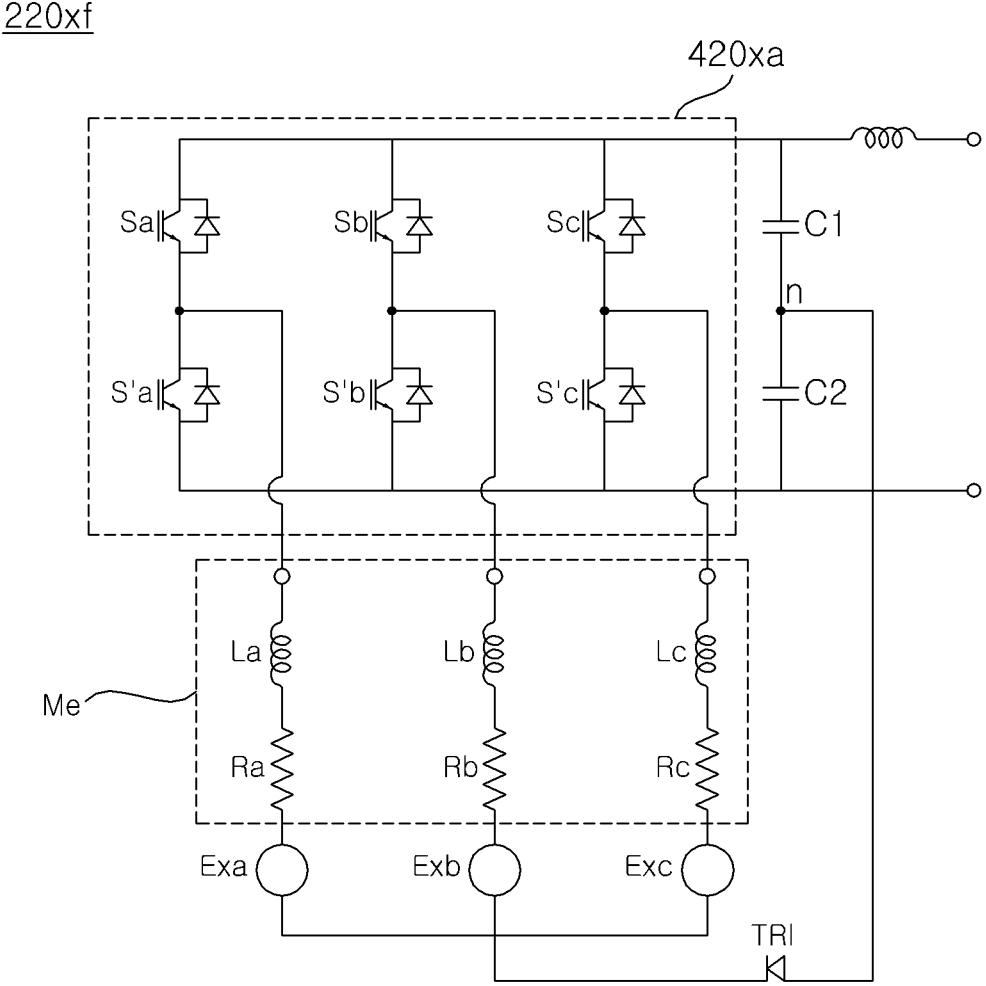

FIG. 3C illustrates a motor driving device 220xf having an inverter 420xa and a three-phase four-wire motor Me.

Generally, since the three-phase four-wire motor Me is driven in the same manner as the three-phase three-wire motor described above, no current flows through a winding connected to the neutral point n of the motor Me.

Therefore, the three phase windings of the motor are respectively connected to three legs of the inverter 420xa, similarly to the three phase three wire motor.

Meanwhile, the neutral point of the motor Me may be connected to the n-node which is the DC terminal neutral point, and TRIAC may be disposed as shown in the drawing in order to block current from flowing to the neutral point of the motor Me. Meanwhile, in addition to TRIAC, it is also possible to replace with another switch element or relay.

However, if an open accident occurs in a single phase of the phase windings of the motor Me, an element (such as TRIAC) connected to the neutral point of the motor may be conducted to form a new current path.

At this time, in a state where no current flows through the open winding, when an element (such as TRIAC) that blocks the neutral point current of the motor is conducted, current flows through the neutral point of the motor in place of the open phase. When a neutral point is used due to the open accident, the voltage utilization is lowered.

Figure 4A:
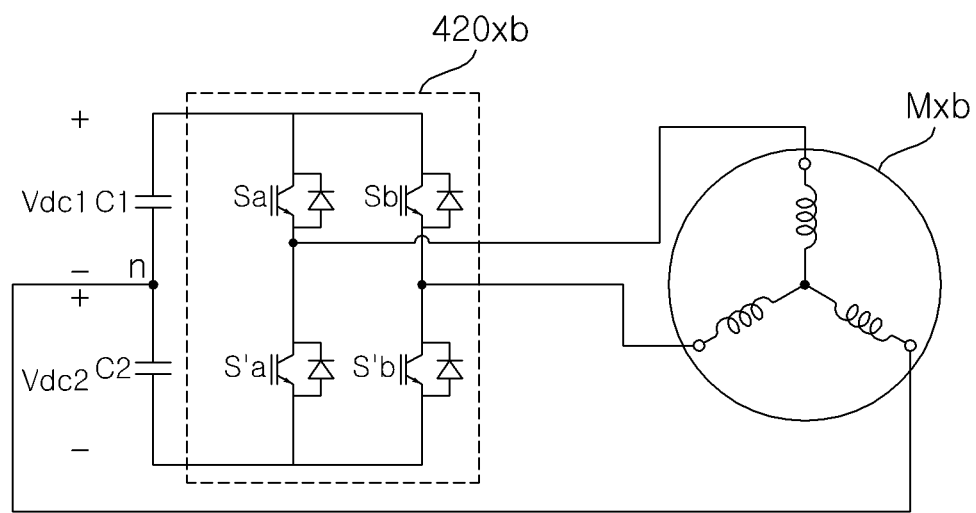

Next, as shown in FIG. 2B, FIG. 4A illustrates a motor driving device 220xb including a three-phase motor Mxb and an inverter 420xb for driving the three-phase motor Mxb. In this case, the inverter 420xb may include four switching elements to reduce manufacturing cost.

Figure 4B:
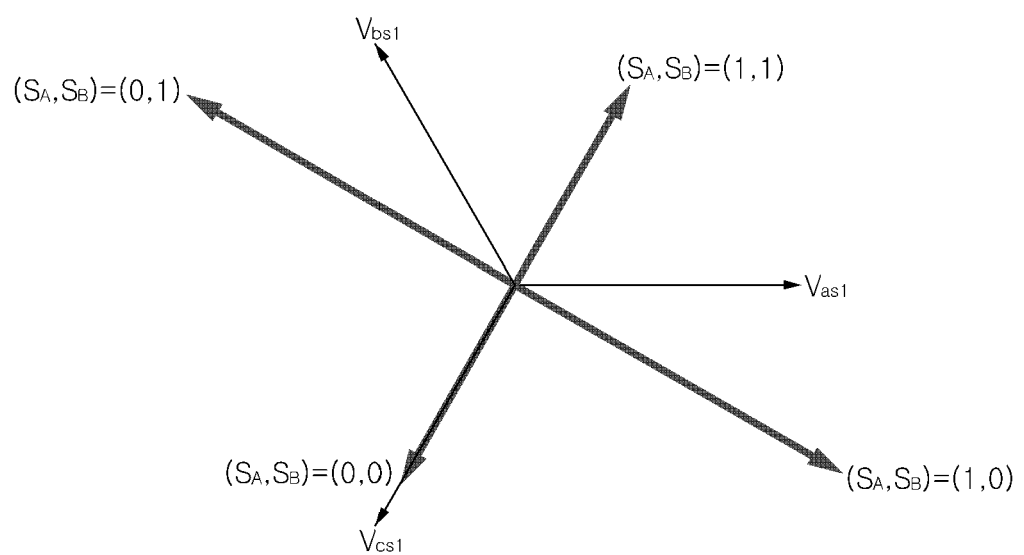

Meanwhile, FIG. 4B is a diagram showing a voltage vector synthesis for driving the three-phase motor Mxb of FIG. 4A.

Referring to the drawing, in the switch states of (0,0) and (1,1), there is a problem in that the voltage synthesized to the motor Mxb becomes half of the (1,0) and (0,1) switching states.

Figure 4C:
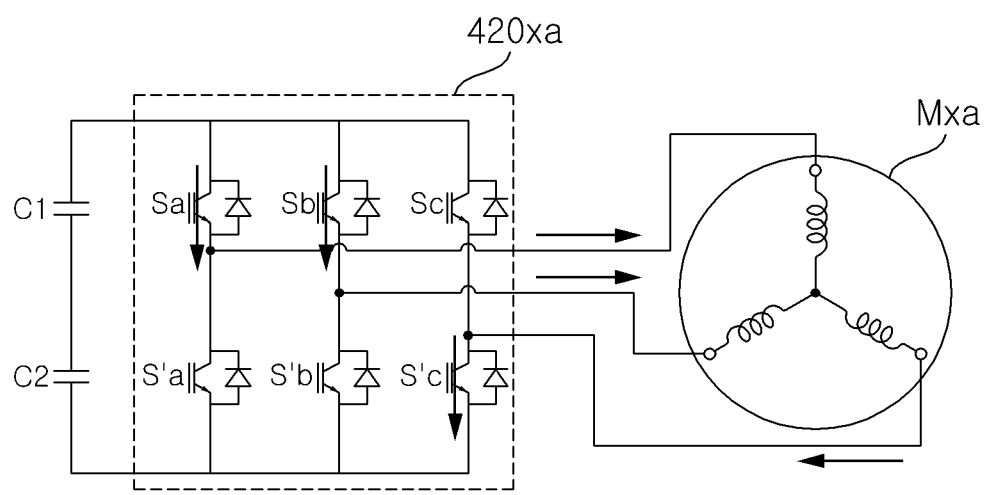

Meanwhile, as shown in FIG. 2A, FIG. 4C illustrates a motor driving device 220xa including a three-phase motor Mxa and an inverter 420xa for driving the three-phase motor Mxa. At this time, the inverter 420xa may include six switching elements.

Figure 4D:
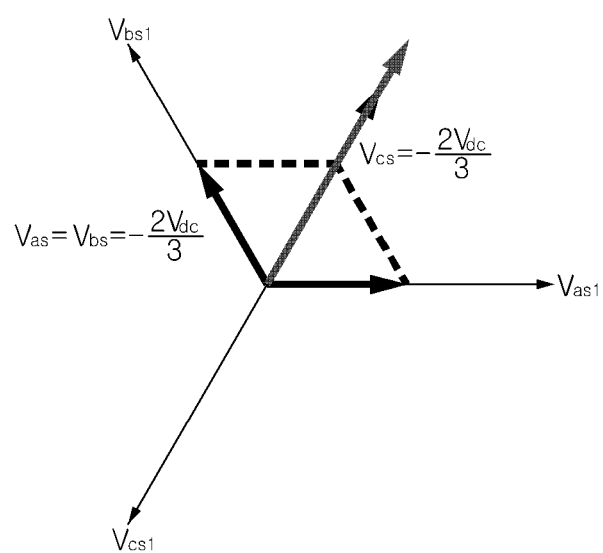

Meanwhile, FIG. 4D is a diagram illustrating voltage vector synthesis for driving the three-phase motor Mxa of FIG. 4C. In the drawing, voltage vector synthesis by the voltage vector of (1 1 0) is illustrated.

Meanwhile, since it is reduced to the minimum voltage synthesized by the inverter 420xb of FIG. 4A, there is a problem in that the voltage utilization of the inverter 420xb of FIG. 4A is approximately halved in comparison with the inverter 420xa of FIG. 4C.

Meanwhile, in a state where the voltage Vdc1 of both ends of a first capacitor C1 and the voltage Vdc2 of both ends of a second capacitor C2 are balanced as Vdc/2, the total DC voltage becomes Vdc, and the maximum voltage of one phase that the switching vector of the inverter 420xb synthesizes in the (1,1) state is Vdc/3.

Meanwhile, the maximum voltage of one phase synthesized in the (1,1,0) state of the inverter 420xa in FIG. 4C corresponding to the state in which the switching vector of the inverter 420xb in FIG. 4A is (1,1) is 2*Vdc/3.

Figure 4E:
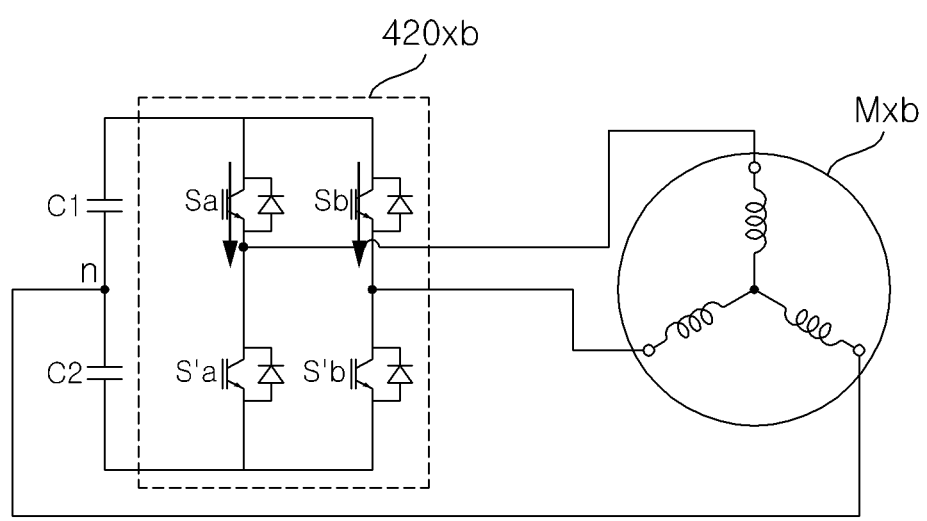

Meanwhile, FIG. 4E illustrates that switching by the switching vector of (1, 1) is performed in the motor driving device 220xb of FIG. 4A.

Figure 4F:
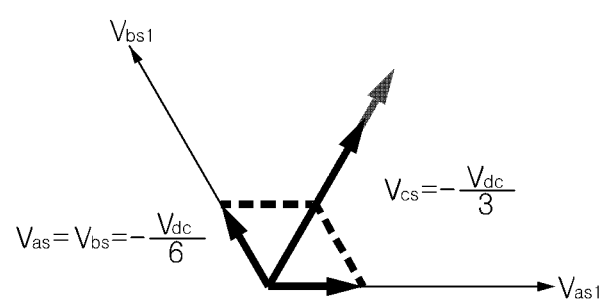

Meanwhile, FIG. 4F is a diagram showing the voltage vector synthesis of the switching vector of (1, 1) of FIG. 4E.

When the voltages of the upper and lower capacitors C1 and C2 of the inverter 420xb are unbalanced, the maximum voltage of one phase that the inverter 420xb synthesizes becomes the smaller voltage among Vdc1/3 at (1,1) and Vdc2/3 at (0,0).

Meanwhile, according to FIG. 4A or 4E, since the neutral point current always flows, the voltage imbalance of the upper and lower capacitors C1 and C2 inevitably occurs, so that the actual voltage utilization is reduced to a half or less.

Thus, since there constantly exists a problem of lowering the voltage utilization, the voltage utilization of the inverter 420xb decreases even when the single-phase motor Mxb is not driven by the inverter 420xb.

Hereinafter, a device for driving a plurality of motors according to an embodiment of the present disclosure to solve the disadvantages of FIGS. 2A to 4F is illustrated.

Figure 5:
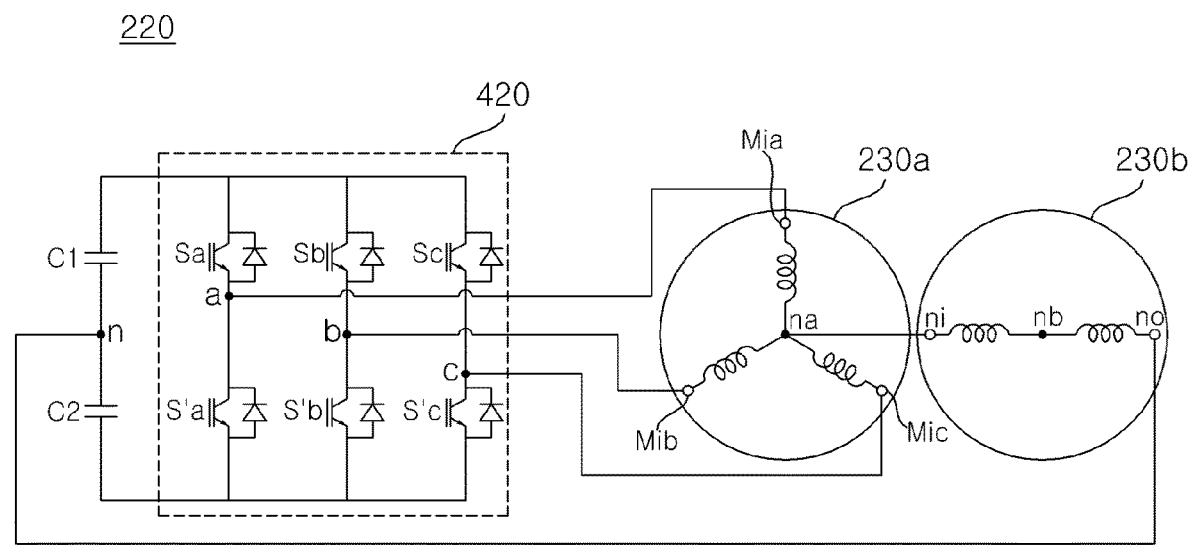
FIG. 5 is an example of an internal circuit diagram of a device for driving a plurality of motors according to an embodiment of the present disclosure.

FIG. 5 is an example of an internal circuit diagram of a device for driving a plurality of motors according to an embodiment of the present disclosure.

Referring to the drawing, a device for driving a plurality of motors 220 according to an embodiment of the present disclosure may include an inverter 420 connected to a DC terminal (x-y terminal), a multi-phase motor 230a connected to the inverter 420, and a single-phase motor 230b serially connected to the multi-phase motor 230a.

Meanwhile, the device for driving a plurality of motors 220 according to the embodiment of the present disclosure may be referred to as a multi-motor driver.

Meanwhile, since the multi-phase motor 230a is connected to the inverter 420, and the single-phase motor 230b is serially connected to the multi-phase motor 230a, finally, the multi-phase motor 230a and the single-phase motor 230b are connected to the inverter 420 in series.

Thus, in the device for driving a plurality of motors 220 according to the embodiment of the present disclosure has high voltage utilization, in comparison with the three-phase motor Mxca and the single-phase motor Mxcb of FIG. 2C.

Meanwhile, by using a single inverter 420, it is possible to significantly reduce the manufacturing cost, in comparison with the case of using a plurality of inverters for driving a plurality of motors.

Meanwhile, the device for driving a plurality of motors 220 according to the embodiment of the present disclosure may further include a first capacitor C1 and a second capacitor C2 serially connected to both ends of the DC terminal (x-y terminal). Accordingly, a DC terminal neutral point (n) may be formed between the first capacitor C1 and the second capacitor C2.

Meanwhile, a node, b node, c node inside the inverter 420 are electrically connected to a-phase coil terminal Mia, b-phase coil terminal Mib, and c-phase coil terminal Mic of the multi-phase motor 230a, respectively.

In addition, the single-phase motor 230b is connected to the multi-phase motor 230a, and a node n between the first capacitor C1 and the second capacitor C2.

Meanwhile, the node between the first capacitor C1 and the second capacitor C2 may be referred to as a DC terminal neutral point (n) or an inverter neutral point n.

That is, the neutral point na of the multi-phase motor 230a is connected to one end ni of the single-phase motor 230b, and the other end no of the single-phase motor 230b is connected to the DC terminal neutral point (n) which is a node between the first capacitor C1 and the second capacitor C2. Meanwhile, with respect to the DC terminal neutral point (n), it is preferable that the capacitances of the first capacitor C1 and the second capacitor C2 are the same.

Meanwhile, the input terminal ni of the single-phase motor 230b is electrically connected to the node na to which each phase of the multi-phase motor 230a is commonly connected, and the output terminal no of the single-phase motor 230b is connected to the DC terminal neutral point (n) which is a node between the first capacitor C1 and the second capacitor C2.

Meanwhile, the node na to which each phase (e.g. three-phase) of the multi-phase motor 230a is commonly connected may be referred to as a motor neutral point na of the multi-phase motor 230a.

Meanwhile, the motor neutral point na of the multi-phase motor 230a may represent a node in which individual phases are bound to a single point.

Meanwhile, the motor neutral point na of the multi-phase motor 230a may represent a node whose current becomes 0 according to a phase difference in a multi-phase AC system.

For example, since the single-phase motor 230b is rotated due to a-phase current when connecting to the a-phase of the multi-phase motor 230a, it operates dependently. Accordingly, it may be difficult to drive at a different speed from the multi-phase motor 230a.

As another example, since the single-phase motor 230b is rotated due to b-phase current when connecting to the b-phase of the multi-phase motor 230a, it operates dependently. Accordingly, it may be difficult to drive at a different speed from the multi-phase motor 230a.

As another example, since the single-phase motor 230b is rotated due to c-phase current when connecting to the c-phase of the multi-phase motor 230a, it operates dependently. Accordingly, it may be difficult to drive at a different speed from the multi-phase motor 230a.

Accordingly, in the present disclosure, the multi-phase motor 230a is connected to one end ni of the single-phase motor 230b, by using the motor neutral point na of the multi-phase motor 230a where the current is zero according to the phase difference in the multi-phase AC system. Accordingly, the single-phase motor 230b can be driven independently of the multi-phase motor 230a.

In addition, in order to prevent the voltage imbalance in the DC terminal, the DC terminal neutral point (n), which is a node between the first capacitor C1 and the second capacitor C2, is electrically connected to the other end no of the single-phase motor 230b. Accordingly, it is possible to reduce the voltage imbalance between the first capacitor C1 and the second capacitor C2.

Thus, a plurality of motors are serially connected with each other, it is possible to stably and independently drive a plurality of motors while reducing voltage imbalance between the first capacitor C1 and the second capacitor C2, and preventing the reduction of voltage utilization of the inverter 420. Meanwhile, in the device for driving a plurality of motors 220 according to an embodiment of the present disclosure, the number of capacitors is increased due to the first capacitor C1 and the second capacitor C2, but a plurality of motors can be driven by using a single inverter. Therefore, due to the reduction in the number of expensive inverters, the manufacturing cost is significantly reduced.

Figure 6:
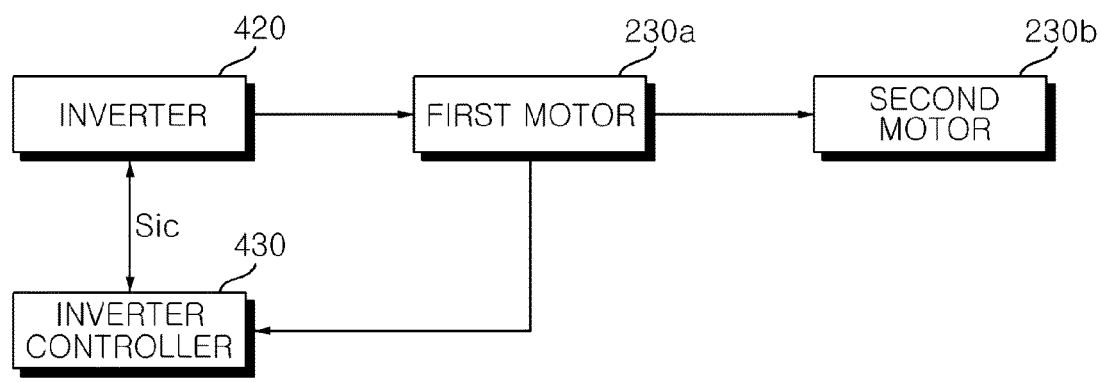
FIG. 6 illustrates an example of an internal block diagram of the device for driving a plurality of motors of FIG. 5.
Figure 7:
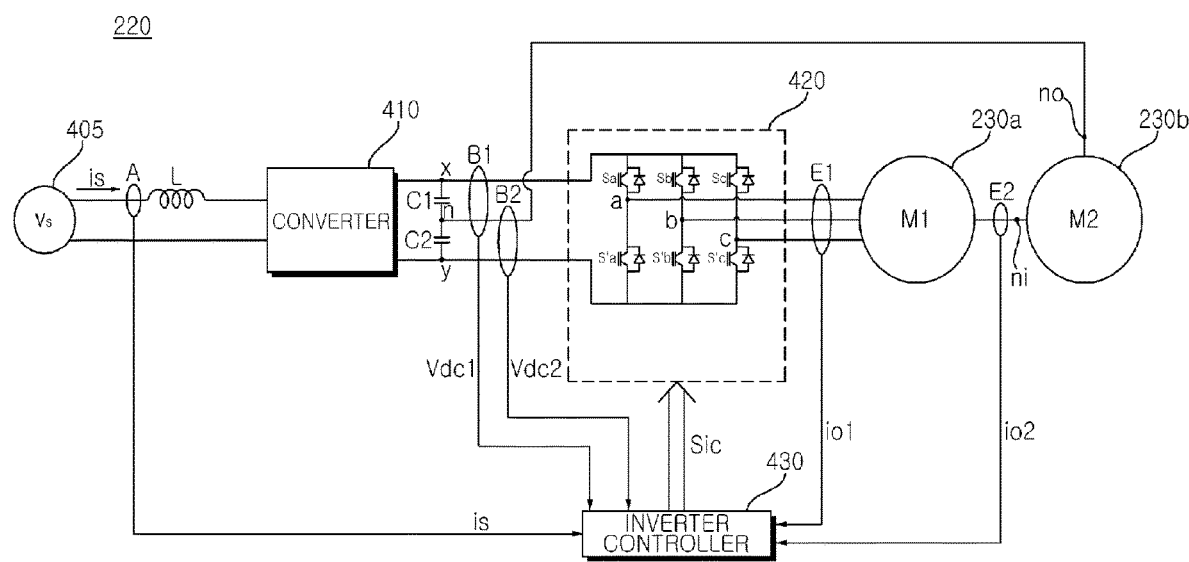
FIG. 7 is a detailed internal circuit diagram of the device for driving a plurality of motors of FIG. 5.

FIG. 6 illustrates an example of an internal block diagram of the device for driving a plurality of motors of FIG. 5, and FIG. 7 is a detailed internal circuit diagram of the device for driving a plurality of motors of FIG. 5.

Referring to the drawing, the device for driving a plurality of motors 220 according to an embodiment of the present disclosure is implemented to drive a plurality of motors, and may include an inverter connected to the DC terminal, a multi-phase motor 230a connected to the inverter 420, a single-phase motor 230b serially connected to the multi-phase motor 230a, and an inverter controller 430 for controlling the inverter 420.

The multi-phase motor 230a may be a three-phase motor, but is not limited thereto, and may be a four-phase motor or more.

Meanwhile, in order to prevent a decrease in voltage utilization of the inverter when driving a plurality of motors using a single inverter 420, the present disclosure suggests a method of connecting a plurality of motors in series rather than connecting in parallel.

In addition, the inverter controller 430 controls such that the current output from one inverter 420 includes at least one frequency so as to accomplish a simultaneous or single driving of the multi-phase motor 230a and the single-phase motor 230b serially connected.

In particular, in order to drive the multi-phase motor 230a and the single-phase motor 230b simultaneously at different speeds, the inverter controller 430 control such that a plurality of frequencies superpose to the current output from one inverter 420, and control such that one frequency is included in the current output from one inverter 420 so as to drive the multi-phase motor 230a and the single phase motor 230b simultaneously at the same speed.

For example, when driving the single-phase motor 230b and the multi-phase motor 230a in the device for driving a plurality of motors 220 at the same speed, it is preferable that the number of frequencies of the current input to the multi-phase motor 230a is smaller than the number of frequencies of current input to the multi-phase motor 230a when driving the single-phase motor 230b and the multi-phase motor 230a at different speeds.

Specifically, the inverter controller 430 according to an embodiment of the present disclosure may control such that when driving the single-phase motor 230b and the multi-phase motor 230a at the same speed, the frequency of the current input to the multi-phase motor 230a is one, and when driving the single-phase motor 230b and the multi-phase motor 230a at different speeds, the frequencies of the current input to the multi-phase motor 230a are two or more.

Accordingly, a plurality of motors serially connected with each other can be driven at different speeds by using a single inverter 420. In addition, it is also possible to drive a plurality of motors serially connected with each other at the same speed by using a single inverter 420. Consequentially, a plurality of motors can be stably driven by using a single inverter 420 while preventing a reduction in the voltage utilization of the inverter 420.

Meanwhile, in order to accomplish sensorless control, the device for driving a plurality of motors 220 may not include a hall sensor, etc., but may include a first current detector E1 for detecting a first current (io1) input to the multi-phase motor 230a, and a second current detector E2 for detecting a second current (io2) input to the single-phase motor 230b.

The first current (io1) and the second current (io2) detected by the first current detector E1 and the second current detector E2, respectively, are input to the inverter controller 430 so as to accomplish sensorless control.

The inverter controller 430 may output a switching control signal Sic for driving the multi-phase motor 230a and the single phase motor 230b, based on the first current (io1) and the second current (io2) respectively detected by the first current detector E1 and the second current detector E2.

Meanwhile, the inverter controller 430 may calculate the potential of the motor neutral point (na), based on the first current io1 detected by the first current detector E1 or the second current io2 detected by the second current detector E2.

Meanwhile, the device for driving a plurality of motors 220 according to an embodiment of the present disclosure may further include a first voltage detector B1 for detecting a DC voltage of both ends of the first capacitor C1, a second voltage detector B2 for detecting a DC voltage of both ends of the second capacitor C2, and a controller 430 for controlling the inverter 420.

Meanwhile, the inverter controller 430 may calculate the potential of the DC terminal neutral point (n), based on a first DC voltage Vdc1 detected by the first voltage detector B1 and a second DC voltage Vdc2 detected by the second voltage detector B2. Accordingly, the inverter controller 430 can make the potential between the motor neutral point na and the DC terminal neutral point (n) to be the same or different.

Meanwhile, unlike FIG. 7, without the voltage detector B1, B2 for measuring the voltage of the first capacitor C1 and the second capacitor C2, the inverter controller 430 can estimate the voltage of the first capacitor C1 and the voltage of the second capacitor C2, as well as the voltage of both ends of the DC terminal.

Meanwhile, the device for driving a plurality of motors 220 according to an embodiment of the present disclosure may further include a converter 410 for outputting a converted DC power to a DC terminal (x-y terminal), an input current detector A, a reactor L, etc.

FIG. 7 illustrates that the power input to the converter 410 is an AC power, but it is not limited thereto, and it is also possible that DC power is applied and the converter 410 performs a DC power level conversion so that the converted DC power can be output.

The reactor L is disposed between a commercial AC power source 405 (vs) and the converter 410 to perform power factor correction or voltage boost. The reactor L may also serve to restrict a harmonic current according to high-speed switching of the converter 410.

The input current detector A may detect input current is that is input from the commercial AC power source 405. To this end, a current transformer (CT) or a shunt resistor may be used as the input current detector A. The detected input current is, which is a discrete signal in the form of a pulse, may be input to the inverter controller 430.

The converter 410 converts the commercial AC power 405 applied via the reactor L into DC power and output the DC power. While the commercial AC power 405 is illustrated as a single-phase AC power, three-phase AC power may be employed as the commercial AC power 405. The internal structure of the converter 410 depends on the type of the commercial AC power source 405.

The converter 410 may be configured by diodes without the switching element. In this case, the converter 410 may perform the rectification operation without performing a separate switching operation.

For example, when the applied power is single-phase AC power, four diodes may be used in the form of a bridge. When the applied power is three-phase AC power, six diodes may be used in the form of a bridge.

As the converter 410, a half-bridge converter formed by connecting, for example, two switching elements and four diodes may be used. When three-phase AC power is employed, six switching elements and six diodes may be used. In this case, the converter 410 may be referred to as a rectifier.

When the converter 410 is provided with switching elements, the converter 410 may perform voltage boost, power factor improvement and DC power conversion according to the switching operation of the switching elements.

The first capacitor C1 and the second capacitor C2, which are DC terminal capacitors, smooth and store the power input from the converter 410.

Meanwhile, since both ends of the DC terminal (x-y terminal) stores the DC power, they may be referred to as a dc link terminal.

The first voltage detector B1 and the second voltage detector B2 respectively detect the DC voltage Vdc1 of both ends of the first capacitor C1 and the DC voltage Vdc2 of both ends of the second capacitor C2.

To this end, the first voltage detector B1 and the second voltage detector B2 may include a resistance element, an amplifier, and the like. The detected first DC voltage Vdc1 and the second DC voltage Vdc2 may be input to the inverter controller 430 as a discrete signal in the form of a pulse.

The inverter 420 includes a plurality of inverter switching elements, and converts the DC power Vdc that is a voltage of both ends of the DC terminal (x-y terminal) by the turn-on/off operation of the switching element to output the converted AC power to the multi-phase motor 230*a* of a certain frequency.

For example, when the multi-phase motor 230*a* is a three-phase motor, the inverter 420 may convert into three-phase AC power (va, vb, vc) and output to the three-phase synchronous motor 230*a*.

Hereinafter, for convenience of description, it is assumed that the multi-phase motor 230*a* is a three-phase motor.

The inverter 420 includes upper switching elements Sa, Sb and Sc and lower switching elements S'a, S'b and S'c. Each of the upper switching elements Sa, Sb, Sc and a corresponding lower switching element S'a, S'b, S'c are serially connected to form a pair. Three pairs of upper and lower switching elements Sa and S'a, Sb and S'b, and Sc and S'c are connected in parallel. Each of the switching elements Sa, S'a, Sb, S'b, Sc and S'c is connected with a diode in an antiparallel manner.

The switching elements in the inverter 420 perform turn-on/off operation of each switching element based on the inverter switching control signal Sic from the inverter controller 430. Thereby, three-phase AC power having various frequencies is output to the three-phase synchronous motor 230*a*.

The inverter controller 430 may control the switching operation of the inverter 420 based on the sensorless method.

To this end, the inverter controller 430 may receive the first current io1 flowing through the multi-phase motor 230*a* from the first current detector E1, and receive the second current io2 input to the single-phase motor 230*b* from the second current detector E2.

The inverter controller 430 outputs a corresponding inverter switching control signal Sic to the inverter 420 in order to control the switching operation of the inverter 420, in particular, to drive the multi-phase motor 230*a* and the single-phase motor 230*b* at the same speed, to drive the multi-phase motor 230*a* and the single-phase motor 230*b* at different speeds, to drive only the multi-phase motor 230*a*, or to drive only the single-phase motor 230*b*.

The inverter switching control signal Sic is a switching control signal of a pulse width modulation (PWM) method, and is generated and output based on the first current io1 and the second current io2. Detailed operation of the output of the inverter switching control signal Sic in the inverter controller 430 will be described later with reference to FIG. 3.

The first current detector E1 may detect the first current io1 flowing between the inverter 420 and the multi-phase motor 230*a*.

The second current detector E2 may detect the second current io2 flowing between the multi-phase motor 230*a* and the single-phase motor 230*b*.

Meanwhile, the first current io1 and the second current io2 detected by the first current detector E1 and the second current detector E2 may be a phase current ia, ib, ic, or id.

The detected first current io1 and the second current io2 may be applied to the inverter controller 430 as a discrete signal in the form of a pulse, and an inverter switching control signal Sic is generated based on the detected first current io1 and second current io2.

Meanwhile, the multi-phase motor 230*a* includes a stator and a rotor, and each phase AC power of a certain frequency is applied to a coil of the stator of each phase (a, b, c phase), so that the rotor rotates. Such a multi-phase motor 230*a* may include, for example, a Surface-Mounted Permanent-Magnet Synchronous Motor (SMPMSM), an Interior Permanent Magnet Synchronous Motor (IPMSM), a Synchronous Reluctance Motor (Synrm), and the like. Among them, SMPMSM and IPMSM are a Permanent Magnet Synchronous Motor (PMSM) to which permanent magnet is applied, and Synrm has no permanent magnet.

The single-phase motor 230*b* includes a stator and a rotor, and each phase AC power of a certain frequency is applied to the coil of the stator of one phase, so that the rotor rotates.

Meanwhile, the inverter controller 430 may control torque, speed, and position of each motor in order to control the multi-phase motor 230*a* and the single-phase motor 230*b*.

Meanwhile, the inverter controller 430 may control torque, speed, and position of each motor not only for driving the multi-phase motor 230*a* and the single-phase motor 230*b* but also for maintaining the non-drive state.

Meanwhile, the stopping of the multi-phase motor 230*a* or the single-phase motor 230*b* may be implemented through zero torque control, zero speed control, and fixed position control.

Meanwhile, the torque control of the three-phase motor and the single-phase motor is based on current control, and in general, a voltage applied to the motor is implemented in a PWM method for current control.

Meanwhile, the inverter controller 430 may include vector control (FOC control), torque control (DTC), MTPA, weak magnetic flux, and the like for current control.

Figure 8:
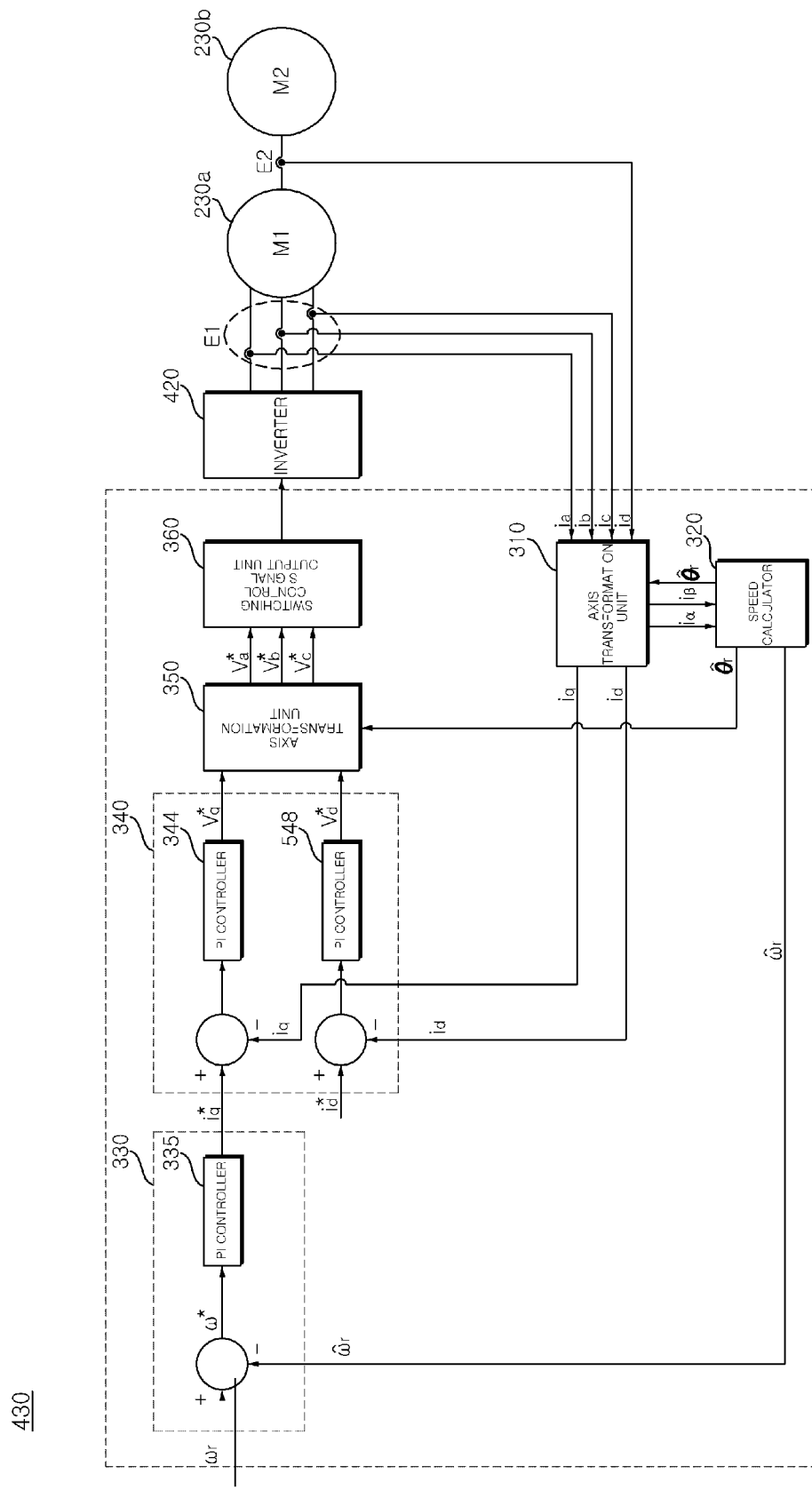
FIG. 8 is an internal block diagram of an inverter controller of FIG. 7.

FIG. 8 is an internal block diagram of an inverter controller of FIG. 7.

Referring to the drawing, the inverter controller 430 may include an axis transformation unit 310, a speed calculator 320, a current command generator 330, a voltage command generator 340, an axis transformation unit 350, and a switching control signal output unit 360.

The axis transformation unit 310 may convert the output current (ia, ib, ic) and the output current (id) detected by the first output current detector E1 and the second output current detector E2 into two phase current (i$\alpha$, i$\beta$) of a stationary coordinate system.

Meanwhile, the axis transformation unit 310 may convert the two-phase current (i$\alpha$, i$\beta$) of the stationary coordinate system into two-phase current (id, iq) of the rotating coordinate system.

The speed calculator 320 may estimate the position value ($\hat{\theta}_r$) and differentiate the estimated position to calculate the speed ($\hat{\omega}_r$), based on the output current (ia, ib, ic) and the output current (id) detected by the first output current detector E1 and the second output current detector E2.

The current command generator 330 generates a current command value i*q based on the calculated speed $\hat{\omega}_r$ and a speed command value ω*r. For example, the current command generator 330 may perform PI control in a PI controller 335 and generate the current command value i*q based on the difference between the calculated speed $\hat{\omega}_r$ and the speed command value ω*r. While FIG. 8 illustrates a q-axis current command value i*q as a current command value, a d-axis current command value i*d may also be generated. The d-axis current command value i*d may be set to 0.

The current command generator 330 may further include a limiter (not shown) for limiting the level of the current command value i*q such that the current command value i*q does not exceed an allowable range.

Next, the voltage command generator 340 generates d-axis and q-axis voltage command values v*d and v*q based on the d-axis and q-axis currents id and iq which are transformed into currents in the two-phase rotating axis by the axis transformation unit and the current command values i*d and i*q from the current command generator 330. For example, the voltage command generator 340 may perform PI control in a PI controller 344 and generate a q-axis voltage command value v*q based on the difference between the q-axis current iq and the q-axis current command value i*q. In addition, the voltage command generator 340 may perform PI control in a PI controller 348 and generate the d-axis voltage command value v*d based on the difference between the d-axis current id and the d-axis current command value i*d. The voltage command generator 340 may further include a limiter (not shown) for limiting the levels of the d-axis and q-axis voltage command values v*d and v*q such that the d-axis and q-axis voltage command values v*d and v*q do not exceed an allowable range.

The generated d-axis and q-axis voltage command values v*d and v*q are input to the axis transformation unit 350.

The axis transformation unit 350 receives the position $\hat{\theta}_r$ calculated by the speed calculator 320 and the d-axis and q-axis voltage command values v*d and v*q and performs axis transformation.

The axis transformation unit 350 transforms a two-phase rotating axis into a two-phase stationary axis. The transformation may be performed using the position $\hat{\theta}_r$ calculated by the speed calculator 320.

The axis transformation unit 350 may also transform the two-phase stationary axis into a three-phase stationary axis. Through such transformation, the axis transformation unit 350 outputs three-phase output voltage command values v*a, v*b, and v*c.

The switching control signal output unit 360 outputs a PWM inverter switching control signal Sic based on the three-phase output voltage command values v*a, v*b, and v*c.

The output inverter switching control signal Sic is transformed into a gate drive signal in a gate driver (not shown) and then input to the gate of each switching element in the inverter 420. Thereby, the switching elements Sa, S'a, Sb, S'b, Sc, and S'c in the inverter 420 perform the switching operation.

Meanwhile, the switching control signal output unit 360 may control the switching element in the inverter 420 by variable pulse width control based on a space vector.

Meanwhile, the switching control signal output unit 360 may output a corresponding switching control signal Sic such that the number of frequencies of the current input to the multi-phase motor 230a when the single-phase motor 230b and the multi-phase motor 230a are driven at the same speed is smaller than the number of frequencies of the current input to the multi-phase motor 230a when the single-phase motor 230b and the multi-phase motor 230a are driven at different speeds.

Accordingly, a plurality of motors serially connected with each other may be driven at different speeds by using a single inverter 420. In addition, it is also possible to drive a plurality of motors serially connected with each other at the same speed by using a single inverter 420. Thus, a plurality of motors may be stably driven by using a single inverter 420 while preventing a reduction in the voltage utilization of the inverter 420.

Meanwhile, the switching control signal output unit 360 may output a corresponding switching control signal Sic such that the number of frequency of the current input to the multi-phase motor 230a is one when the single-phase motor 230b and the multi-phase motor 230a are driven at the same speed, and the number of frequencies of the current input to the multi-phase motor 230a is two or more when the single-phase motor 230b and the multi-phase motor 230a are driven at different speeds.

Accordingly, a plurality of motors serially connected with each other may be driven at different speeds using a single inverter 420. In addition, it is also possible to drive a plurality of motors serially connected with each other at the same speed using a single inverter 420.

Meanwhile, the switching control signal output unit 360 may output a corresponding switching control signal Sic such that a current corresponding to a single sine wave flows through the inverter 420 when the single-phase motor 230b and the multi-phase motor 230a are driven at the same speed, and a current corresponding to the sum of a plurality of sine waves flows through the inverter 420 when the single-phase motor 230b and the multi-phase motor 230a are driven at different speeds.

Meanwhile, Meanwhile, the switching control signal output unit 360 may output a corresponding switching control signal Sic such that when the single-phase motor 230b and the multi-phase motor 230a are driven at different speeds, the multi-phase motor 230a rotates at a first speed corresponding to a first frequency of a first current input to the multi-phase motor 230a, and the single-phase motor 230b rotates at a second speed corresponding to a second frequency of the current flowing through the multi-phase motor 230a.

Accordingly, a plurality of motors serially connected with each other can be stably driven at different speeds using a single inverter 420.

Meanwhile, the switching control signal output unit 360 may output a corresponding switching control signal Sic such that the multi-phase motor 230a and the single-phase motor 230b are driven by an effective current of the same frequency when the single-phase motor 230b and the multi-phase motor 230a are driven at the same speed.

Accordingly, it is possible to stably drive a plurality of motors serially connected with each other at the same speed using a single inverter 420.

Meanwhile, the switching control signal output unit 360 may output a corresponding switching control signal Sic such that the operation period of the single-phase motor 230b is shorter than the operation period of the multi-phase motor 230a. Accordingly, a plurality of motors serially connected with each other can be stably driven using a single inverter 420.

Meanwhile, the switching control signal output unit 360 may output a corresponding switching control signal Sic such that when the single-phase motor 230b and the multi-phase motor 230a are driven simultaneously, current flows through the multi-phase motor 230a and the single-phase motor 230b, and when only the multi-phase motor 230a is driven, current does not flow through the single-phase motor 230b.

Accordingly, a plurality of motors serially connected with each other can be stably driven at different speeds by using a single inverter 420. In addition, by using a single inverter 420, it is possible to stably drive only the multi-phase motor 230a among a plurality of motors serially connected with each other.

Meanwhile, when only the single-phase motor 230b is driven, the switching control signal output unit 360 outputs a corresponding switching control signal Sic such that all of the upper and lower switching elements of the inverter 420 are turned on. Accordingly, by using a single inverter 420, it is possible to stably drive only the multi-phase motor 230a among a plurality of motors serially connected with each other.

Meanwhile, the switching control signal output unit 360 may output a corresponding switching control signal Sic such that when the single-phase motor 230b and the multi-phase motor 230a are driven simultaneously, the electric potential between a motor neutral point na of the multi-phase motor 230a and a DC terminal neutral point (n) between the first capacitor C1 and the second capacitor C2 is different, and when only the multi-phase motor 230a is driven, the electric potential between the motor neutral point na and the DC terminal neutral point (n) is the same.

Accordingly, it is possible to stably drive a plurality of motors serially connected with each other at different speeds, or to stably drive only a multi-phase motor 230a among a plurality of motors serially connected with each other, by using a single inverter 420.

Meanwhile, when only the single-phase motor 230b is driven, the switching control signal output unit 360 may output a corresponding switching control signal Sic such that all of the upper switching elements or lower switching elements of the inverter 420 are turned on. Accordingly, it is possible to stably drive only the single-phase motor 230b among a plurality of motors serially connected with each other, by using a single inverter 420.

Figure 9A:
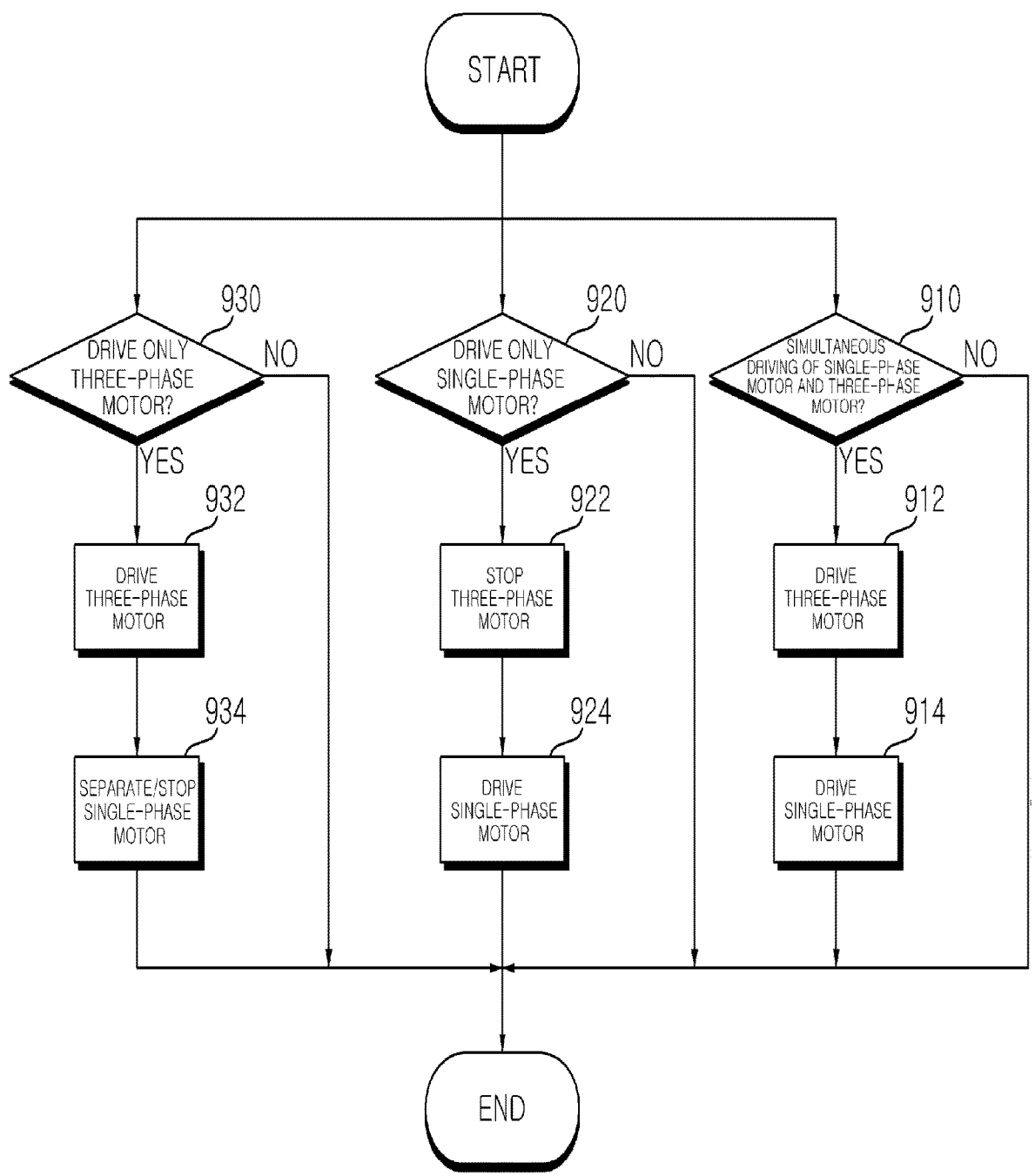
FIG. 9A is a diagram showing various operation modes of a multi-phase motor and a single-phase motor of the device for driving a plurality of motors of FIG. 5.

FIG. 9A is a diagram showing various operation modes of a multi-phase motor and a single-phase motor of the device for driving a plurality of motors of FIG. 5.

Referring to the drawing, the multi-phase motor 230a and the single-phase motor 230b may be divided into a simultaneous driving mode in which both motors are simultaneously driven, a single-phase motor single driving mode in which only a single-phase motor is driven, and a multi-phase motor single driving mode in which only a multi-phase motor is driven.

In the case of the simultaneous driving mode (S910), the inverter controller 430 drives the multi-phase motor 230a (S912), and drives the single-phase motor 230b (S914).

The current output from the inverter controller 430 is input to the single-phase motor 230b via the multi-phase motor 230a, but it can be said that steps 912 and 914 are performed almost simultaneously.

Meanwhile, the simultaneous driving mode may be divided into a same speed mode in which the single-phase motor 230b and the multi-phase motor 230a are driven at the same speed, and a different speed mode in which the single-phase motor 230b and the multi-phase motor 230a are driven at different speeds.

Figure 9B:
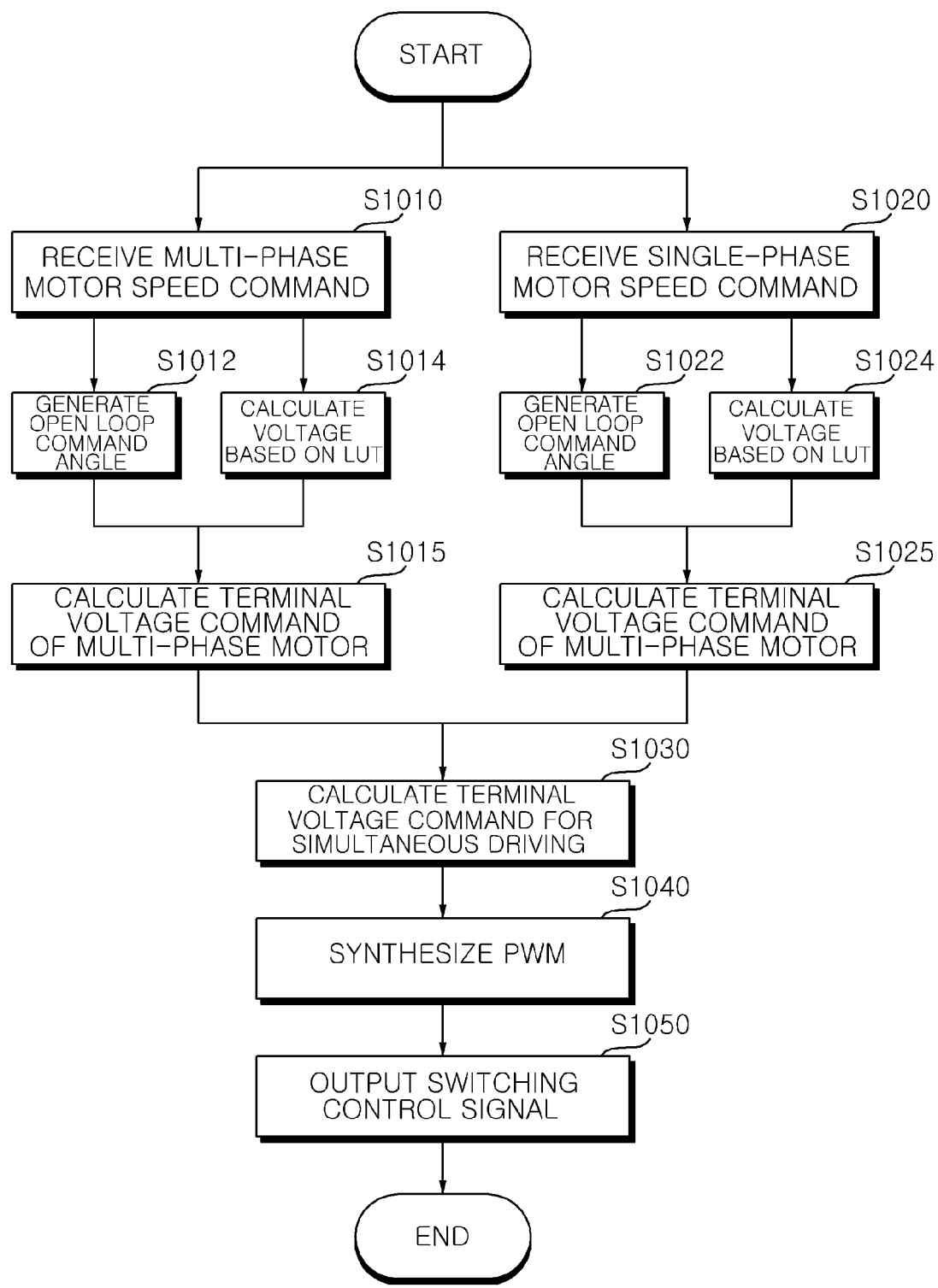
FIG. 9B is a flowchart illustrating an internal operation of an inverter controller according to various operation modes.

FIG. 9B is a flowchart illustrating the internal operation of the inverter controller according to various operation modes. More specifically, it may be a flowchart corresponding to the different speed mode of the simultaneous driving mode.

Referring to the drawing, the inverter controller 430 may receive a multi-phase motor speed command from an external controller or a communicator (S1010), and receive a single-phase motor speed command (S1020).

Next, the inverter controller 430 may generate an open loop command angle based on the multi-phase motor speed command (S1012), and calculate a voltage based on lookup table (S1014).

For example, when the open loop command angle of the multi-phase motor is generated, the voltage based on lookup table corresponding to the open loop command angle in a lookup table may be calculated.

In addition, the inverter controller 430 may calculate a current command value and a terminal voltage command of the multi-phase motor, based on the calculated open loop command angle and the voltage based on lookup table (S1015).

Meanwhile, the inverter controller 430 may generate an open loop command angle based on a single-phase motor speed command (S1022), and calculate a voltage based on lookup table (S1024).

For example, when the open loop command angle of the single-phase motor is generated, a voltage based on lookup table corresponding to the open loop command angle in the look-up table may be calculated.

In addition, the inverter controller 430 may calculate the current command value and the terminal voltage command of the single-phase motor, based on the calculated open loop command angle and the voltage based on lookup table (S1025).

Next, the inverter controller 430 may calculate the terminal voltage command for simultaneous driving of the single-phase motor 230b and the multi-phase motor 230a, by using the calculated multi-phase motor terminal voltage command and single-phase motor terminal voltage command (S1030).

Next, the inverter controller 430 may synthesize a signal for pulse width variable modulation based on the calculated terminal voltage command for simultaneous driving (S1040), and output a PWM-based switching control signal (S1050).

Figure 10:
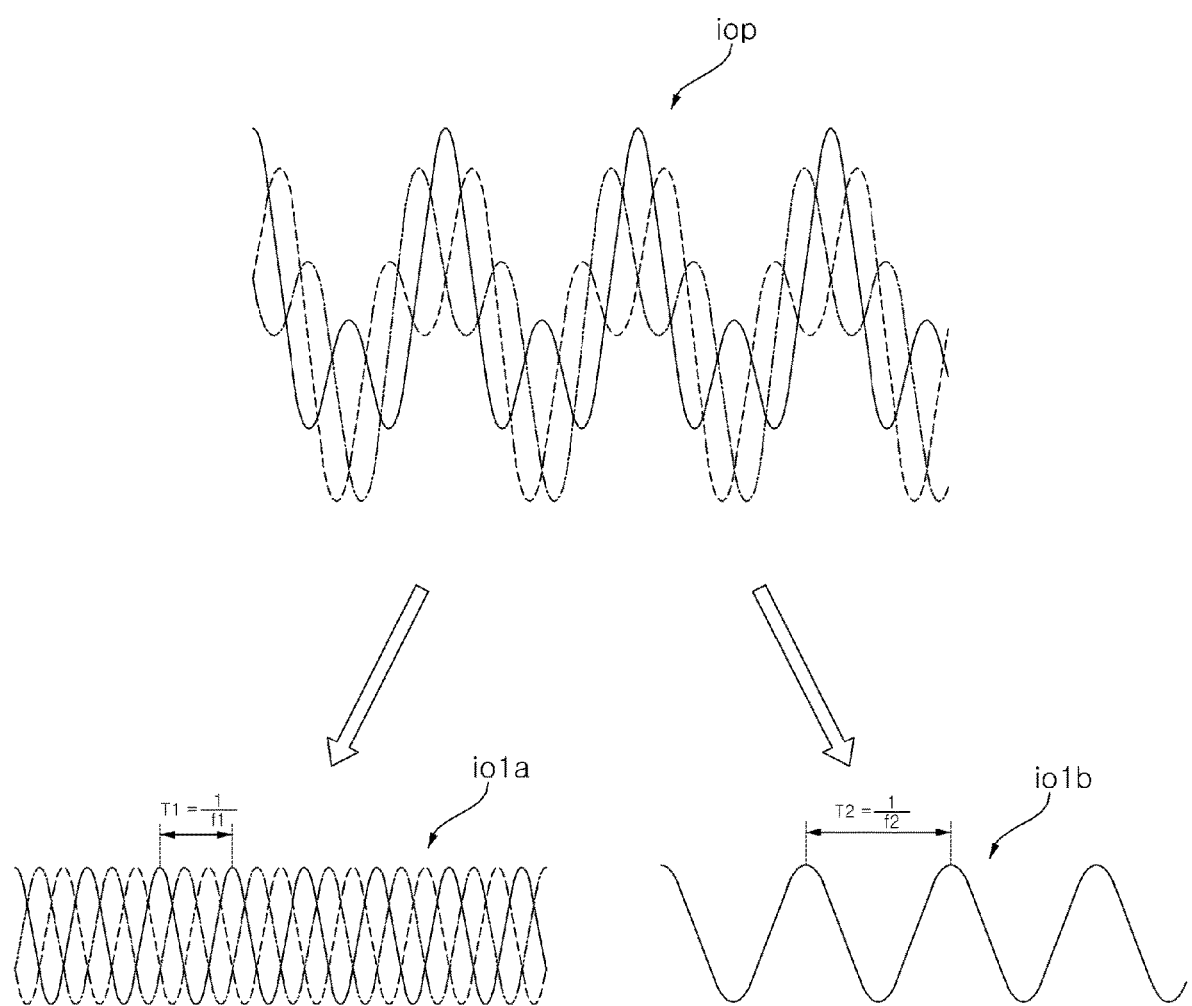
FIG. 10 illustrates an output current waveform output from an inverter of a device for driving a plurality of motors according to an embodiment of the present disclosure.

FIG. 10 illustrates an output current waveform iop output from an inverter of a device for driving a plurality of motors according to an embodiment of the present disclosure.

In particular, FIG. 10 illustrates the output current waveform iop output from the inverter 420 to drive the multi-phase motor 230a and the single-phase motor 230b simultaneously at different speeds.

The output current waveform iop output from the inverter 420 may include a first current waveform io1a for driving the multi-phase motor 230a, and a second current waveform io1ab for driving the single-phase motor 230b.

Meanwhile, the output current waveform iop output from the inverter 420 flows through the multi-phase motor 230a intactly, and the first current waveform io1a component of the output current waveform iop, as an effective current, is used for driving the multi-phase motor 230a.

Next, the second current waveform io1ab excluding the first current waveform io1a component of the output current waveform iop output from the inverter 420 is input and flows in the single-phase motor 230b serially connected to the multi-phase motor 230a.

That is, the second current waveform io1b, as an effective current, is used for driving the single-phase motor 230b.

Meanwhile, FIG. 10 illustrates that a period T1 of the first current waveform io1a is smaller than a period T2 of the second current waveform io1ab.

That is, FIG. 10 illustrates that the frequency f1 of the first current waveform io1a is greater than the frequency f2 of the second current waveform io1b. Accordingly, the driving speed of the multi-phase motor 230a may be greater than the driving speed of the single-phase motor 230b.

FIG. 11A to FIG. 11F are diagrams showing the same speed mode of the simultaneous driving modes.

Figure 11A:
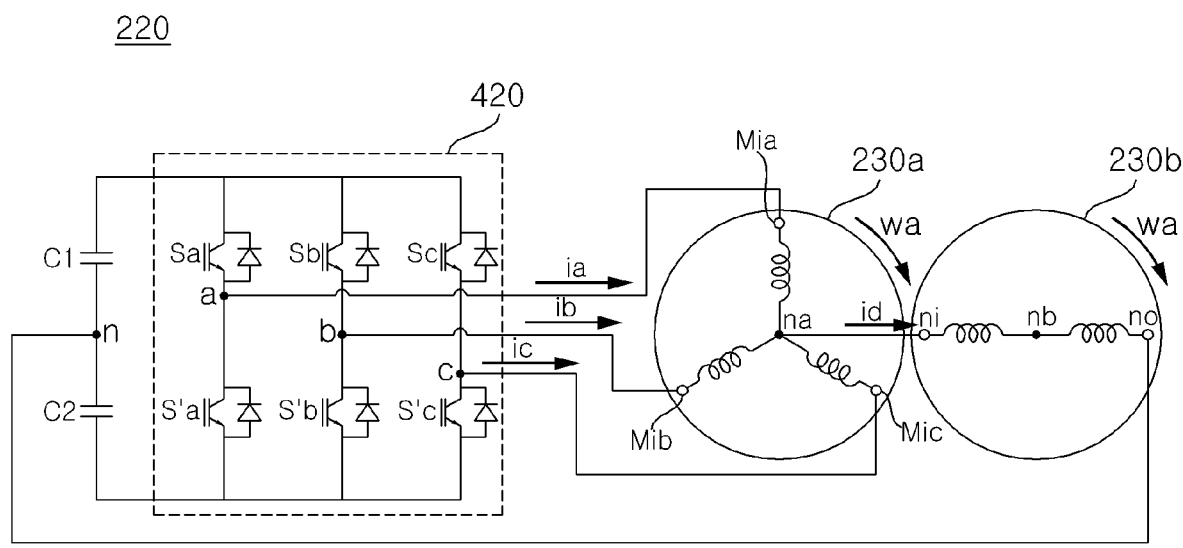
FIGS. 11A to 11F are diagrams referenced to explain a same speed mode among a mode of simultaneous driving of a multi-phase motor and a single-phase motor.
Figure 11B:
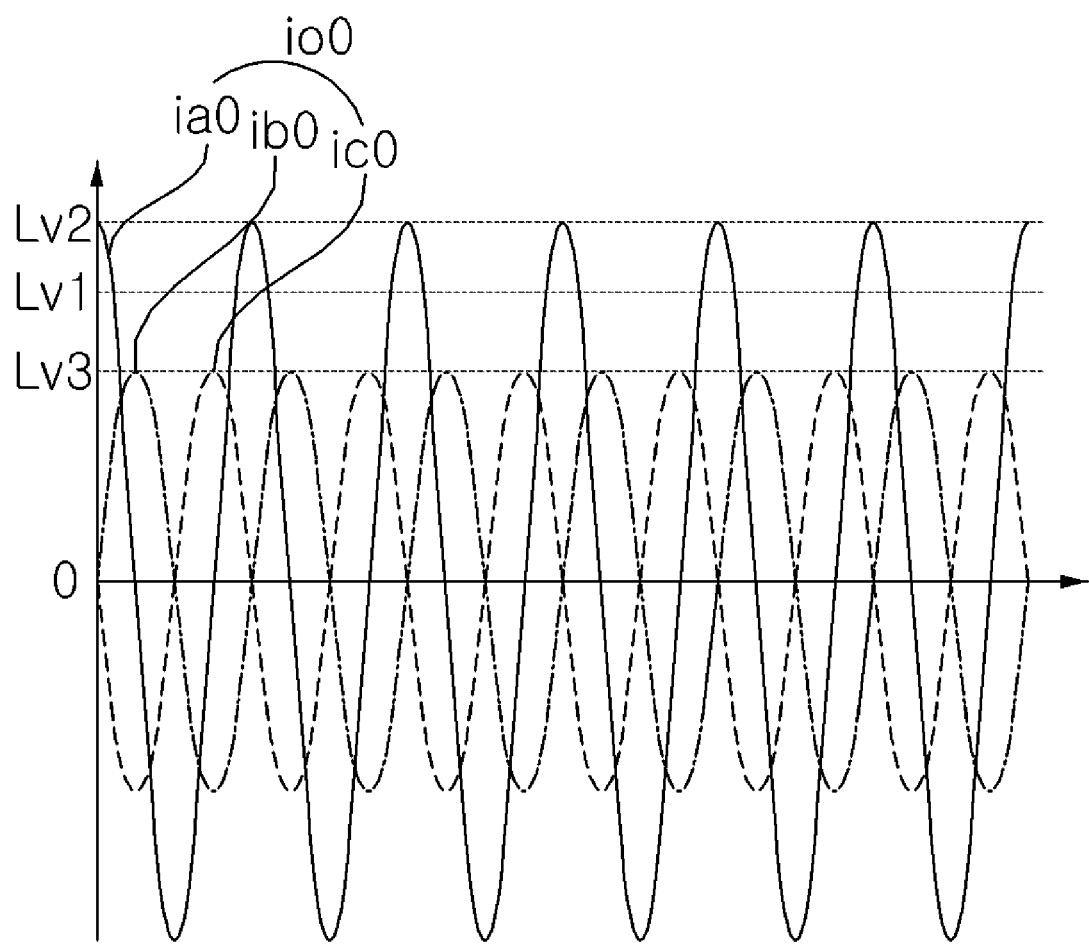

As shown in FIG. 11A, according to partly turn-on, partly turn-off of the six switching elements of the inverter 420, the output current waveform io0 output from the inverter 420 may contain, as shown in FIG. 11B, a-phase output current waveform ia0, b-phase output current waveform ib0, and c-phase output current waveform ic0.

Particularly, a part of the upper switching elements Sa, Sb, and Sc of the inverter 420 may be turned on, and remaining part may be turned off, or a part of the lower switching elements S'a, S'b, and S'c of the inverter 420 may be turned on, and remaining part may be turned off. Accordingly, the output current waveform io0 output from the inverter 420, as shown in FIG. 11B, may contain a-phase output current waveform ia0, b-phase output current waveform ib0, and c-phase output current waveform ic0.

FIG. 11B illustrates that the maximum level of the a-phase output current waveform ia0 is Lv2, and the maximum level of the b-phase output current waveform ib0 and the c-phase output current waveform ic0 is Lv3. Meanwhile, the output current waveform io0 output from the inverter 420 of FIG. 11B may be summarized as in Equation 1 below.

$$io0(t) = L_{V2} \sin(wat) + L_{V1} \sin(wa(t-120°)) + L_{V3} \sin(wa(t-240°))$$ [Equation 1]

Here, Lv2×sin(wat) represents the a-phase output current waveform ia0, Lv1×sin)(wa(t−120°) represents the b-phase output current waveform ib0, and Lv3×sin)(wa(t)−240°) represents the c-phase output current waveform ic0.

Meanwhile, Lv2 in FIG. 11B may be 4/3 times (approximately 1.3 times) Lv1, and Lv3 in FIG. 11B may be $\sqrt{3}/2$ times (approximately 0.87 times) Lv1.

According to Equation 1, the output current waveform io0 output from the inverter 420 contains a-phase output current waveform ia0, b-phase output current waveform ib0, and c-phase output current waveform ic0, and the level of each phase current waveform is different as Lv2, Lv1, Lv3, and the phases are different as 0, 120, and 240 degrees.

According to Equation 1, the angular velocities of the a-phase output current waveform ia0, b-phase output current waveform ib0, and c-phase output current waveform ic0 in the output current waveform io0 output from the inverter 420 are constant as wa, and accordingly, the frequencies become wa/2π equally.

That is, the output current waveform io0 output from the inverter 420 of FIG. 11B has a phase output current waveform having a different phase, but since it has the same angular velocity and the same frequency, it can be said to be composed of a single sine wave.

Figure 11C:
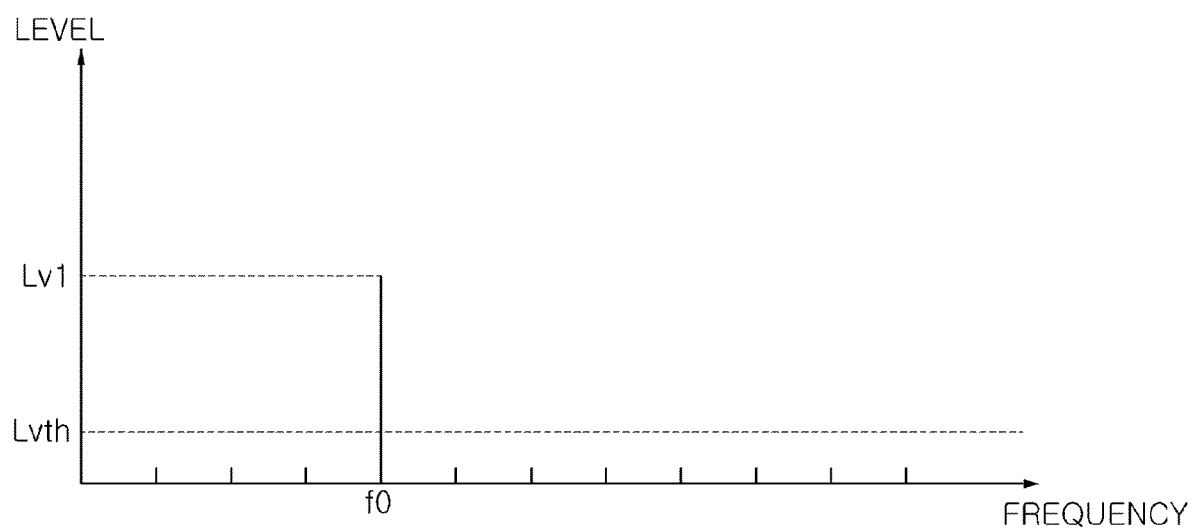

FIG. 11C is a diagram of frequency conversion of io0(t) in Equation 1.

Referring to the drawing, io0(t) in Equation 1 may have an Lv1 level at the frequency of fo due to frequency conversion.

In addition, due to the noise component, io0(t) in Equation 1 may have various frequency components, as shown in the drawing.

In the present disclosure, various frequency components equal to or less than Lvth, which is a lower limit of a meaningful frequency level, are ignored. Therefore, io0(t) in Equation 1 is defined to have a single frequency of fo due to frequency conversion.

Meanwhile, fo in FIG. 11C may represent the same value as wa/2π in relation to Equation 1.

Meanwhile, the output current waveform io0 output from the inverter 420 of FIG. 11B is input to the multi-phase motor 230a, and a part of the output current waveform operates as an effective current to rotate the multi-phase motor 230a.

Figure 11D:
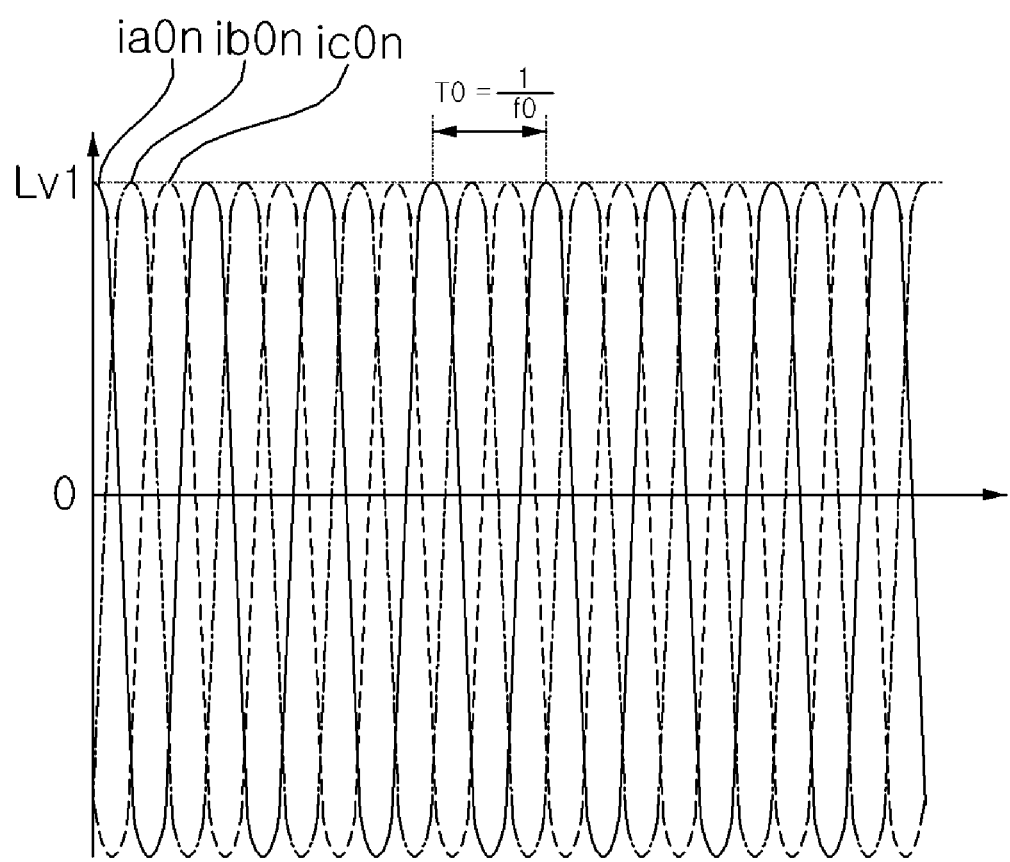

FIG. 11D illustrates the effective current flowing through the multi-phase motor 230a.

The effective current flowing through the multi-phase motor 230a may include a-phase effective current waveform ia0n, b-phase effective current waveform ib0n, and c-phase effective current waveform ic0n.

At this time, the maximum level of the effective current flowing through the multi-phase motor 230a, or the maximum level of each phase effective current waveform may be Lv1.

Meanwhile, the period of the effective current flowing through the multi-phase motor 230a is To, and the frequency of the effective current may be f0.

In addition, the period of the a-phase effective current waveform ia0n, the b-phase effective current waveform ib0n, and the c-phase effective current waveform ic0n may be To, and the frequency may be f0.

Figure 11E:
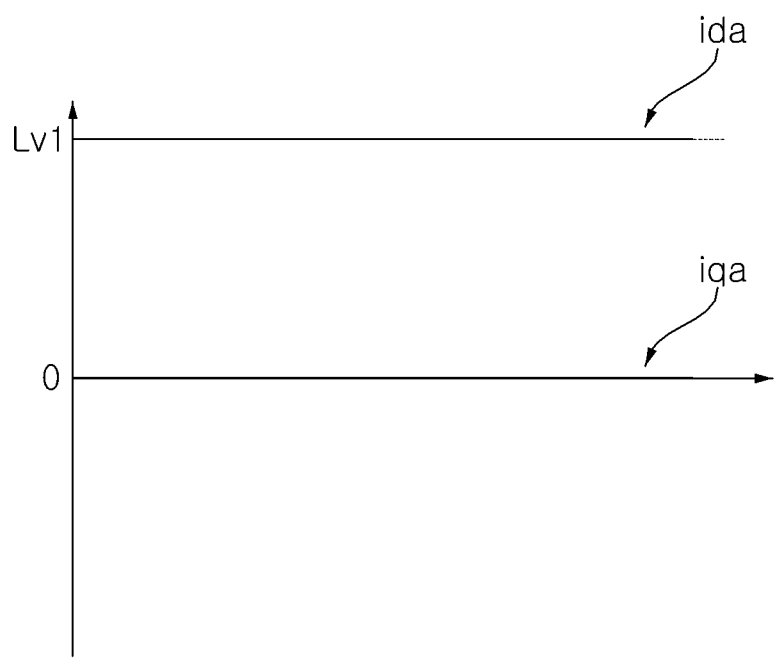

FIG. 11E illustrates the effective current flowing through the multi-phase motor 230a based on the synchronous coordinate system.

The a-phase current, b-phase current, and c-phase current flowing through the multi-phase motor 230a are converted into a d-axis current and a q-axis current based on a stationary coordinate system in the axis transformation unit 310 of FIG. 8, and then can be converted again into a d-axis current and a q-axis current based on a synchronous coordinate system or a rotating coordinate system.

Accordingly, each phase effective current based on the stationary coordinate system in FIG. 11D can be converted into a d-axis effective current ida and a q-axis effective current iqa based on the rotating coordinate system, as shown in FIG. 11E.

At this time, when the multi-phase motor 230a is a surface-mounted permanent magnet synchronous motor (SMPMSM), due to the symmetry of the magnetic flux, the q-axis effective current component becomes 0 as shown in the drawing, and the level of d-axis effective current ida based on the rotating coordinate system is Lv1, and may be the same as the maximum level Lv1 of the effective current flowing through the multi-phase motor 230a.

Figure 11F:
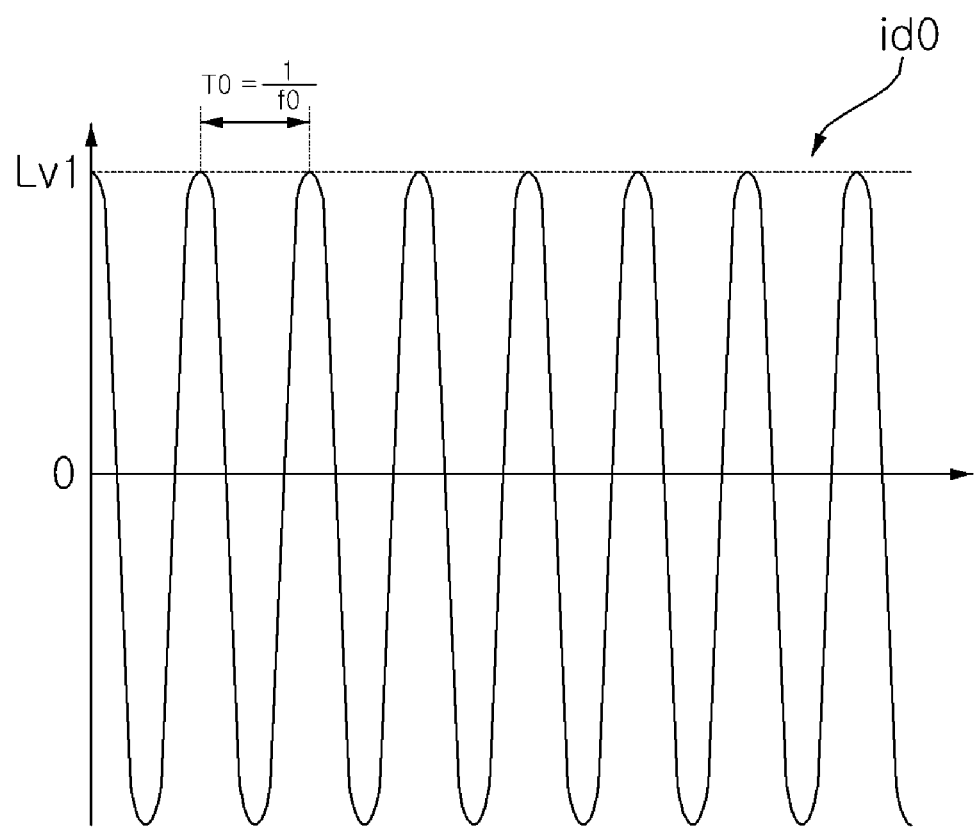

Next, FIG. 11F illustrates the current or the effective current id0 flowing through the single-phase motor 230b.

The maximum level of the effective current id0 flowing through the single-phase motor 230b is Lv1, the period is To, and the frequency is f0.

As described above, since the frequency of the effective current id0 flowing through the single-phase motor 230b is f0, and the frequency of the effective current flowing through the multi-phase motor 230a is f0, so that the frequencies of the effective current of the single-phase motor 230b and the multi-phase motor 230a are the same. Consequently, the single-phase motor 230b and the multi-phase motor 230a are driven at the same speed wa.

Meanwhile, effective currents and torques of the single-phase motor 230b and the multi-phase motor 230a may be expressed by Equation 2 below.

$$T_{ob}=3/8P\lambda_f I_m, T_{oa}=3/4P\lambda_f i_q \quad \text{[Equation 2]}$$

Here, Tob indicates the torque of the single-phase motor 230b, P indicates the number of poles of the motor, λf indicates the counter electromotive force constant, Im indicates the maximum level of the effective current of the single-phase motor 230b, and iq indicates the level of the q-axis current of the multi-phase motor 230a.

According to Equation 2, between the single-phase motor 230b and the multi-phase motor 230a, the number of poles P of the motor and the counter electromotive force constant λf are the same, and if Im and iq are the same, it can be known that the torque Toa of the multi-phase motor 230a is approximately two times greater than the torque Tob of the single-phase motor 230b.

That is, according to FIGS. 11A to 11F, the single-phase motor 230b and the multi-phase motor 230a rotate at the same speed, and when the multi-phase motor 230a is a three-phase motor, the torque Toa of the multi-phase motor 230a becomes approximately two times greater than the torque Tob of the single-phase motor 230b.

Meanwhile, the torques in the case where the multi-phase motor is a five-phase and a six-phase may be expressed by Equation 3 below.

$$T_{oa5}=5/4P\lambda_f I_m, T_{oa6}=3/2P\lambda_f i_q \quad \text{[Equation 3]}$$

Here, Toa5 indicates the torque of the five-phase motor, Toa6 indicates the torque of the six-phase motor, P indicates the number of poles of the motor, λf indicates the counter electromotive force constant, and iq indicates the level of the q-axis current of the five-phase or six-phase motor.

When Equation 2 and Equation 3 are compared, when driven at the same speed, the torque Toa5 of the five-phase motor is 10/3 times the torque Tob of the single-phase motor, and the torque Toa6 of the six-phase motor becomes 4 times the torque Tob of a single-phase motor.

Finally, according to FIGS. 11A to 11F, the multi-phase motor 230a rotates at the speed of Wa, based on the current waveform of io0 output from the inverter 420, and the single-phase motor 230b can rotate at the same speed Wa based on the current waveform of ido.

In this case, the six switching elements of the inverter 420 may perform a switching operation, except that all of the upper switching elements Sa to Sc are turned on or all of the lower switching elements S'a to S'c are turned on.

Finally, according to the device for driving a plurality of motors 220 according to an embodiment of the present disclosure, when the single-phase motor 230b and the multi-phase motor 230a are driven simultaneously at the same speed, the frequencies of the currents io0, ido respectively input to the multi-phase motor 230a and the single-phase motor 230b are preferably the same f0, as shown in FIGS. 11D and 11F.

Meanwhile, when driving the single-phase motor 230b and the multi-phase motor 230a at the same speed, the inverter controller 430 can control the multi-phase motor 230a and the single-phase motor 230b to be driven by an effective current having the same frequency f0. Accordingly, it is possible to stably drive a plurality of motors serially connected with each other at the same speed, by using a single inverter 420.

Meanwhile, the inverter controller 430 may control the magnitude of the effective current Lv1 of the multi-phase motor 230a and the magnitude of the effective current Lv1 of the single-phase motor 230b to be the same.

For example, in a state where the frequency of the effective current of the multi-phase motor 230a and the frequency of the effective current of the single-phase motor 230b are the same, when the magnitude of the effective current of the multi-phase motor 230a and the magnitude of the effective current of the single-phase motor 230b are the same, the driving torque of the multi-phase motor 230a becomes greater than the driving torque of the single-phase motor 230b.

Specifically, when the multi-phase motor 230a is a three-phase motor, the driving torque of the three-phase motor becomes approximately two times greater than the driving torque of the single-phase motor 230b.

FIGS. 12A to 12E are diagrams showing the different speed mode of the simultaneous driving mode.

Figure 12A:
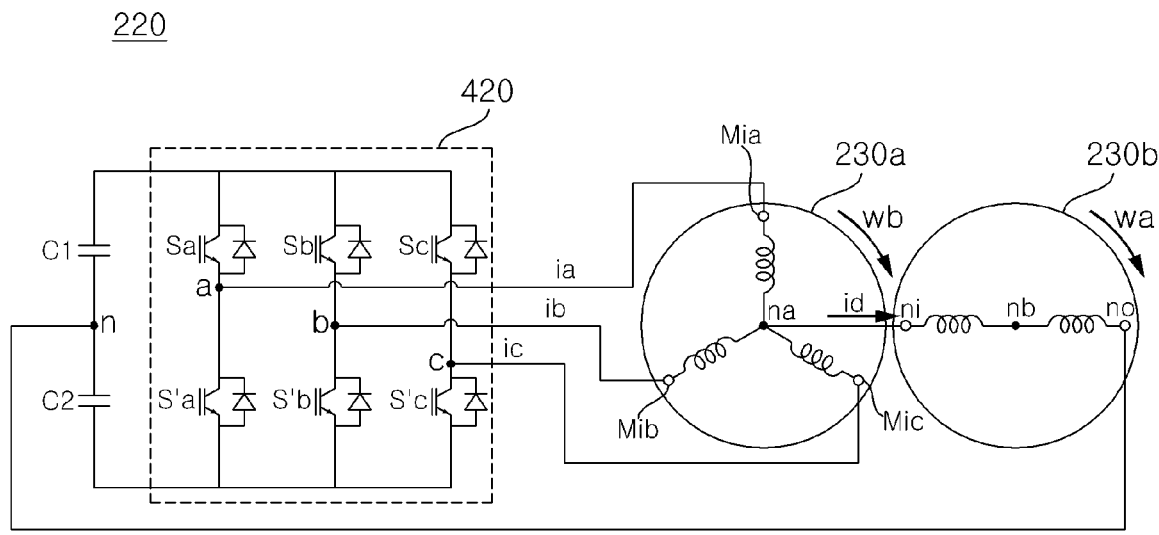
FIGS. 12A to 12E are diagrams referenced to explain a different speed mode among a mode of simultaneous driving of a multi-phase motor and a single-phase motor.
Figure 12B:
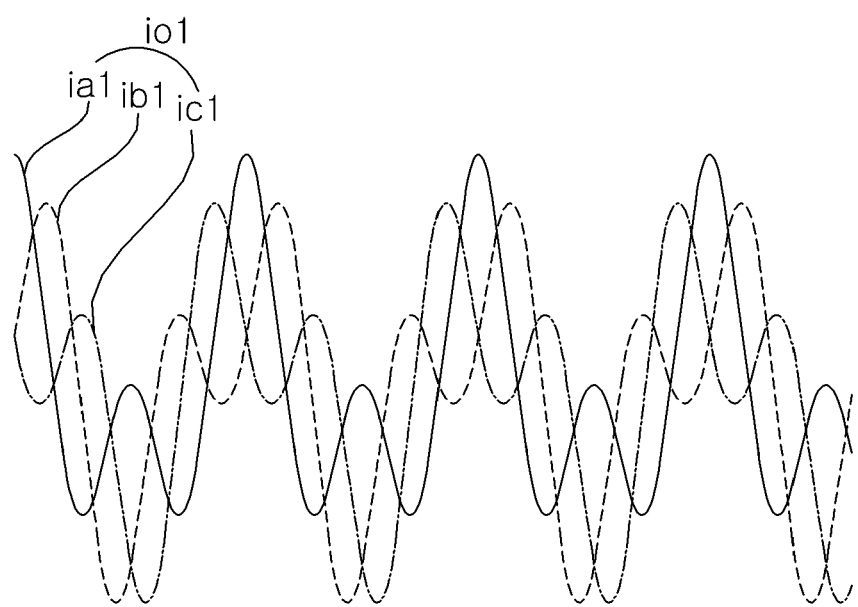

Referring to FIGS. 12A and 12B, according to partly turn-on, partly turn-off of the six switching elements of the inverter 420, the output current waveform io1 output from the inverter 420 may contain a-phase output current waveform ia1, b-phase output current waveform ib1, and c-phase output current waveform ic1.

Due to the series connection of the multi-phase motor 230a and the single-phase motor 230b, in order to simultaneously drive the multi-phase motor 230a and the single-phase motor 230b at the same speed, as illustrated in FIGS. 11A to 11F, a single frequency in the output current waveform output from the inverter 420 is sufficient.

Meanwhile, due to the series connection of the multi-phase motor 230a and the single-phase motor 230b, in order to simultaneously drive the multi-phase motor 230a and the single-phase motor 230b at different speeds, as described in FIGS. 11A to 11F, it is preferable that there are a plurality of frequencies in the output current waveform output from the inverter 420. In particular, it is preferable that there are two frequencies.

Meanwhile, the output current waveform io1 output from the inverter 420 of FIG. 12B may be summarized as in Equation 4 below.

$$io1(t)=K_{a1}\sin(wbt)+K_{b1}\sin(wb(t-120°))+K_{c1}\sin(wb(t-240°))+K_{a2}\sin(wat)+K_{b2}\sin(wa(t-120°))+K_{c2}\sin(wa(t-240°)) \quad \text{[Equation 4]}$$

Here, Ka1×sin(wbt) and Ka2×sin(wat) indicates the a-phase output current waveform ia1, Kb1×sin(wb(t−120°)) and Kb2×sin(wa(t−120°)) indicates the b-phase output current waveform ib1, and Kc1×sin(wb(t−240°)) and Kc2×sin(wa(t−240°)) indicates the c-phase output current waveform ic1.

According to Equation 4, the output current waveform io1 output from the inverter 420 contains a-phase output current waveform ia1, b-phase output current waveform ib1, and c-phase output current waveform ic01, and the phase of each phase current waveform is different in 0 degree, 120 degrees, and 240 degrees.

According to Equation 4, the angular velocities of the a-phase output current waveform ia1, the b-phase output current waveform ib1, and the c-phase output current waveform ic1 in the output current waveform io1 output from the inverter 420 are wb and wa respectively, and accordingly, the frequencies become wb/2π and wa/2π, respectively.

That is, the output current waveform io1 output from the inverter 420 of FIG. 12B has a phase output current waveform having a different phase, but since it has two different angular speeds and two different frequencies, it can be said to be composed of multiple sine waves.

Figure 12C:
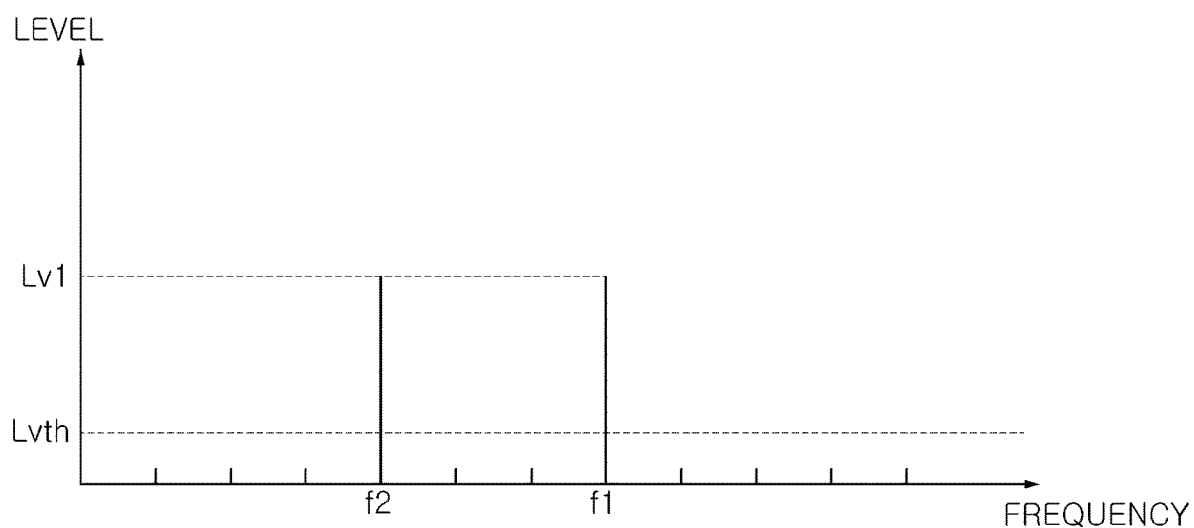

Consequently, in order to simultaneously drive the multi-phase motor 230a and the single-phase motor 230b at different speeds, it is preferable that the output current waveform io1 output from the inverter 420 corresponds to the sum of a plurality of sine waves. FIG. 12C is a diagram of frequency conversion of io1(t) in Equation 4.

Referring to the drawing, io1(t) in Equation 4 may have an Lv1 level at a frequency f1 and a frequency f2 due to frequency conversion.

In addition, due to the noise component, io1(t) in Equation 4 may have various frequency components, as shown in the drawing.

In the present disclosure, various frequency components equal to or less than Lvth, which is a lower limit of a meaningful frequency level, are ignored. Therefore, io1(t) in Equation 4 is defined as having two frequencies f1 and f2, due to frequency conversion.

Meanwhile, f1 in FIG. 12C indicates the same value as wb/2π in the relationship with Equation 4, and f2 may indicate the same value as wa/2π in the relationship with Equation 4.

Meanwhile, the output current waveform io1 output from the inverter 420 of FIG. 12B is input to the multi-phase motor 230a, and a part of the output current waveform io1 operates as an effective current to rotate the multi-phase motor 230a.

Figure 12D:
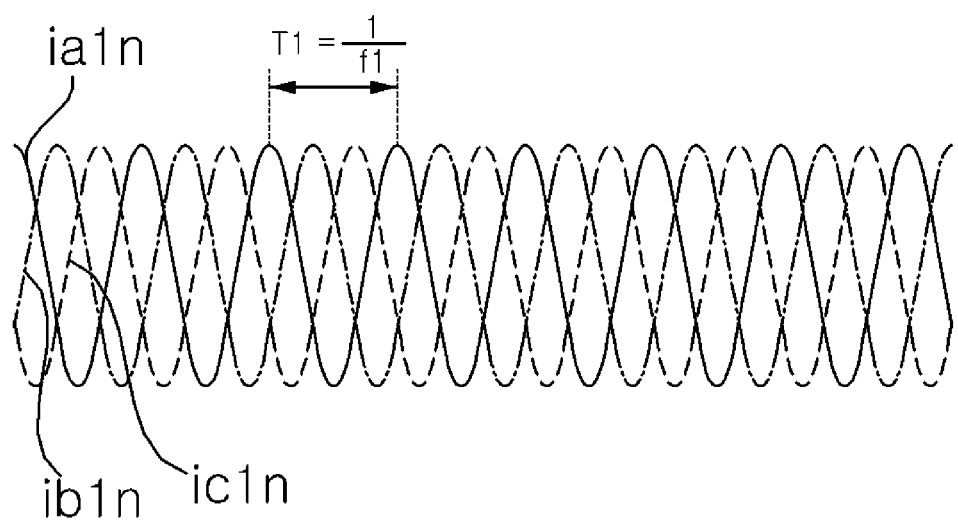

FIG. 12D illustrates the effective current flowing through the multi-phase motor 230a.

The effective current flowing through the multi-phase motor 230a may include an a-phase effective current waveform (ia1n), a b-phase effective current waveform (ib1n), and a c-phase effective current waveform (ic1n).

Meanwhile, the period of the effective current flowing through the multi-phase motor 230a is T1, and the frequency of the effective current may be f1.

In addition, the period of the a-phase effective current waveform ia1n, the b-phase effective current waveform ib1n, and the c-phase effective current waveform ic1n may be T1, and the frequency may be f1.

Figure 12E:
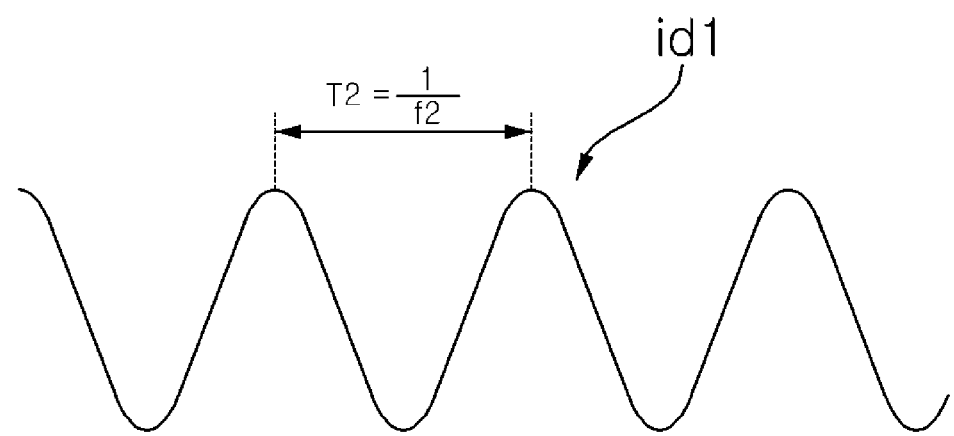

Next, FIG. 12E illustrates the current or the effective current id1 flowing through the single-phase motor 230b.

The period of the effective current id1 flowing through the single-phase motor 230b is T2 greater than T1, and the frequency is f2 less than f1.

As described above, since the frequency of the effective current id1 flowing through the single-phase motor 230b is f2 and the frequency of the effective current flowing through the multi-phase motor 230a is f1, the single-phase motor 230b and the multi-phase motor 230a are driven at different speeds.

In particular, as shown in FIG. 12A, based on the current waveform of io1, the multi-phase motor 230a rotates at a speed Wb greater than the speed Wa, and the single-phase motor 230b can rotate at a speed Wa based on the current waveform of id1.

In this case, the six switching elements of the inverter 420 may perform a switching operation, except that all of the upper switching elements Sa to Sc are turned on or all of the lower switching elements S'a to S'c are turned on.

Meanwhile, when comparing FIGS. 12A to 12E with FIGS. 11A to 11F, it is preferable that the number of frequencies of the current input to the multi-phase motor 230a in the case of the different speed mode of the single-phase motor 230b and the multi-phase motor 230a is greater than in the case of the same speed mode of the single-phase motor 230b and the multi-phase motor 230a.

For example, it is preferable that when the single-phase motor 230b and the multi-phase motor 230a are driven at the same speed, the frequency of the current input to the multi-phase motor 230a is one as fo, as shown in FIGS. 11D and 11F, and when the single-phase motor 230b and the multi-phase motor 230a are driven at different speeds, the frequency of the current input to the multi-phase motor 230a is two or more, as f1 and f2 of FIGS. 12D and 12E.

Meanwhile, the inverter controller 430 may control the multi-phase motor 230a and the single-phase motor 230b to be driven by effective current of a different frequency, when driving the multi-phase motor 230a and the single-phase motor 230b at different speeds.

For example, when driving the single-phase motor 230b and the multi-phase motor 230a at different speeds, the inverter controller 430 can control the frequency of the effective current of the multi-phase motor 230a and the frequency of the effective current of the single-phase motor 230b to be different. Depending on the frequency of the effective current, the single-phase motor 230b and the multi-phase motor 230a can be driven at different speeds.

Meanwhile, the inverter controller 430 may control the magnitude of the effective current of the multi-phase motor 230a and the magnitude of the effective current of the single-phase motor 230b to be different. According to this, the torque of the multi-phase motor 230a and the torque of the single-phase motor 230b are different.

Meanwhile, the current waveform io1 of FIG. 12B corresponds to the sum of a plurality of sine waves, and in particular, may correspond to the sum of the current waveform of FIG. 12D and the current waveform of id1 of FIG. 12E.

For example, the effective current corresponding to the multi-phase motor 230a may correspond to each phase current waveform of FIG. 12D, and the effective current corresponding to the single-phase motor 230b may correspond to the current waveform of id1.

Accordingly, a plurality of motors serially connected with each other can be stably driven at different speeds, by using a single inverter 420.

After all, by using a single inverter 420, a plurality of motors can be stably driven while preventing a reduction in the voltage utilization of the inverter 420.

Meanwhile, by using a single inverter 420, since it is possible to change the voltage utilization ratios of a plurality of motors serially connected with each other, efficient operation of the plurality of motors can be achieved.

FIG. 13A to FIG. 13D are diagrams showing a single-phase motor driving mode of the single driving mode.

Due to the series connection of the multi-phase motor 230a and the single-phase motor 230b, it is necessary to make the effective current flowing through the multi-phase motor 230a to be zero for the single driving of the single-phase motor 230b.

Figure 13A:
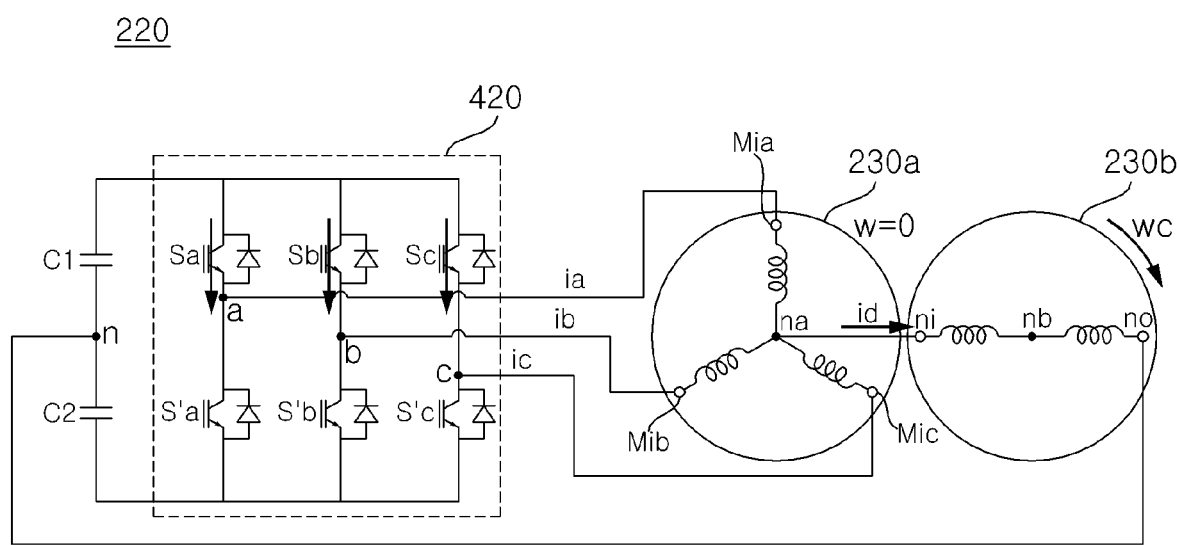
FIGS. 13A to 13D are diagrams referenced to explain a single driving mode of a single-phase motor among a multi-phase motor and a single-phase motor.

Accordingly, in the present disclosure, for the single driving of the single-phase motor 230b, as shown in FIG. 13A, among the six switching elements of the inverter 420, all of the upper switching elements Sa to Sc are turned on or all of the lower switching elements S'a to S'c are turned on. This case may be referred to as switching by a zero vector.

Meanwhile, when at least the multi-phase motor 230a, among the single-phase motor 230b and the multi-phase motor 230a, is driven, a part of the upper switching elements Sa, Sb, and Sc of the inverter 420 may be turned on, and remaining part may be turned off, or a part of the lower switching elements S'a, S'b, and S'c of the inverter 420 may be turned on, and remaining part may be turned off.

Meanwhile, according to the switching by a zero vector, since the phase of the current flowing in each phase is the same, the torque is not generated by the current flowing in the multi-phase motor 230*a*.

That is, according to the switching by the zero vector, the inverter 420 and the multi-phase motor 230*a* form a closed loop, and eventually torque is not generated.

Meanwhile, the sum of the currents flowing in each phase through the multi-phase motor 230*a* flows to the single-phase motor 230*b*. Therefore, the single-phase motor 230*b* rotates.

Figure 13B:
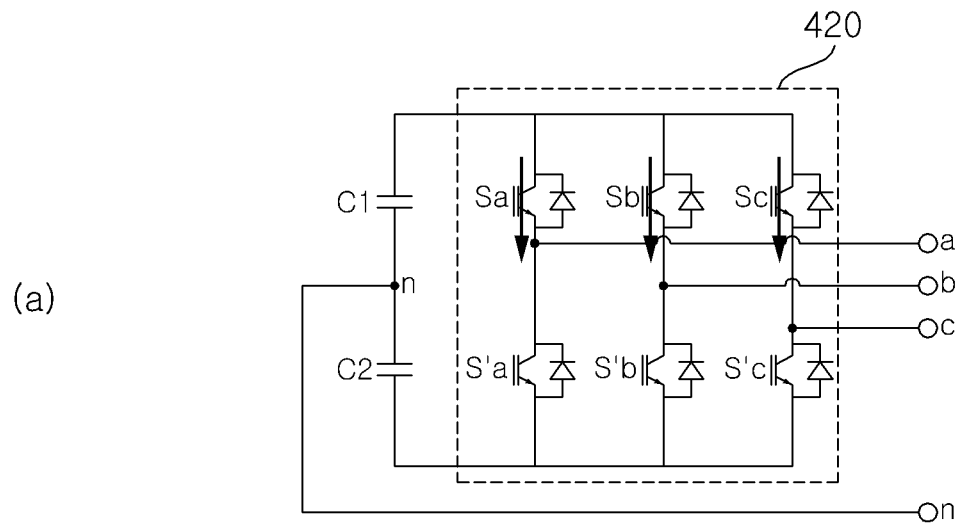
Figure 13B:
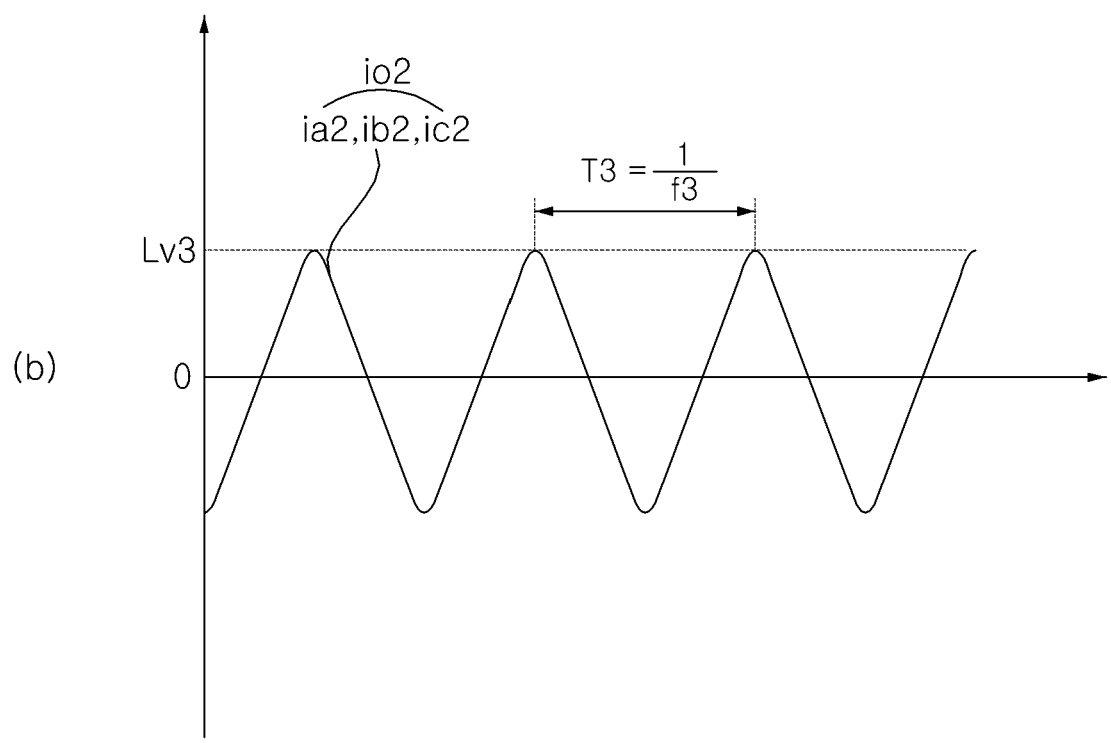

FIG. 13B(a) illustrates that all of the upper switching elements Sa to Sc, among the six switching elements of the inverter 420, are turned on.

Accordingly, the output current waveform output from the inverter 420 may be illustrated as io2, as shown in FIG. 13B(b).

The output current waveform io2 output from the inverter 420 may contain a-phase output current waveform ia2, b-phase output current waveform ib2, and c-phase output current waveform ic2.

Meanwhile, unlike FIG. 11B or FIG. 11D, all of the a-phase output current waveform ia2, the b-phase output current waveform ib2, and the c-phase output current waveform ic2 in FIG. 13B(b) have the same phase and have the same frequency.

That is, when only the single-phase motor 230*b* is driven, unlike the simultaneous driving mode or the single driving of multi-phase motor 230*a*, the phase of each phase current waveform of the output current waveform output from the inverter 420 may be the same.

That is, since the switching by the zero vector is performed in the inverter 420, the output current waveform io2 output from the inverter 420 may be illustrated as shown in FIG. 13B(b).

Figure 13C:
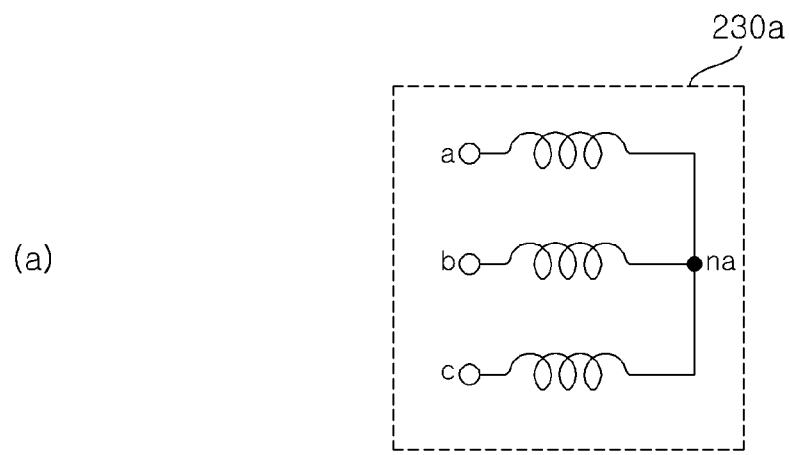
Figure 13C:
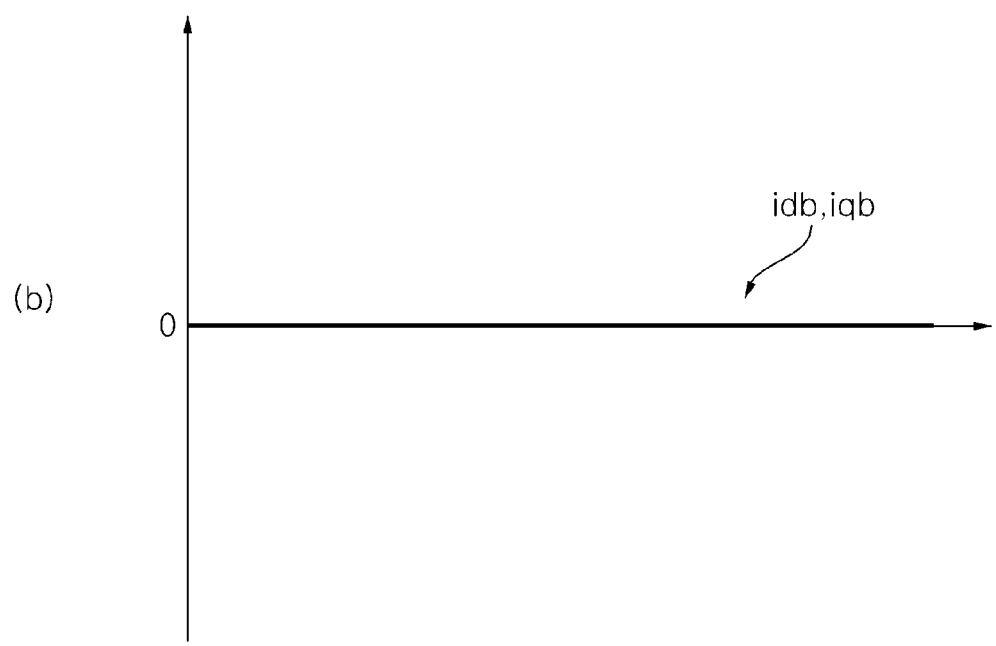

Meanwhile, FIG. 13C illustrates an effective current flowing through an internal coil of the multi-phase motor 230*a*.

FIG. 13C(a) illustrates the internal coil of the multi-phase motor 230*a*, and FIG. 13C(b) illustrates the d-axis effective current idb and q-axis effective current iqb based on the synchronous coordinate system or the rotating coordinate system.

When the multi-phase motor 230*a* is a surface-mounted permanent magnet synchronous motor (SMPMSM), unlike FIG. 11E, FIG. 13C(b) illustrates that the level of the d-axis effective current idb as well as the q-axis effective current iqb is also 0.

Accordingly, the level of the effective current of the multi-phase motor 230*a* is 0, and the frequency also becomes 0.

That is, due to the switching by the zero vector, current flows through the three-phase coil of the multi-phase motor 230*a*, but the effective current becomes 0, and eventually, the multi-phase motor 230*a* does not rotate and stops.

Figure 13D:
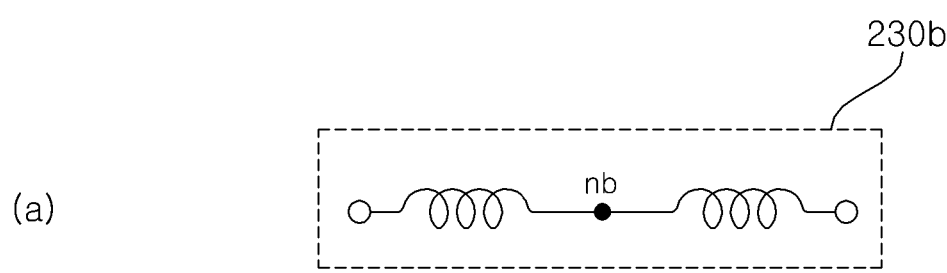
Figure 13D:
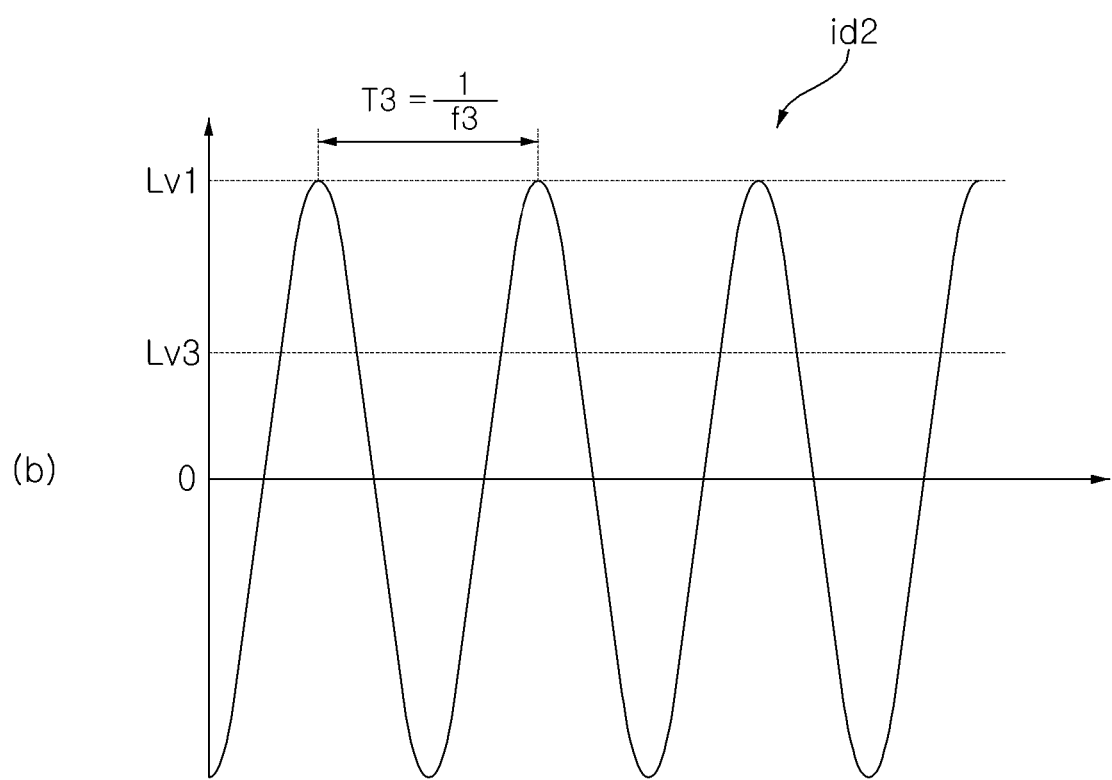

Next, FIG. 13D illustrates a current waveform or an effective current waveform flowing through the single-phase motor 230*b*.

FIG. 13D(a) illustrates the internal coil of the single-phase motor 230*b*, and FIG. 13D(b) illustrates the current waveform or the effective current id2 flowing through the single-phase motor 230*b*.

The maximum level of the effective current id1 flowing through the single-phase motor 230*b* is Lv1, the period is T3, and the frequency is f3.

Accordingly, the single-phase motor 230*b* rotates at the speed We according to the frequency f3.

At this time, the maximum level LV1 of the effective current id1 flowing through the single-phase motor 230*b* is greater than the maximum level LV3 of the output current waveform io2 output from the inverter 420 of FIG. 13*b* or each phase output current waveform ia2, ib2, ic2, and may be approximately three times.

As described above, by using the zero vector switching for the multi-phase motor 230*a* and the single-phase motor 230*b* serially connected, it is possible to drive only the single-phase motor 230*b*.

FIG. 14A to FIG. 14D are diagrams showing a multi-phase motor driving mode of the single driving modes.

Figure 14A:
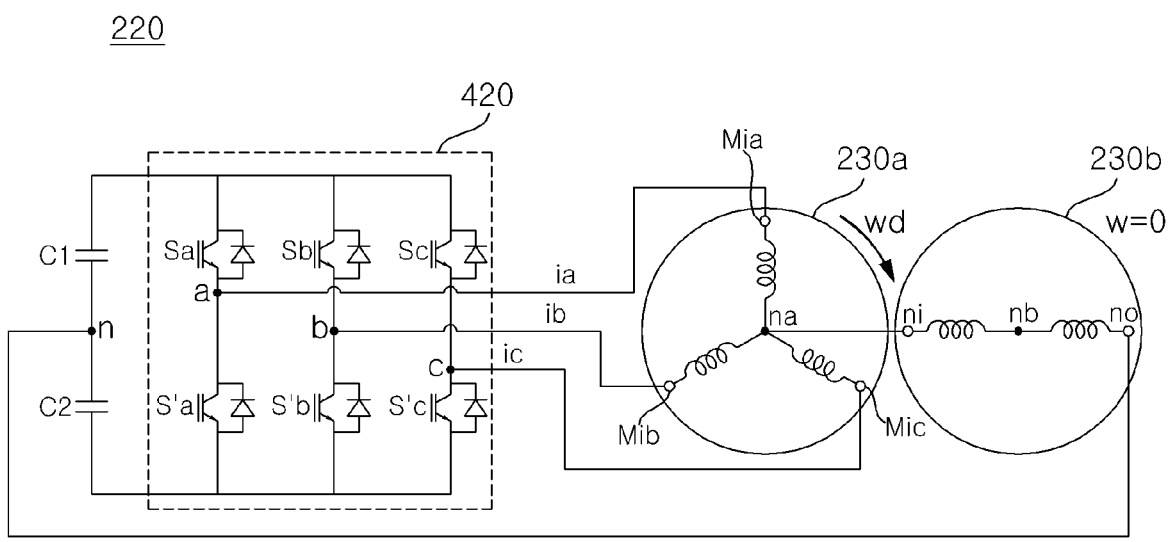
FIGS. 14A to 14D are diagrams referenced to explain a single driving mode of a multi-phase motor among a multi-phase motor and a single-phase motor.

Due to the series connection of the multi-phase motor 230*a* and the single-phase motor 230*b*, as shown in FIG. 14A, it is necessary to make the effective current flowing through the single-phase motor 230*b* to be zero for the single driving of the multi-phase motor 230*a*.

Accordingly, in the present disclosure, in order to perform the single driving of the multi-phase motor 230*a*, a part of the upper switching elements Sa, Sb, and Sc of the inverter 420 may be turned on, and remaining part may be turned off, or a part of the lower switching elements S'a, S'b, and S'c of the inverter 420 may be turned on, and remaining part may be turned off, and the electric potential between the motor neutral point na and the DC terminal neutral point (n) is set to be the same.

Meanwhile, similarly, when at least the single-phase motor 230*b* among the multi-phase motor 230*a* and the single-phase motor 230*b* are driven, the electric potential between the motor neutral point na and the DC terminal neutral point (n) should be set to be different.

Figure 14B:
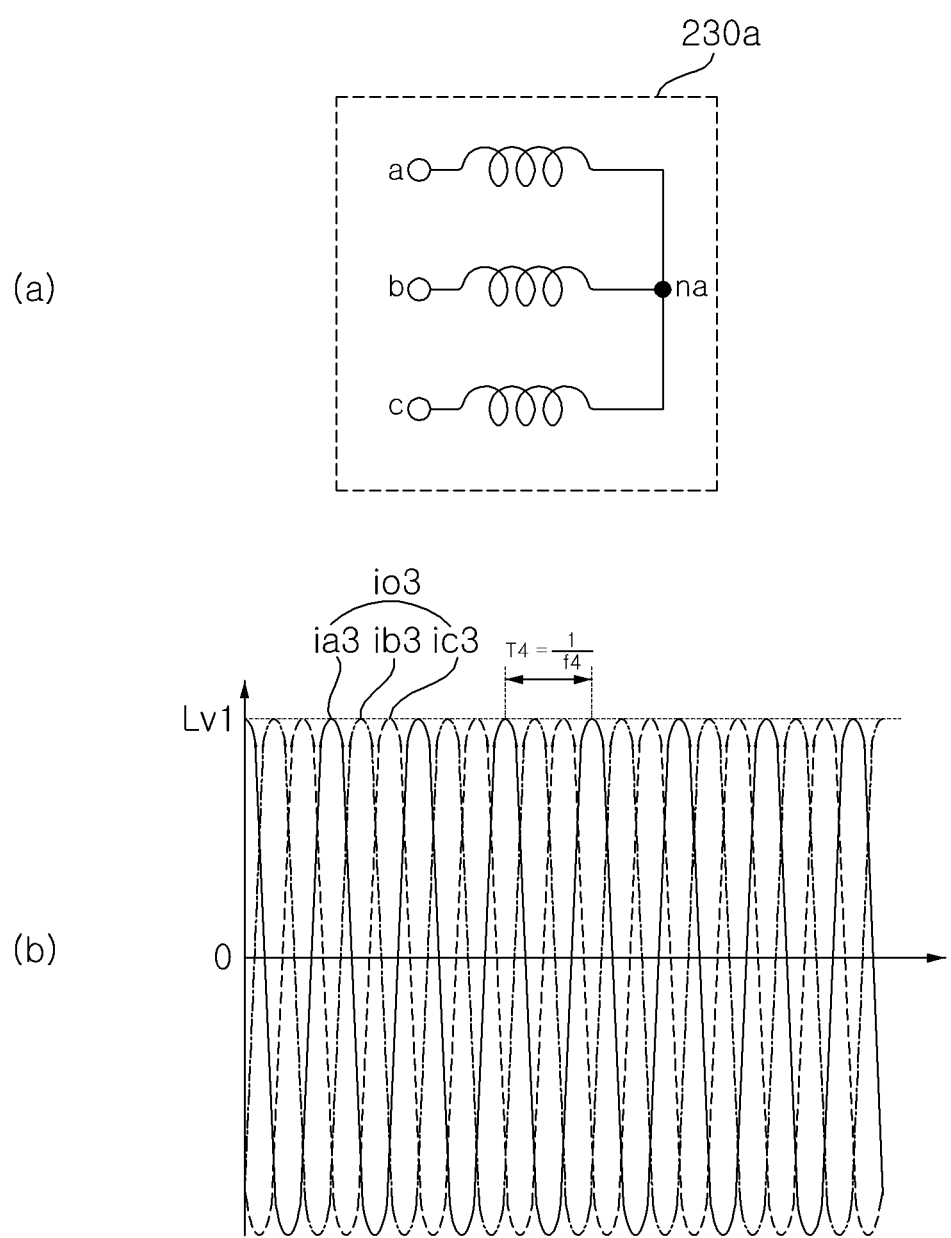

The output current waveform output from the inverter 420 may be illustrated as io3, as shown in FIG. 14B(b).

The output current waveform io3 output from the inverter 420 may include a-phase output current waveform ia3, b-phase output current waveform ib3, and c-phase output current waveform ic3 that have the same size and different phases.

Meanwhile, the inverter controller 430 may calculate the neutral point voltage of the multi-phase motor 230*a*.

For example, the inverter controller 430 may calculate the neutral point voltage Vna of the multi-phase motor 230*a*, based on the DC terminal voltage (Vdc1+Vdc2), and the current io3 detected by the first current detector E1 or each phase current ia3, ib3, ic3.

Specifically, the inverter controller 430 may calculate the neutral point voltage Vna of the multi-phase motor 230*a* based on the phase voltage Van, Vbn, Vcn of the multi-phase motor 230*a*.

The following Equation 5 represents the calculation of the neutral point voltage Vna of the multi-phase motor 230*a*.

$$Vna = (Van + Vbn + Vcn)/3 \qquad \text{[Equation 5]}$$

Here, Vna indicates the neutral point voltage of the multi-phase motor 230*a*, Van indicates the voltage between node a and node n, Vbn indicates the voltage between node b and node n, and Vcn indicates the voltage between node c and node n.

Meanwhile, since there are two capacitors disposed in the DC terminal, it is necessary to calculate the DC terminal neutral point voltage Vn.

Accordingly, the inverter controller 430 may calculate the DC terminal neutral point voltage Vn, based on the DC terminal voltage (Vdc1+Vdc2).

Specifically, the inverter controller 430 may calculate the DC terminal neutral point voltage Vn, based on a first DC voltage Vdc1 from a first voltage detector B1 for detecting the DC voltage of both ends of the first capacitor, and a second DC voltage Vdc2 from a second voltage detector B2 for detecting the DC voltage of both ends of the second capacitor.

In addition, when driving only the multi-phase motor 230a, the inverter controller 430 may control the electric potential between the motor neutral point na and the DC terminal neutral point (n) to be the same.

That is, the inverter controller 430 may control the calculated neutral point voltage Vna of the multi-phase motor 230a and the calculated DC terminal neutral point voltage Vn to be identical.

Figure 14C:
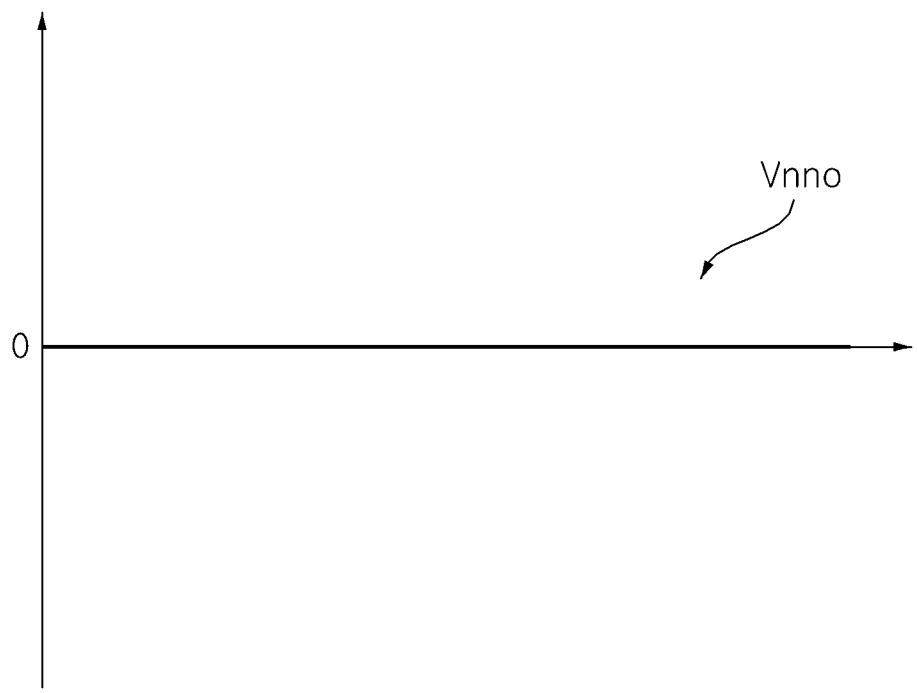

FIG. 14C illustrates that the voltage Vnno, which is the potential difference between a motor neutral point na and a DC terminal neutral point (n), has a level of zero.

Accordingly, the current io3 flowing through the internal coil of the multi-phase motor 230a of FIG. 14B(b) is completely consumed by the multi-phase motor 230a, and no current flows through the single-phase motor 230b.

Figure 14D:
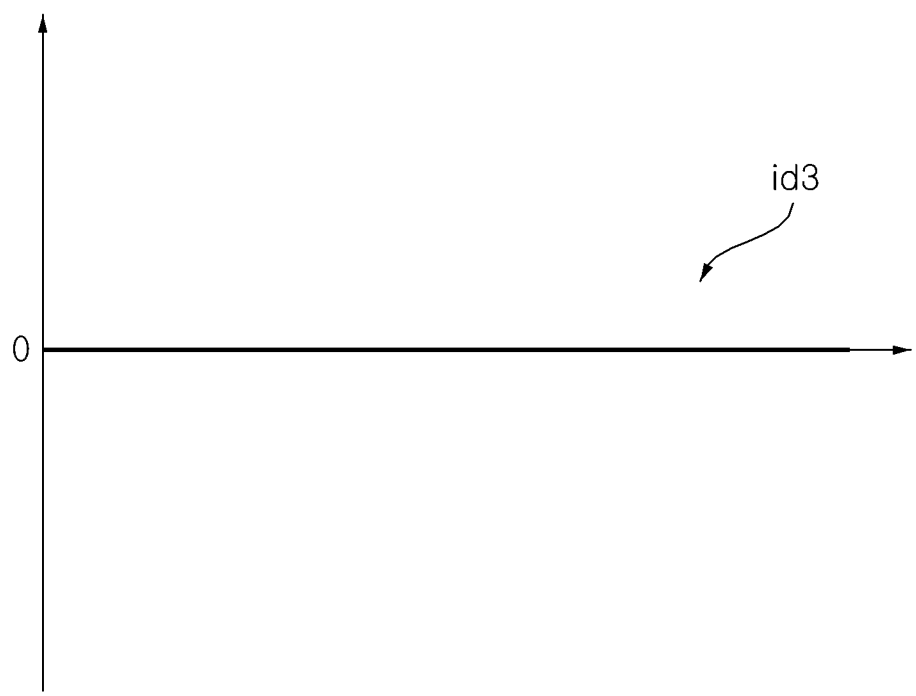

That is, as shown in FIG. 14D, the current flowing through the single-phase motor 230b or the effective current id3 becomes 0. Therefore, as shown in FIG. 14A, the single-phase motor 230b is stopped, and only the multi-phase motor 230a can rotate at the speed Wd.

Figure 15A:
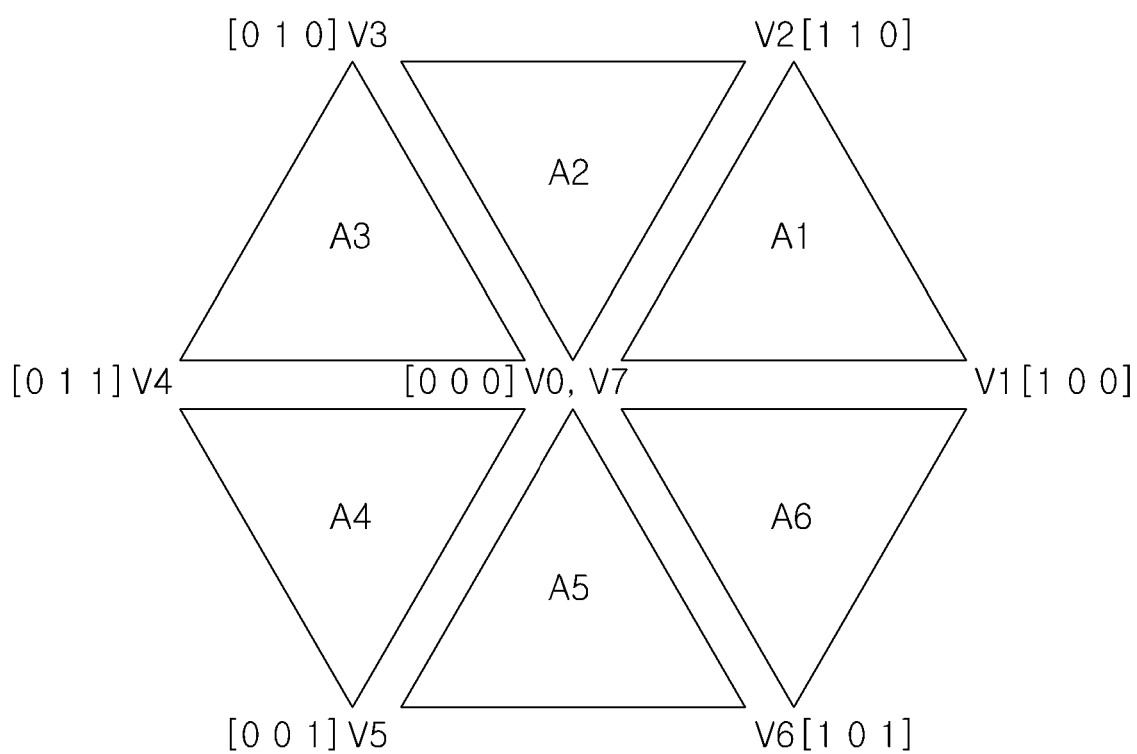
FIGS. 15A to 15C are diagrams for explaining an inverter switching based on a spatial vector.
Figure 15B:
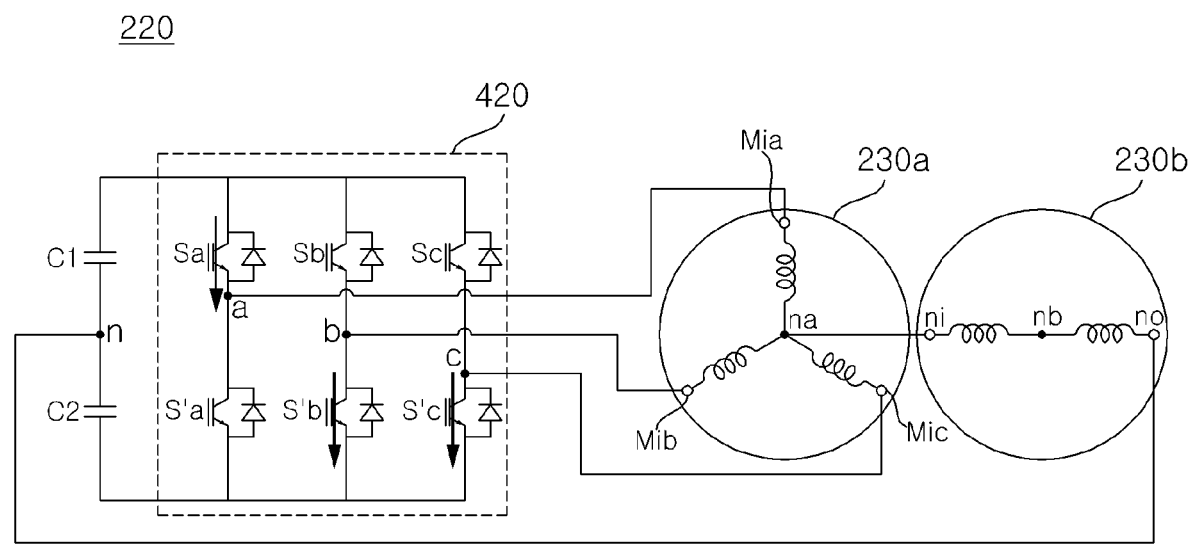
Figure 15C:
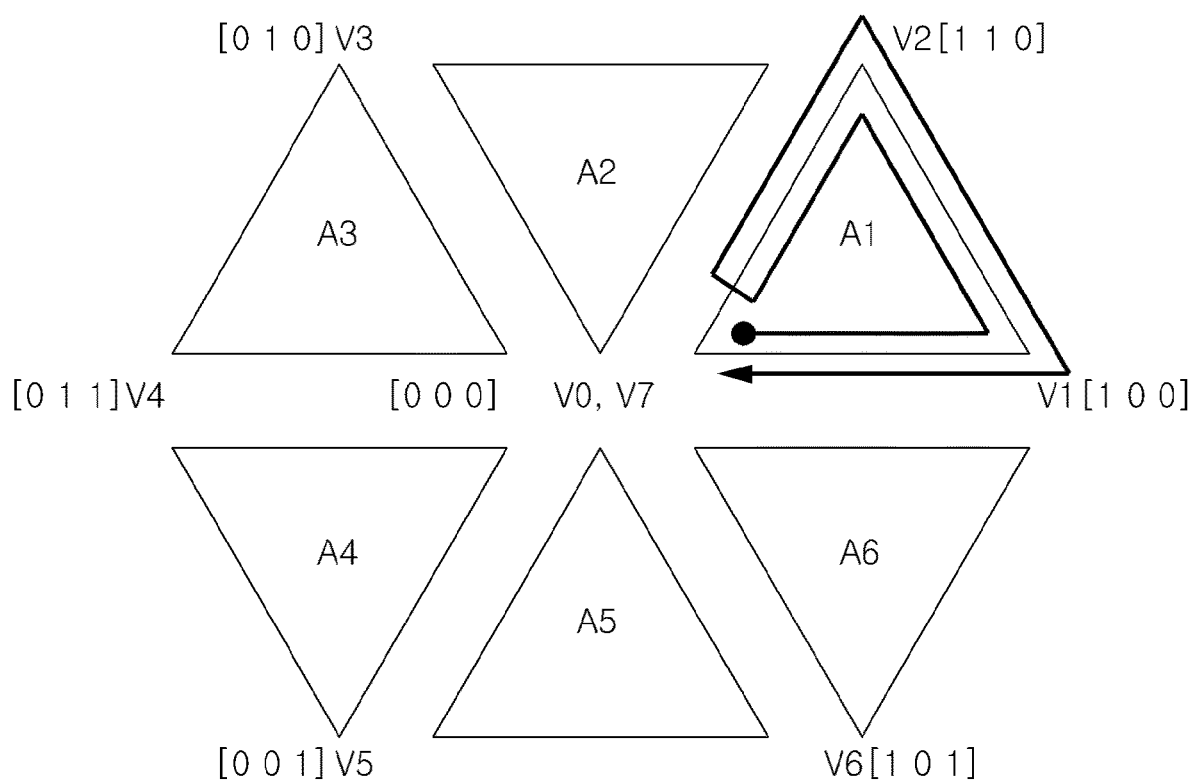

FIG. 15A to FIG. 15C are diagrams for describing inverter switching based on a spatial vector.

First, FIG. 15A illustrates six valid vectors and two zero vectors or invalid vectors.

Six valid vectors are illustrated as (1 0 0), (1 1 0), (0 1 0), (0 1 1), (0 0 1), (1 0 1), and the two zero vectors are illustrated as (0 0 0), (1 1 1).

According to the (1 0 0) vector, as shown in FIG. 15B, Sa, S'b, S'c switching elements are turned on, and S'a, Sb, Sc switching elements are turned off. Accordingly, the multi-phase motor 230a and the single-phase motor 230b can rotate.

Next, as shown in FIG. 15C, according to the (1 1 0) vector, Sa, Sb, S'c switching elements are turned on, and S'a, S'b, Sc switching elements are turned off. Accordingly, the multi-phase motor 230a and the single-phase motor 230b can rotate.

Figure 16A:
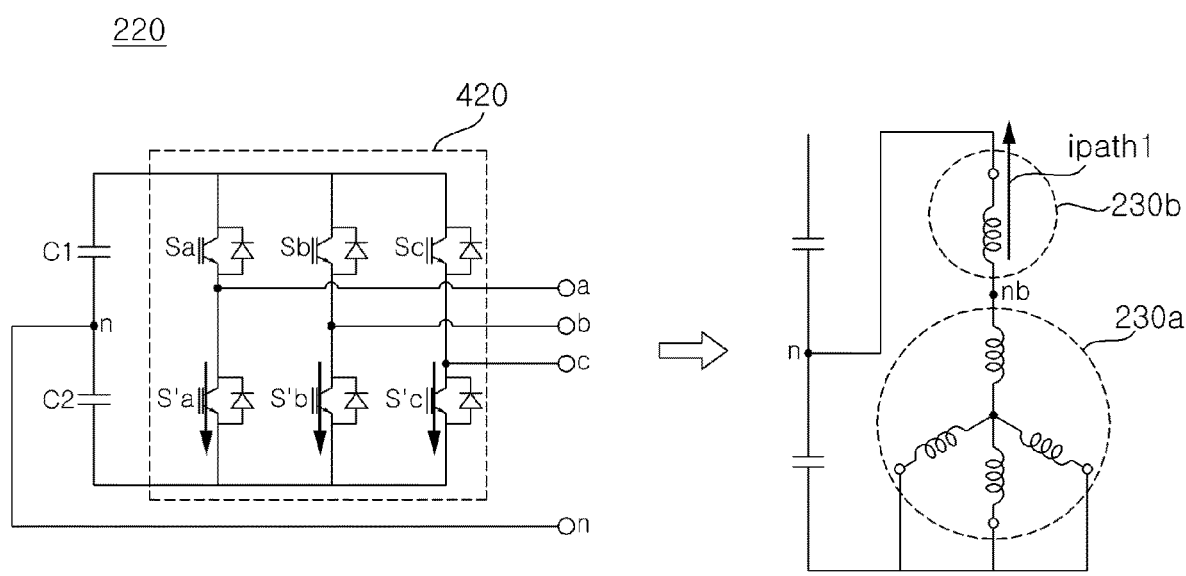
FIGS. 16A and 16B are diagrams for explaining an inverter switching based on a zero vector.

FIG. 16A illustrates that according to the (0 0 0) vector, the S'a, S'b, S'c switching elements are turned on, and the Sa, Sb, Sc switching elements are turned off. Accordingly, the multi-phase motor 230a is stopped, and only the single-phase motor 230b is rotated.

Accordingly, the current flowing through the single-phase motor 230b flows in the direction of ipat2l.

Figure 16B:
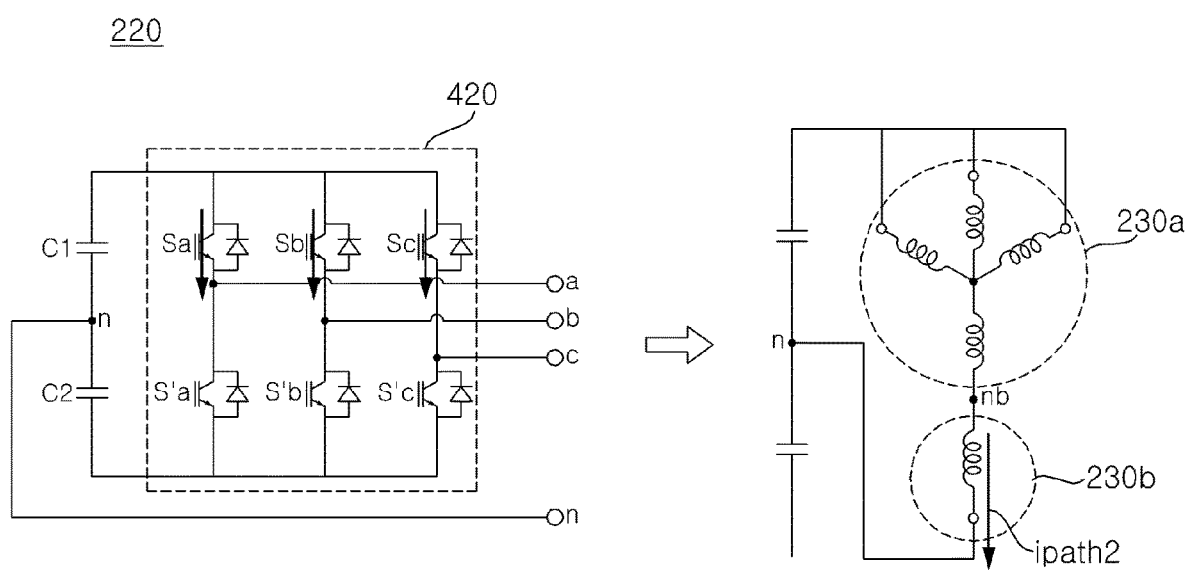

Next, FIG. 16B illustrates that according to the (1 1 1) vector, Sa, Sb, Sc switching elements are turned on, and S'a, S'b, S'c switching elements are turned off. Accordingly, the multi-phase motor 230a is stopped, and only the single-phase motor 230b is rotated.

As described above, by using the zero vector switching for the multi-phase motor 230a and the single-phase motor 230b serially connected, only the single-phase motor 230b can be driven.

Meanwhile, in the device for driving a plurality of motors 220 according to the embodiment of the present disclosure described in FIGS. 1 to 16B, it is preferable that the operation period of the single-phase motor 230b is shorter than that of the multi-phase motor 230a.

Accordingly, a plurality of motors serially connected with each other can be stably driven by using a single inverter.

Meanwhile, in the device for driving a plurality of motors 220 according to the embodiment of the present disclosure, it is preferable that the average effective current of the single-phase motor 230b is smaller than the average effective current of the multi-phase motor 230a.

Accordingly, a plurality of motors serially connected with each other can be stably driven by using a single inverter.

Meanwhile, in the device for driving a plurality of motors 220 according to an embodiment of the present disclosure, the multi-phase motor 230a may include a fan motor, and the single-phase motor 230b may include a pump motor.

It is preferable that the operation period of the fan motor of the multi-phase motor 230a is longer than that of the pump motor of the single-phase motor 230b.

The fan motor and the pump motor can be driven at different speeds at the same time. In addition, it is possible to drive at the same speed, and it is also possible to operate only the fan motor or the pump motor.

FIGS. 17A to 17D are diagrams for explanation related to the operation of a single-phase motor.

Figure 17A:
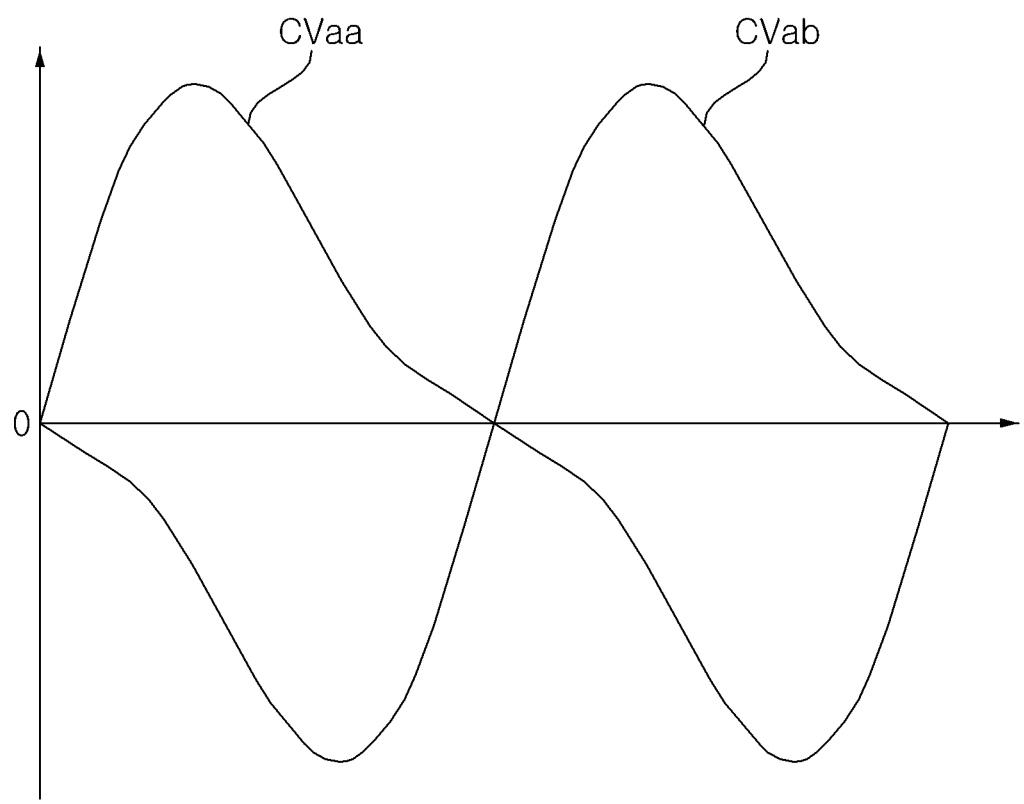
FIGS. 17A to 17D are diagrams for explanation related to the operation of a single-phase motor.

FIG. 17A is a diagram showing torque curves CVa and CVab according to the rotational position of the rotor of the single-phase motor.

Referring to the drawing, the torque of the single-phase motor has the smallest magnitude 0 when the rotor position is around 0 degrees, and then increases in magnitude. When the rotor position is around 90 degrees, the torque of the single-phase motor has a maximum, and then decreases. When the rotor position is around 180 degrees, the torque of the single-phase motor has a magnitude zero. When the rotor position is around 270 degrees, the single-phase motor has a maximum torque in the negative direction. Thereafter, when the rotor position is around 360 degrees, the torque of the single-phase motor has a magnitude zero.

Meanwhile, when the rotor position is around 0, 180, and 360 degrees, the torque has the smallest magnitude, so there is a disadvantage that it is difficult to start the single-phase motor. Therefore, a period for aligning the rotor of the single-phase motor at a separate position excluding the rotor positions 0, 180, 360 degrees is required.

For example, when the rotor position is around 90 degrees, the torque becomes a maximum. Therefore, the rotor position can be aligned to around 90 degrees during the period of aligning the rotor of the single-phase motor.

Meanwhile, when the stator or the like of the single-phase motor is symmetrical, it becomes difficult to control the rotor of the single-phase motor to rotate whether in a clockwise direction or in a counterclockwise direction. Accordingly, in order to control unidirectional rotation of the single-phase motor rather than bi-directional, an asymmetric design such as a stator is required.

Figure 17B:
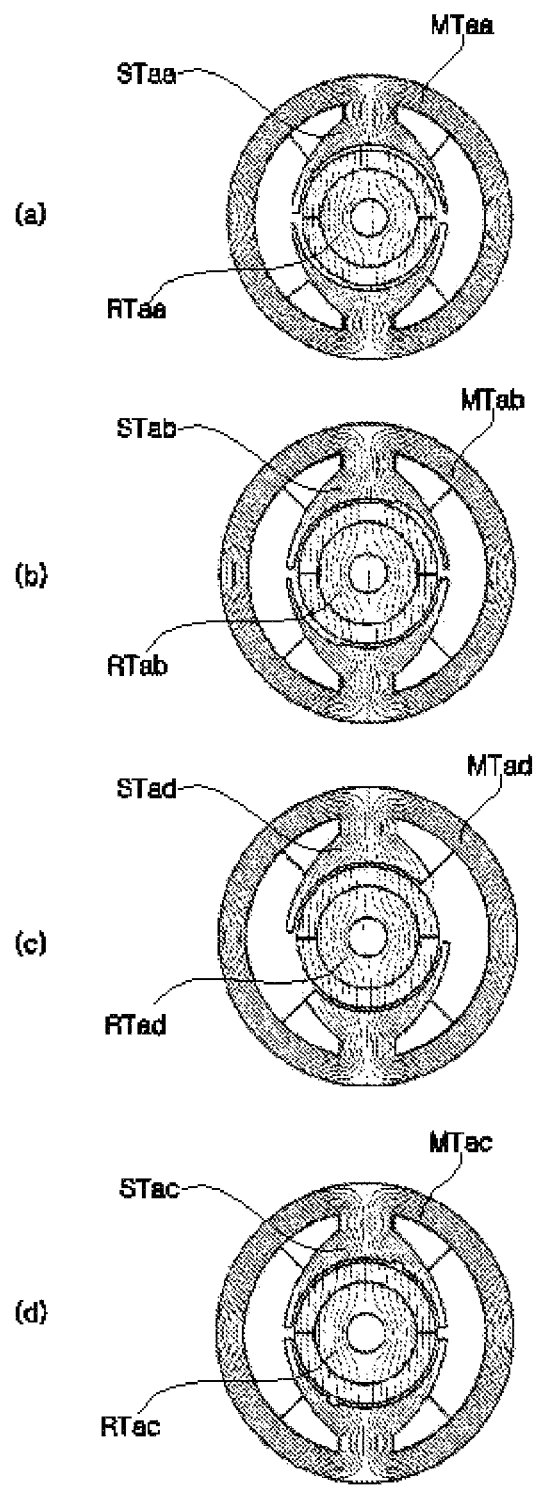

FIG. 17B is a diagram showing various asymmetric structures of a single-phase motor.

Referring to the drawing, the stator STaa is implemented asymmetrically in the rotor Rtaa and the stator STaa of the single-phase motor Mtaa of FIG. 17B(a). This asymmetric structure may be referred to as a Tapered structure.

Next, the stator STab is implemented asymmetrically in the rotor Rtab and the stator STab of the single-phase motor Mtab of FIG. 17B(b). This asymmetric structure may be referred to as a Stepped structure.

Next, the stator STac is implemented asymmetrically in the rotor Rtac and the stator STac of the single-phase motor Mtac of FIG. 17B(c). This asymmetric structure may be referred to as an Asymmetric structure.

Next, the stator STad is implemented asymmetrically in the rotor STad and the stator STad of the single-phase motor Mtad of FIG. 17B(d). This asymmetric structure may be referred to as a Slotted teeth structure.

Meanwhile, as shown in FIG. 17B, when designing a single-phase motor with an asymmetric structure, there is a disadvantage in that torque ripple occurs.

Therefore, when starting a single-phase motor, it is necessary to align the rotor at a specific position, by using a symmetrical single-phase motor.

Figure 17C:
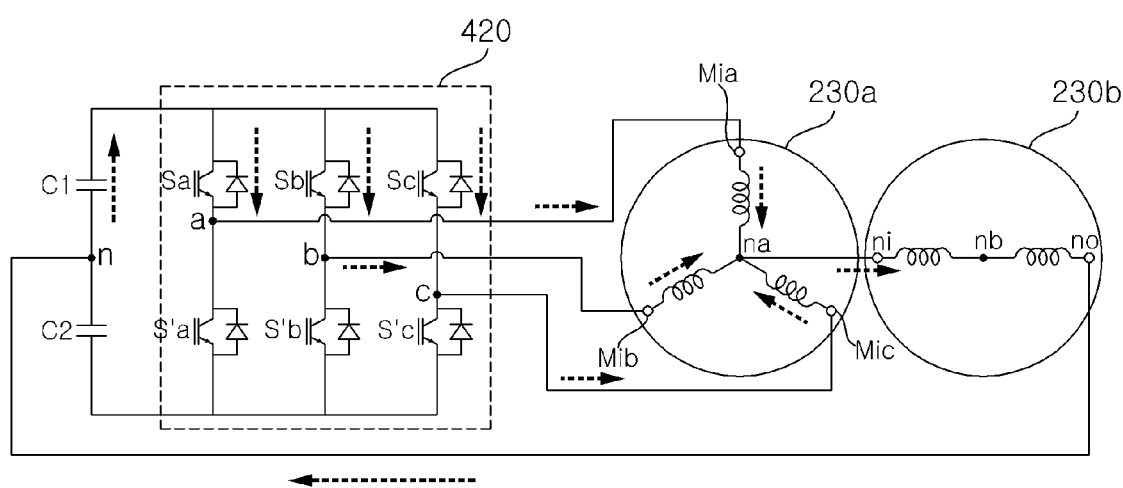

FIG. 17C illustrates that switching is performed to align the rotor at a specific position, for starting symmetrical or asymmetrical single-phase motor 230b, during the operation of the multi-phase motor 230a, by using a single inverter 420, in a device for driving a plurality of motors 220 according to an embodiment of the present disclosure.

In the drawing, it is illustrated that, by the switching vector of (1 1 1), only the upper arm switching elements Sa to Sc of the inverter 420 are turned on, and the lower arm switching elements S'a to S'c are turned off.

According to the zero vector switching, the rotating multi-phase motor 230a rotates directly without changing the speed, and the single-phase motor 230b aligns the rotor at a specific position. That is, according to the zero vector switching, rotational torque ripple of the rotating multi-phase motor 230a hardly occurs, and the single phase motor 230b can be stably started.

Figure 17D:
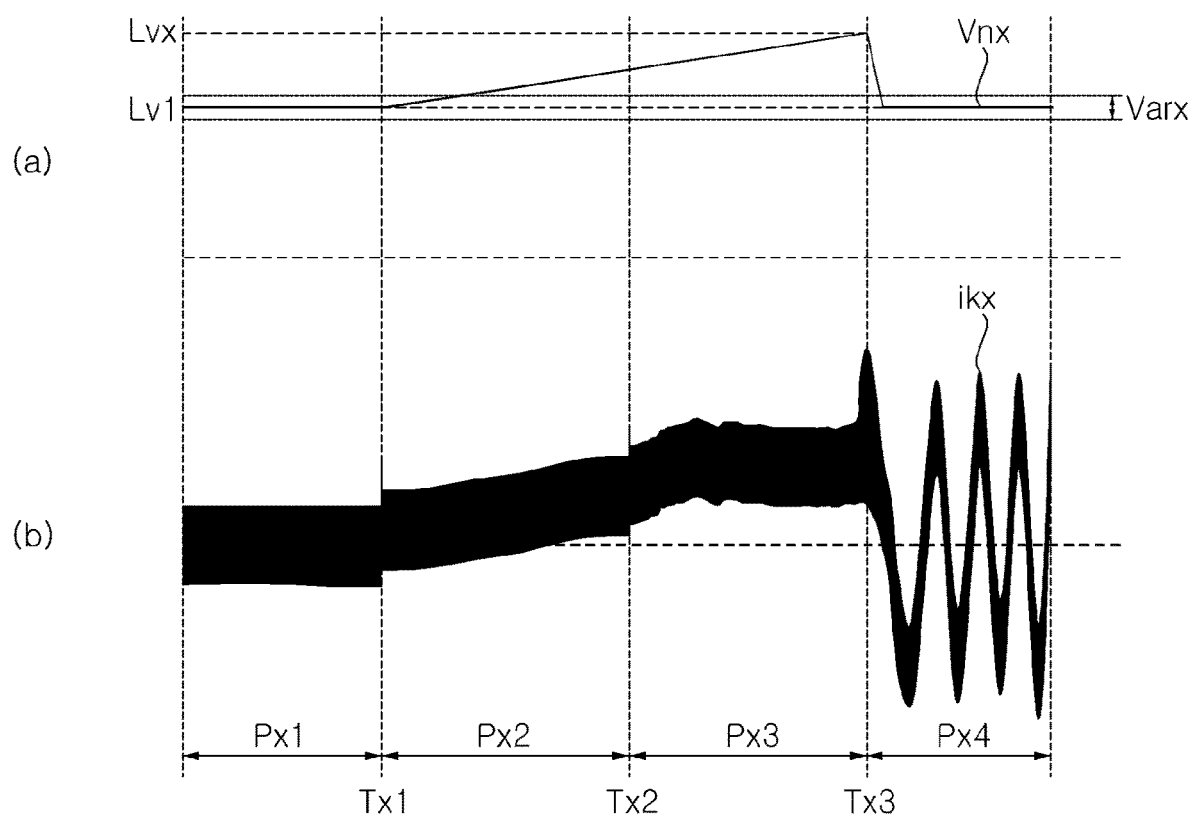

FIG. 17D illustrates the voltage waveform Vnx of the DC terminal neutral point (n) and the current waveform ikx flowing through the single-phase motor 230b, when the inverter 420 is switched by the switching vector of (1 1 1) of FIG. 17C.

Referring to the drawing, during the Px1 period, the voltage of the DC terminal neutral point (n) may be maintained within a certain range Varx based on a first level LV1.

Then, for starting the single-phase motor 230b, during the period Px2 and Px3, switching of the inverter 420 by the switching vector of (1 1 1) may be performed.

Accordingly, the current flowing into the single-phase motor 230b is shared by three upper-arm switching elements (Sa to Sc) by ⅓, through the first capacitor C1 that is the upper capacitor of the DC terminal neutral point (n). Thereafter, the currents are combined at the neutral point (na) of the multi-phase motor 230a to flow into the single-phase motor 230b.

That is, since the voltage of both ends of the first capacitor C1 which is the upper capacitor of the DC terminal neutral point (n) is not used, the voltage of both ends of the second capacitor C2 which is the lower capacitor of the DC terminal neutral point (n) increases.

Therefore, as shown in the drawing, during the periods Px2 and Px3, the voltage of the DC terminal neutral point (n) continuously increases.

As a result, in the case of aligning the single-phase motor, the voltage of the DC terminal neutral point (n) continuously increases, and thus, when the speed increases after the Px4 period, an unstable start is performed.

In the drawing, it is illustrated that a significantly high peak value occurs in the current waveform ikx around a time point Tx3. Accordingly, when the speed increases after the Px4 period, unstable start is performed.

Accordingly, the present disclosure proposes a method for stably starting a single-phase motor, by using a single inverter, in a device for driving a plurality of motors for controlling a multi-phase motor and a single-phase motor, during operation of the multi-phase motor, by compensating the voltage fluctuation of the DC terminal neutral point voltage generated during alignment of the rotor of the single-phase motor to reduce the current peak flowing through the single-phase motor. This will be described with reference to FIG. 18 and below.

Figure 18:
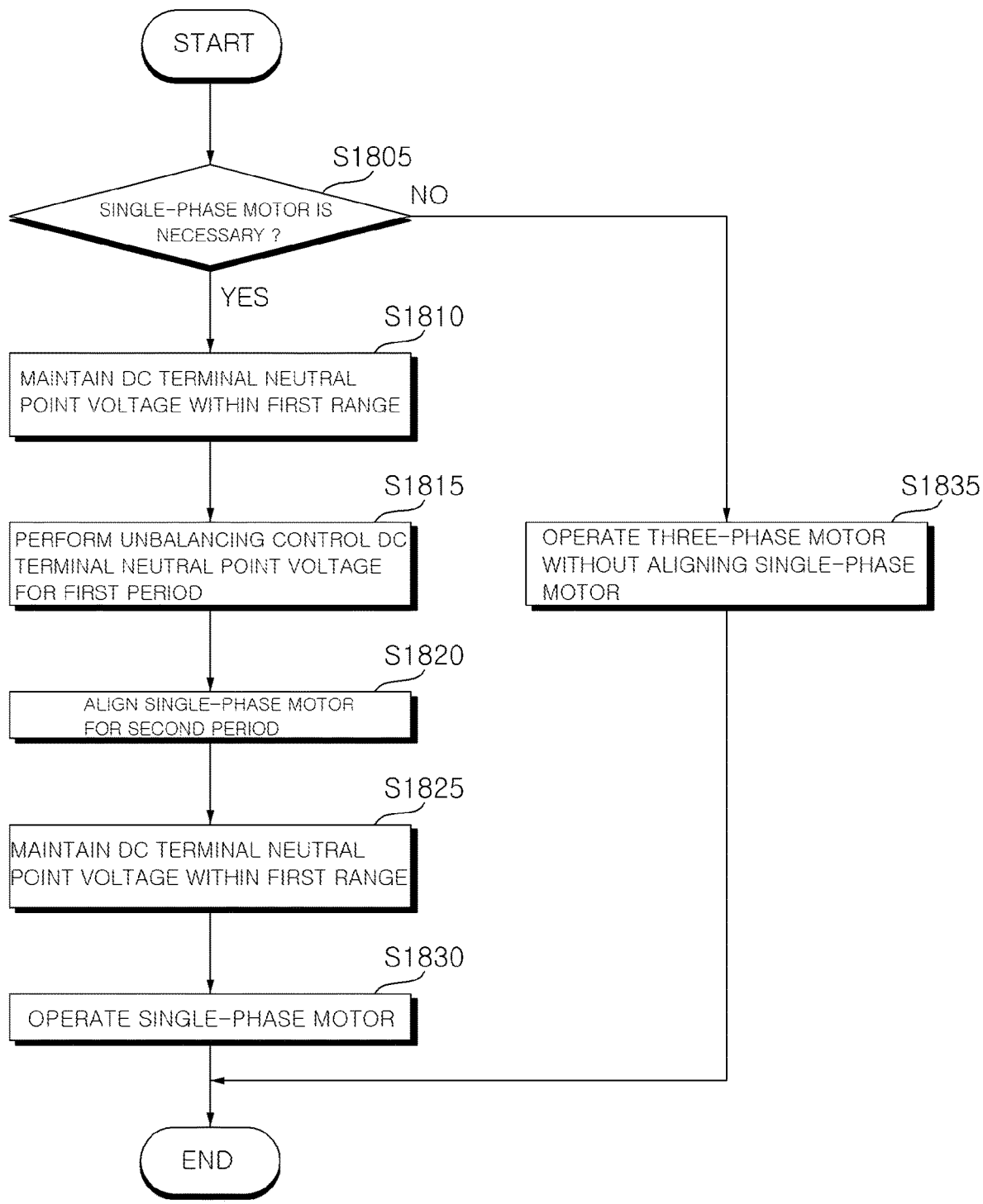
FIG. 18 is a flowchart of an operation method of a device for driving a plurality of motors according to an embodiment of the present disclosure.

FIG. 18 is a flowchart of an operation method of a device for driving a plurality of motors according to an embodiment of the present disclosure.

Referring to the drawing, the inverter controller 430 determines whether alignment of the single-phase motor 230b is necessary, during rotation of the multi-phase motor 230a (S1805).

For example, the inverter controller 430 may determine whether the operation of the single-phase motor 230b is necessary, during the operation of the multi-phase motor 230a.

Next, when the alignment of the single-phase motor 230b is required during the operation of the multi-phase motor 230a, the inverter controller 430 controls the voltage of the DC terminal neutral point (n) to maintain within a first range Vara based on a first level Lv1 (S1810).

The inverter controller 430 controls the voltage of both ends of the DC terminal to be within a certain range. In particular, the inverter controller 430 can control the voltage of the DC terminal neutral point (n) to maintain within the first range Vara based on the first level Lv1.

For example, the inverter controller 430 may include a neutral point voltage controller that controls the voltage of the DC terminal neutral point (n), and turns on the neutral point voltage controller, so that the voltage of the DC terminal neutral point (n) may be controlled to maintain within the first range Vara based on the first level Lv1.

Next, the inverter controller 430 performs unbalancing control of the voltage of the DC terminal neutral point (n) (S1815).

As illustrated in FIG. 17D, when the single phase motor 230b is aligned, the voltage of the DC terminal neutral point (n) is changed. In FIG. 17D, it is illustrated that during the periods Px2 and Px3, the voltage of the DC terminal neutral point (n) increases.

Accordingly, it is preferable that when aligning the single-phase motor 230b, the inverter controller 430 performs the unbalancing control of the voltage of the DC terminal neutral point (n), in order to compensate the voltage fluctuation of the voltage of the DC terminal neutral point (n).

Here, the unbalancing control of the voltage of the DC terminal neutral point (n) may mean to control the voltage of the DC terminal neutral point (n) to be varied in the opposite direction to the voltage fluctuation direction of the DC terminal neutral point (n), when the single-phase motor 230b is aligned.

For example, the inverter controller 430 may turn on the neutral point voltage controller, and may control to perform compensation control of the voltage of the DC terminal neutral point (n).

For example, when aligning the single-phase motor 230b, if the voltage of the DC terminal neutral point (n) increases, the inverter controller 430 may control the voltage of the DC terminal neutral point (n) to be decreased, through an unbalancing control.

As another example, when aligning the single-phase motor 230b, if the voltage of the DC terminal neutral point (n) decreases, the inverter controller 430 may control the voltage of the DC terminal neutral point (n) to be increased, through the unbalancing control.

Next, the inverter controller 430 aligns the rotor of the single-phase motor 230*b* (S1820).

For example, for the alignment of the rotor of the single-phase motor 230*b*, the inverter controller 430 may control all of a plurality of upper arm switching elements (Sa to Sc) of the inverter 420 to be turned on, and may control all of a plurality of lower arm switching elements (S'a to S'c) of the inverter 420 to be turned off.

Specifically, according to the switching vector based on zero vector (1 1 1), the inverter controller 430 may control all of a plurality of upper arm switching elements (Sa to Sc) to be turned on, and may control all of a plurality of lower arm switching elements (S'a to S'c) of the inverter 420 to be turned off.

As another example, for the alignment of the rotor of the single-phase motor 230*b*, the inverter controller 430 may control all of a plurality of upper arm switching elements (Sa to Sc) of the inverter 420 to be turned off, and may control at least a part of a plurality of lower arm switching elements (S'a to S'c) of the inverter 420 to be turned on.

Specifically, according to the switching vector based on zero vector (0 0 0), the inverter controller 430 may control all of a plurality of upper arm switching elements (Sa to Sc) to be turned off, and may control all of a plurality of lower arm switching elements (S'a to S'c) of the inverter 420 to be turned on.

Meanwhile, the inverter controller 430 may turn off the neutral point voltage controller, when aligning the rotor of the single-phase motor 230*b*.

Next, the inverter controller 430 controls the voltage of the DC terminal neutral point (n) to maintain within the first range Vara based on the first level Lv1 (S1825).

Then, the inverter controller 430 operates the single-phase motor 230*b* to control the rotation speed to be increased (S1830).

For example, after the unbalancing control, if the rotor alignment of the single-phase motor 230*b* is performed, the inverter controller 430 may control the voltage of the DC terminal neutral point (n) to maintain within the first range Vara based on the first level Lv1.

At this time, the inverter controller 430 may turn on the neutral point voltage controller, when aligning the rotor of the single-phase motor 230*b*.

Meanwhile, after performing the alignment of the rotor, if the voltage of the DC terminal neutral point (n) is maintained within the first range Vara based on the first level Lv1, for a certain period, the inverter controller 430 may operate the single-phase motor 230*b* and control to increase the rotation speed. Accordingly, the single-phase motor 230*b* can be stably operated while the multi-phase motor 230*a* is rotating.

Meanwhile, at step 1805 (S1805), when the alignment of the single-phase motor is not required, that is, when the driving of the single-phase motor is not required, the multi-phase motor may be continuously operated without aligning the single-phase motor (S1835).

Figure 19A:
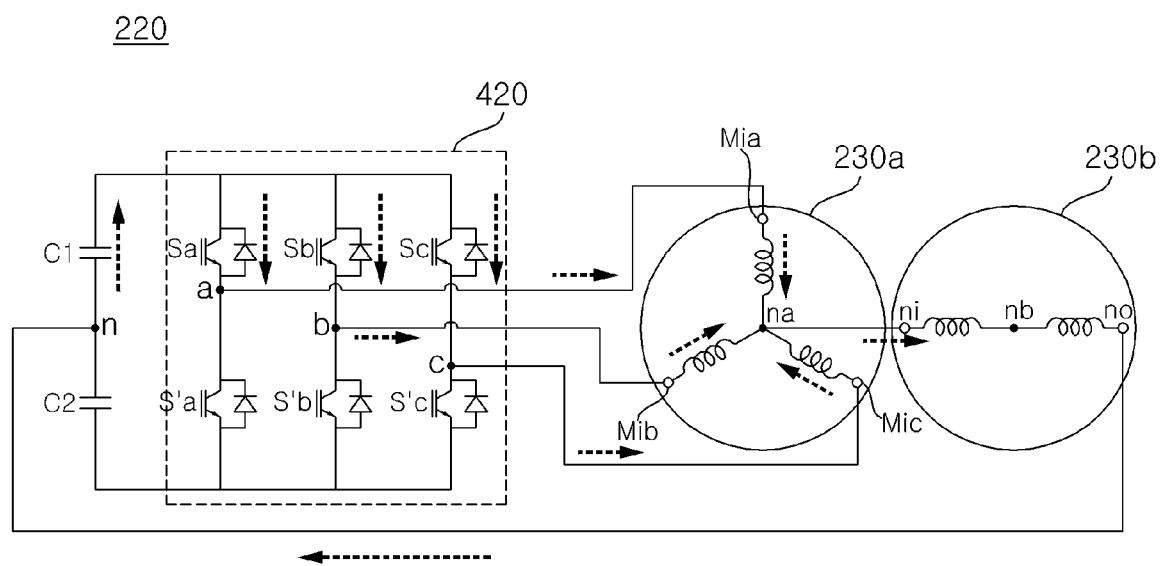
FIGS. 19A to 23 are diagrams for explanation of FIG. 18.

FIG. 19A illustrates that, according to the switching vector of (1 1 1), all of a plurality of upper arm switching elements (Sa to Sc) are turned on, and all of a plurality of lower arm switching elements (S'a to S'c) of the inverter 420 are turned off.

Accordingly, although a current flows through the multi-phase motor 230*a*, the switching vector of (1 1 1) corresponds to a zero vector. Therefore, the rotating multi-phase motor 230*a* directly rotates without a speed change, and the rotor of the single-phase motor 230*b* is aligned in a specific position (e.g. maximum torque position).

Meanwhile, in the device for driving motor 220*xc* of FIG. 2C, when the three-phase motor Mxca is rotated, if the inverter 420*xc* is driven by a switching vector of (1 1 1), only two legs (Sa and S'a, Sb and S'b) among three legs (Sa and S'a, Sb and S'b, Sc and S'c) are used for the three-phase motor Mxca. Therefore, a significant large torque ripple is generated.

However, in the device for driving motor 220 of FIG. 19A, when the multi-phase motor 230*a* is rotated, if the inverter 420 is driven by a switching vector of (1 1 1), all three legs (Sa and S'a, Sb and S'b, Sc and S'c) are used for the multi-phase motor 230*a*. Therefore, according to the zero vector switching, when the multi-phase motor 230*a* rotates, torque ripple is hardly generated and the rotational speed is remained intactly.

Meanwhile, as shown in FIG. 19A, when aligning the rotor of the single-phase motor 230*b*, the voltage of the DC terminal neutral point (n) changes, so it is preferable that the above-described unbalancing control is performed.

Figure 19B:
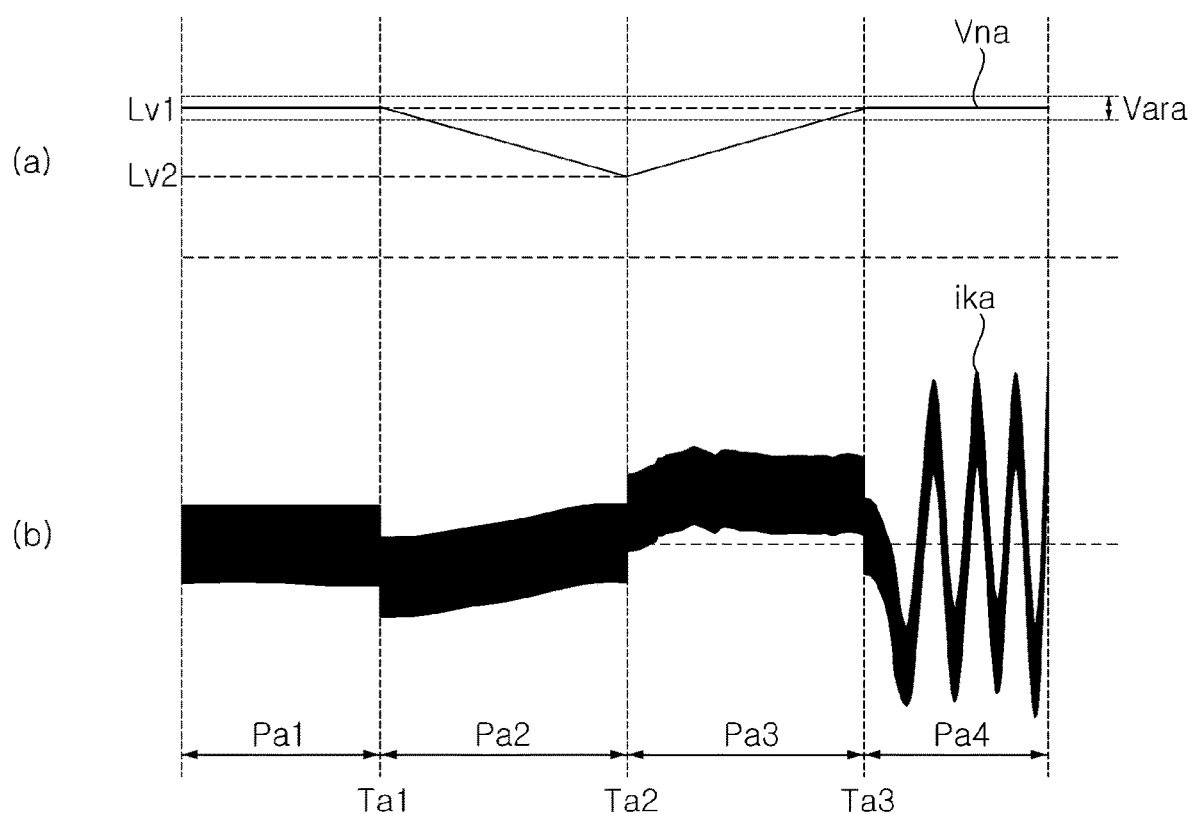

FIG. 19B illustrates the voltage change waveform Vna of the DC terminal neutral point (n) when starting the single phase motor 230*b*, and the current waveform ika flowing through the single phase motor 230*b* according to an embodiment of the present disclosure.

Referring to the drawing, for starting the single-phase motor 230*b* during rotation of the multi-phase motor 230*a*, the inverter controller 430 controls to perform an alignment period Pa3 for the rotor alignment of the single-phase motor 230*b*, and a voltage compensation period Pa2 for compensating the voltage change of the DC terminal neutral point (n) between the first capacitor C1 and the second capacitor C2 according to the rotor alignment of the single-phase motor 230*b*.

At this time, as shown in the drawing, the voltage compensation period Pa2 may be performed first, and then, the alignment period Pa3 may be performed.

Meanwhile, for stable rotor alignment, it is preferable that the alignment period Pa3 is performed for more than a switching period of the inverter 420. For example, preferably, it is performed for approximately two or three seconds or more.

Meanwhile, when the voltage of the DC terminal neutral point (n) increases during the alignment period Pa3, the inverter controller 430 may control the voltage of the DC terminal neutral point (n) to decrease during the voltage compensation period Pa2.

Accordingly, it is possible to compensate the voltage change in the start of the single-phase motor 230*b*. In particular, the multi-phase motor 230*a* and the single-phase motor 230*b* can be driven at different speeds by using a single inverter, and the voltage change in the start of the single-phase motor 230*b* can be compensated during rotation of the multi-phase motor 230*a*.

Meanwhile, as shown in FIG. 19B, in a pre-alignment constant voltage period Pal before the alignment period Pa3, when the voltage of the DC terminal neutral point (n) is within the first range Vara based on the first level Lv1, the inverter controller 430 may control the voltage compensation period Pa2 and the alignment period Pa3 to be sequentially performed.

Then, as shown in FIG. 19B, in a post-alignment constant voltage maintaining period Pa4 after the voltage compensation period Pa2, when the voltage of the DC terminal neutral point (n) is within the first range Vara based on the first level Lv1, the inverter controller 430 may control the speed of the single-phase motor 230*b* to increase, during rotation of the multi-phase motor 230*a*. Accordingly, it is possible to compensate a voltage change at the start of the single-phase motor 230b during rotation of the multi-phase motor 230a.

Meanwhile, unlike in FIG. 19B, in a pre-alignment constant voltage period Pa1 before the alignment period Pa3, when the voltage of the DC terminal neutral point (n) is within the first range Vara based on the first level Lv1, the inverter controller 430 may control the alignment period Pa3 and the voltage compensation period Pa2 to be sequentially performed. In a post-alignment constant voltage period Pa4 after the voltage compensation period Pa2, when the voltage of the DC terminal neutral point (n) is within the first range Vara based on the first level Lv1, the inverter controller 430 may control the speed of the single phase motor 230b to increase, during rotation of the multi-phase motor 230a. Accordingly, it is possible to compensate a voltage change at the start of the single-phase motor 230b during rotation of the multi-phase motor 230a.

Meanwhile, during the alignment period Pa3, the inverter controller 430 may control all of a plurality of upper arm switching elements (Sa~Sc) of the inverter 420 to be turned on, may control all of a plurality of lower arm switching elements (S'a~S'c) of the inverter 420 to be turned off, and may control the voltage of the DC terminal neutral point (n) to decrease, during the voltage compensation period Pa2. Accordingly, it is possible to compensate a voltage change at the start of the single-phase motor 230b during rotation of the multi-phase motor 230a.

Meanwhile, the inverter controller 430 may control the voltage of the DC terminal neutral point (n) to increase during the voltage compensation period Pa2, when the voltage of the DC terminal neutral point (n) decreases during the alignment period Pa3. Accordingly, it is possible to compensate a voltage change at the start of the single-phase motor 230b during rotation of the multi-phase motor 230a.

Meanwhile, as shown in FIG. 19B, in the pre-alignment constant voltage period Pa1 before the alignment period Pa3, when the voltage of the DC terminal neutral point (n) is within the first range Vara based on the first level Lv1, the inverter controller 430 may control the voltage compensation period Pa2 and the alignment period Pa3 to be sequentially performed. In the post-alignment constant voltage period Pa4 after the voltage compensation period Pa2, when the voltage of the DC terminal neutral point (n) is within the first range Vara based on the first level Lv1, the inverter controller 430 may control the speed of the single phase motor 230b to increase, during rotation of the multi-phase motor 230a. Accordingly, it is possible to stably start the single-phase motor 230b after compensating a voltage change when starting the single-phase motor 230b, during rotation of the multi-phase motor 230a.

Meanwhile, unlike in FIG. 19B, in a pre-alignment constant voltage period Pa1 before the alignment period Pa3, the inverter controller 430 may control the alignment period Pa3 and the voltage compensation period Pa2 to be sequentially performed, when the voltage of the DC terminal neutral point (n) is within the first range Vara based on the first level Lv1. In a post-alignment constant voltage period Pa4 after the voltage compensation period Pa2, when the voltage of the DC terminal neutral point (n) is within the first range Vara based on the first level Lv1, the inverter controller 430 may control the speed of the single-phase motor 230b to increase, during rotation of the multi-phase motor 230a. Accordingly, it is possible to stably start the single-phase motor 230b after compensating a voltage change when starting the single-phase motor 230b, during rotation of the multi-phase motor 230a.

Meanwhile, during the alignment period Pa3, the inverter controller 430 may control all of a plurality of lower arm switching elements (S'a~S'c) of the inverter 420 to be turned on, may control all of a plurality of upper arm switching elements (Sa~Sc) of the inverter 420 to be turned off, and may control the voltage of the DC terminal neutral point (n) to increase, during the voltage compensation period Pa2.

This will be described with reference to FIGS. 20A to 20B.

Figure 20A:
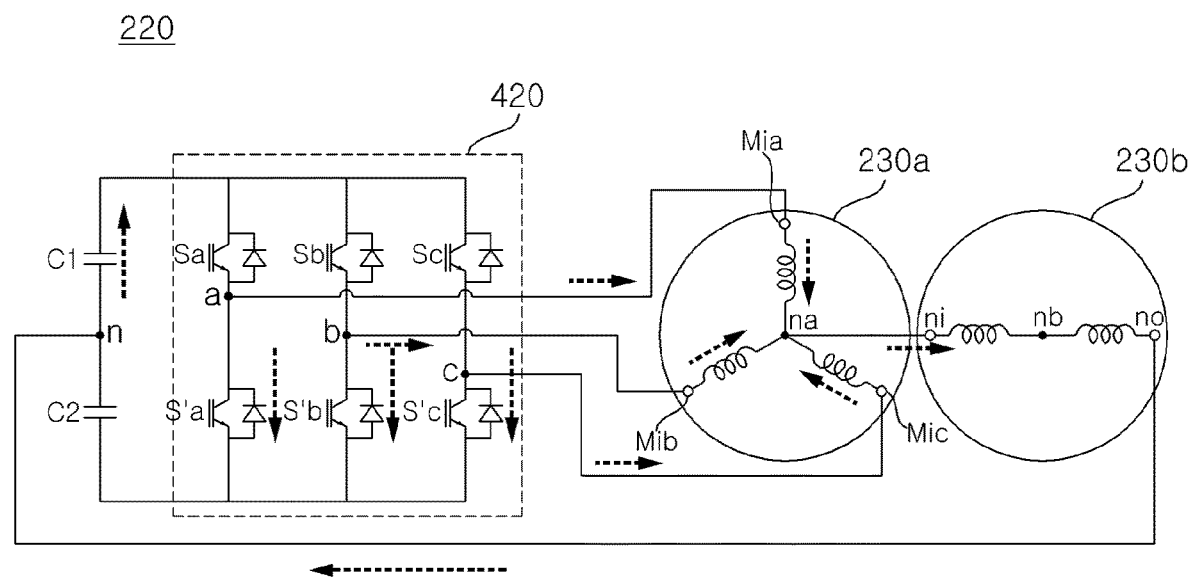

FIG. 20A illustrates that, according to the switching vector (0 0 0), all of a plurality of upper arm switching elements (Sa~Sc) are turned off, and all of a plurality of lower arm switching elements (S'a~S'c) of the inverter 420 are turned on.

Accordingly, a current flows through the multi-phase motor 230a, but the switching vector of (0 0 0) corresponds to a zero vector. Therefore, the multi-phase motor 230a is stopped, and the rotor of the single-phase motor 230b is aligned in a specific position (e.g. maximum torque position).

Meanwhile, in the device for driving motor 220xc of FIG. 2C, when the three-phase motor Mxca is rotated, if the inverter 420xc is driven by a switching vector of (0 0 0), only two legs (Sa and S'a, Sb and S'b) among three legs (Sa and S'a, Sb and S'b, Sc and S'c) are used for the three-phase motor Mxca. Therefore, a significant large torque ripple is generated.

However, in the device for driving motor 220 of FIG. 20A, when the multi-phase motor 230a is rotated, if the inverter 420 is driven by a switching vector of (0 0 0), all three legs (Sa and S'a, Sb and S'b, Sc and S'c) are used for the multi-phase motor 230a. Therefore, according to the zero vector switching, when the multi-phase motor 230a rotates, torque ripple is hardly generated and the rotational speed is remained intactly.

Meanwhile, as shown in FIG. 20A, when aligning the rotor of the single-phase motor 230b, the voltage of the DC terminal neutral point (n) is changed. Accordingly, it is preferable to perform the above-described balancing control.

Figure 20B:
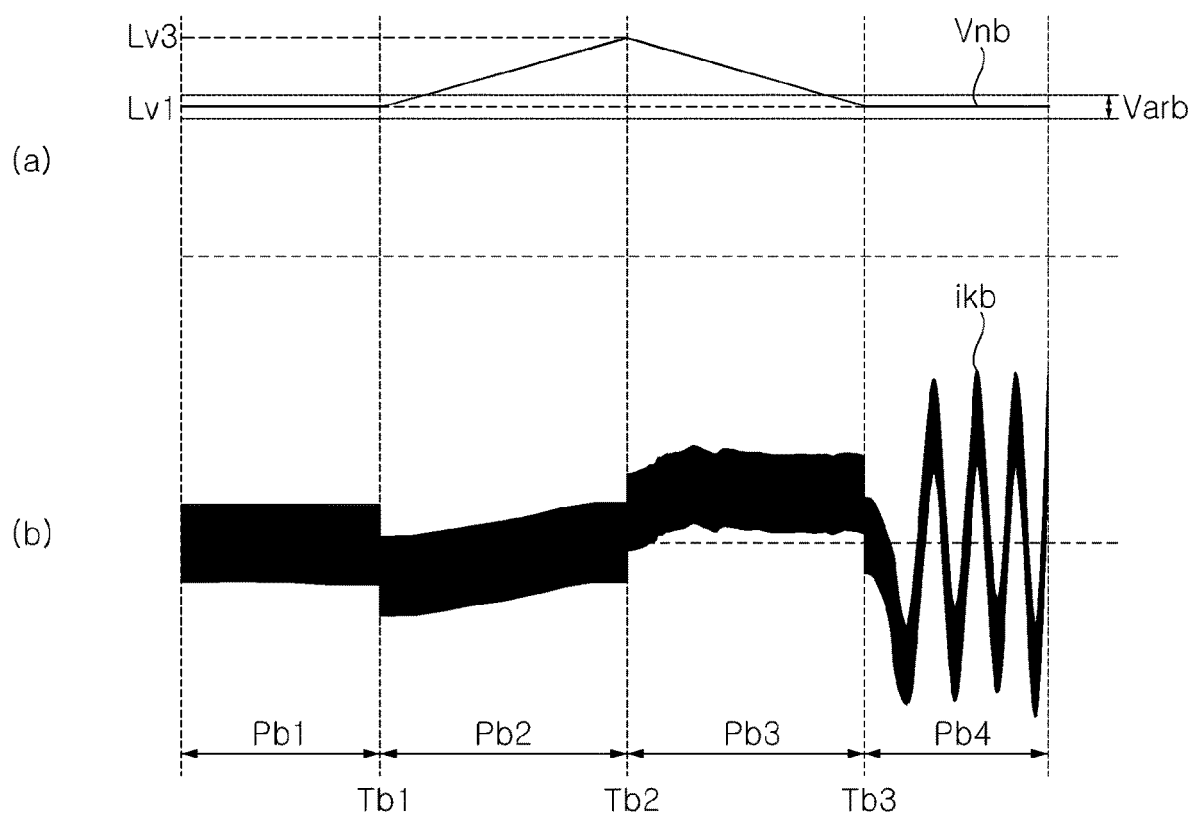

FIG. 20B illustrates the voltage change waveform Vnb of the DC terminal neutral point (n) when starting the single phase motor 230b, and the current waveform ikb flowing through the single phase motor 230b according to an embodiment of the present disclosure.

Referring to the drawing, for starting the single-phase motor 230b during rotation of the multi-phase motor 230a, the inverter controller 430 controls to perform an alignment period Pb3 for the rotor alignment of the single-phase motor 230b, and a voltage compensation period Pb2 for compensating the voltage change of the DC terminal neutral point (n) between the first capacitor C1 and the second capacitor C2, in the rotor alignment of the single-phase motor 230b.

At this time, as shown in the drawing, the voltage compensation period Pb2 may be performed first, and then, the alignment period Pb3 may be performed.

Meanwhile, when the voltage of the DC terminal neutral point (n) decreases during the alignment period Pb3, the inverter controller 430 may control the voltage of the DC terminal neutral point (n) to increase during the voltage compensation period Pb2.

Accordingly, it is possible to compensate the voltage change in the start of the single-phase motor 230b, during the rotation of the multi-phase motor 230a. In particular, the multi-phase motor 230a and the single-phase motor 230b can be driven at different speeds by using a single inverter, and the voltage change in the start of the single-phase motor 230b can be compensated during rotation of the multi-phase motor 230a.

Meanwhile, as shown in FIG. 20B, in a pre-alignment constant voltage period Pb1 before the alignment period Pb3, when the voltage of the DC terminal neutral point (n) is within the first range Vara based on the first level Lv1, the inverter controller 430 may control the voltage compensation period Pb2 and the alignment period Pb3 to be sequentially performed.

Then, as shown in FIG. 20B, in a post-alignment constant voltage maintaining period Pa4 after the voltage compensation period Pb2, when the voltage of the DC terminal neutral point (n) is within the first range Vara based on the first level Lv1, the inverter controller 430 may control the speed of the single-phase motor 230b to increase, during rotation of the multi-phase motor 230a. Accordingly, it is possible to compensate a voltage change at the start of the single-phase motor 230b during rotation of the multi-phase motor 230a.

Meanwhile, the inverter controller 430 may change the voltage compensation period according to the amount of the voltage change of the DC terminal neutral point (n) between the first capacitor C1 and the second capacitor C2 during the alignment period, or may change the voltage change amount due to voltage compensation. Accordingly, it is possible to adaptively compensate the voltage change of the DC terminal neutral point (n) when aligning the single-phase motor 230b during the operation of the multi-phase motor 230a.

Meanwhile, as the amount of the voltage change of the DC terminal neutral point n between the first capacitor C1 and the second capacitor C2 during the alignment period increases, the inverter controller 430 may control to extend the voltage compensation period or to increase the voltage change amount of voltage change according to the voltage compensation. Accordingly, it is possible to adaptively compensate the voltage change of the DC terminal neutral point (n) when aligning the single-phase motor 230b during the operation of the multi-phase motor 230a.

This will be described with reference to FIGS. 21A to 21D.

Figure 21A:
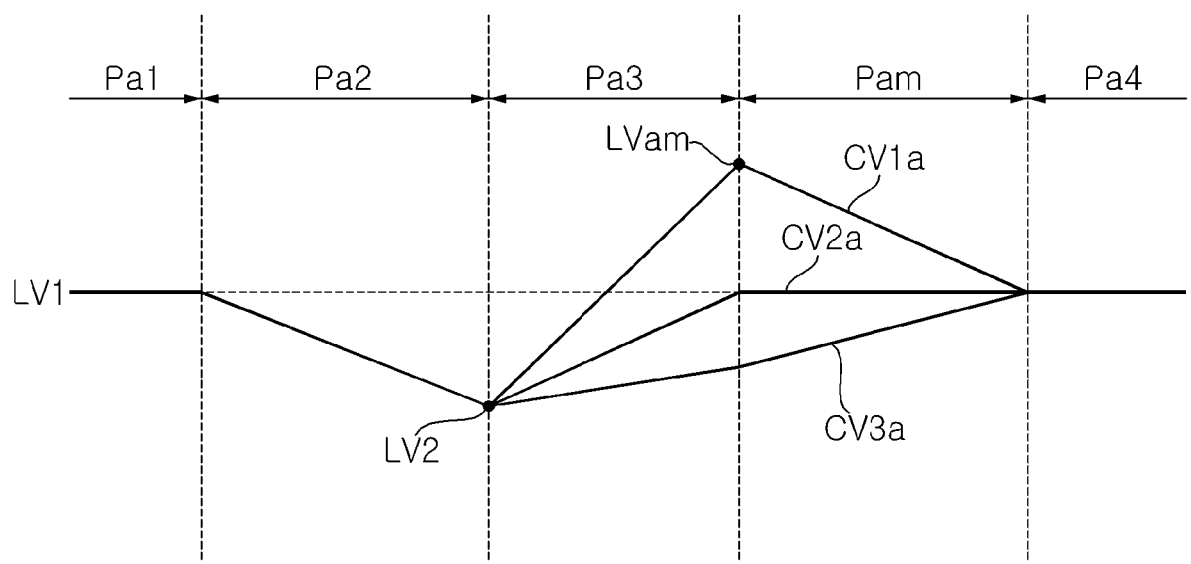

FIG. 21A illustrates the voltage change waveforms (CV1a to CV3a) of the DC terminal neutral point (n) when all of a plurality of upper arm switching elements (Sa to Sc) are turned on, and all of a plurality of lower arm switching elements (S'a to S'c) of the inverter 420 are turned off, according to the switching vector of (1 1 1), as shown in FIG. 19A.

In FIG. 21A, Pa1 may be a pre-alignment constant voltage period, Pa2 is a voltage compensation period, Pa3 is an alignment period, Pam may be a post-alignment voltage compensation period or a post-alignment constant voltage period, and Pa4 may be a post-alignment constant voltage period.

Meanwhile, CV2a among the voltage change waveforms (CV1a to CV3a) of the DC terminal neutral point (n) may be the same as Vna in FIG. 19B. Accordingly, in CV2a, Pam can be used as a post-alignment constant voltage period.

Meanwhile, in the end of the voltage compensation period Pa2, in a state where the voltage of the DC terminal neutral point (n) is Lv1, during the alignment period P3, the amount of the voltage change of the DC terminal neutral point (n) increases, and in the case of the LVam voltage greater than LV1 in the end of the alignment period Pa3, the inverter controller 430 may control the voltage level of LVam to decrease to the voltage level of LV1 during the post-alignment voltage compensation period Pam.

That is, in the case of CV1a among the voltage change waveforms (CV1a to CV3a), since the voltage change rate during alignment is greater than CV2a, it is preferable that the inverter controller 430 controls the voltage level of LVam to decrease to the voltage level of LV1 during the post-alignment voltage compensation period Pam.

That is, in the case of CV1a, unlike CV2a, Pam can be used as the post-alignment voltage compensation period. Therefore, in the case of CV2a, the voltage compensation period is Pa2. However, in the case of CV1a, the voltage compensation period may be prolonged Pa2 and Pa4.

That is, the inverter controller 430 may control to increase the voltage compensation period, as the amount of the voltage change of the DC terminal neutral point (n), during the alignment period Pa3, increases. Accordingly, it is possible to adaptively compensate the voltage change of the DC terminal neutral point (n) when aligning the single-phase motor 230b during the operation of the multi-phase motor 230a.

Meanwhile, in the case of CV3a among the voltage change waveforms (CV1a to CV3a), the voltage change rate during alignment is smaller in comparison with CV2a. Therefore, it is preferable that during the post-alignment voltage compensation period Pam, the inverter controller 430 controls the voltage change amount of voltage change according to the voltage compensation to be smaller, so that the voltage level increases to the voltage level of LV1.

Figure 21B:
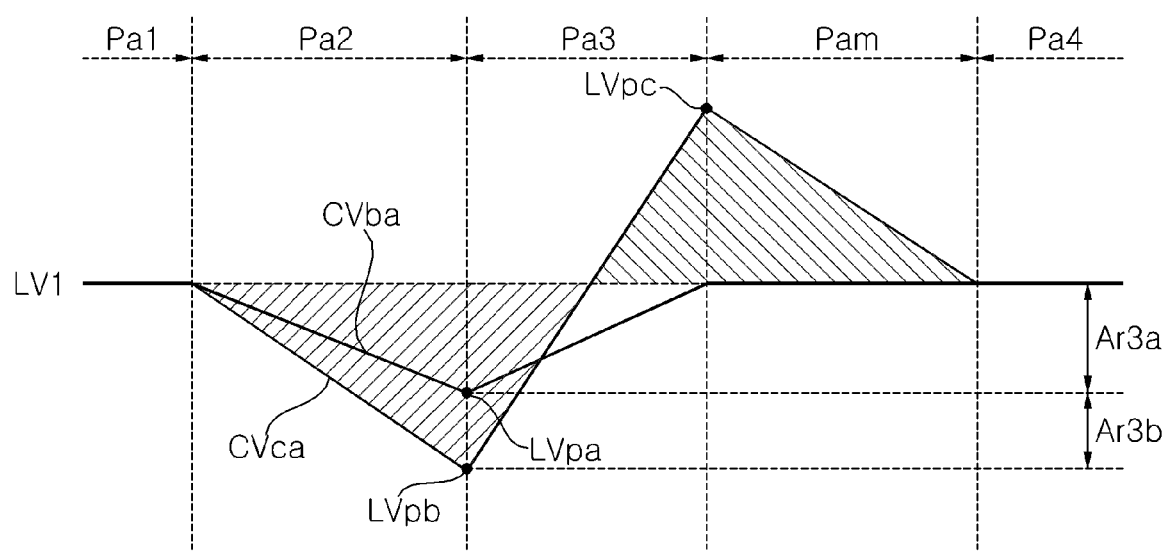

FIG. 21B illustrates voltage change waveforms (CVba, CVca) of the DC terminal neutral point (n), when all of a plurality of upper arm switching elements Sa to Sc are turned on, and all of a plurality of lower arm switching elements (S'a to S'c) of the inverter 420 are turned off, according to the switching vector of (1 1 1), as shown in FIG. 19A.

Meanwhile, CVba among voltage change waveforms (CVba, CVca) of the DC terminal neutral point (n) may be similar to Vna of FIG. 19B. However, there is a difference in that the voltage level in the end of the voltage compensation period Pa2 is LVpa, not LV2.

During the voltage compensation period Pa2, the operation of decreasing from the voltage level of LV1 to LVpa may correspond to an area Ar3a in which weak field control is possible.

Meanwhile, it is illustrated that among the voltage change waveforms (CVba, CVca) of the DC terminal neutral point (n), the voltage change rate of CVca is greater in comparison with CVba.

According to CVca, it decreases from the voltage level of LV1 to LVpb during the voltage compensation period Pa2, increases from the voltage level of LVpb to LVpc during the alignment period Pa3, and decreases from the voltage level of LVpc to the voltage level of LV1 during the post-alignment voltage compensation period Pam.

At this time, during the voltage compensation period Pa2, the operation of decreasing from the voltage level of LV1 to LVpb may correspond to an area Ar3b in which field control is not possible.

As a result, the inverter controller 430 may control the voltage change amount due to voltage compensation to increase, during Pa2 period or Pa4 period, as the amount of the voltage change of the DC terminal neutral point (n), during the alignment period Pa3, increases. Accordingly, it is possible to adaptively compensate the voltage change of the DC terminal neutral point (n) when aligning the single-phase motor 230b during the operation of the multi-phase motor 230a.

Figure 21C:
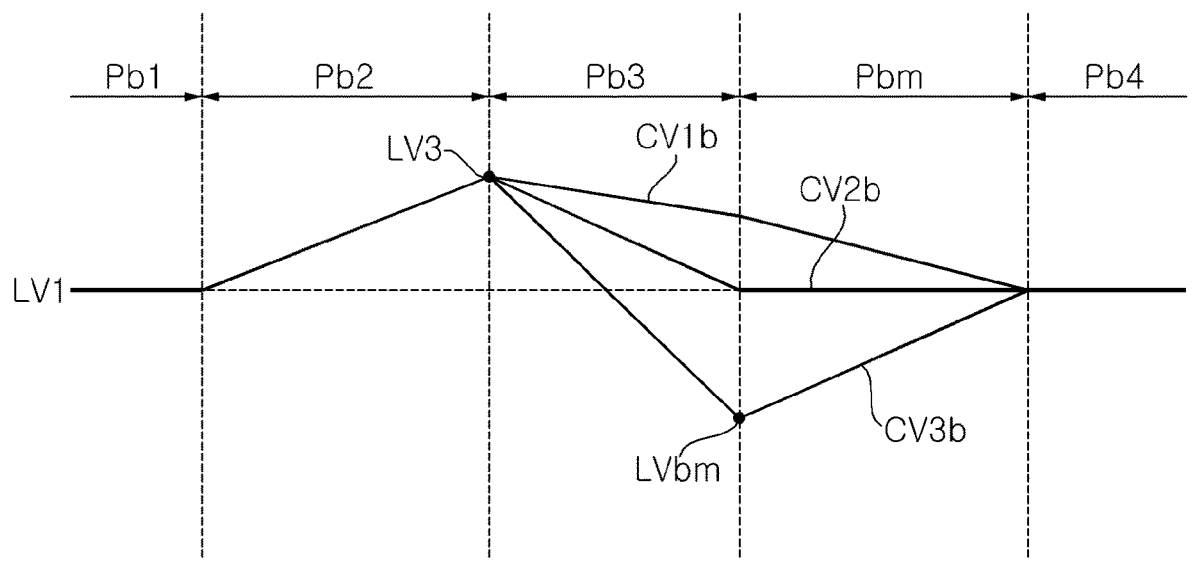

FIG. 21C illustrates the voltage change waveforms (CV1b to CV3b) of the DC terminal neutral point (n) when all of a plurality of upper arm switching elements (Sa to Sc) are turned off, and all of a plurality of lower arm switching elements (S'a to S'c) of the inverter 420 are turned on, according to the switching vector of (0 0 0), as shown in FIG. 20A.

In FIG. 21C, Pb1 may be a pre-alignment constant voltage period, Pb2 is a voltage compensation period, Pb3 is an alignment period, Pbm may be a post-alignment voltage compensation period or a post-alignment constant voltage period, and Pb4 may be a post-alignment constant voltage period.

Meanwhile, CV2b among the voltage change waveforms (CV1b to CV3b) of the DC terminal neutral point (n) may be the same as Vnb in FIG. 20B. Accordingly, in CV2b, Pbm can be used as a post-alignment constant voltage period.

Meanwhile, in the end of the voltage compensation period Pb2, in a state where the voltage of the DC terminal neutral point (n) is Lv1, during the alignment period P3, the amount of the voltage change of the DC terminal neutral point (n) increases, and in the case of the LVbm voltage that is greater than LV1 in the end of the alignment period Pb3, the inverter controller 430 may control the voltage level of LVbm to increase to the voltage level of LV1 during the post-alignment voltage compensation period Pbm.

That is, in the case of CV3b among the voltage change waveforms (CV1b to CV3b), since the voltage change rate during alignment is greater than CV2b, it is preferable that the inverter controller 430 controls the voltage level of LVbm to increase to the voltage level of LV1 during the post-alignment voltage compensation period Pbm.

That is, in the case of CV1b, unlike CV2b, Pbm can be used as the post-alignment voltage compensation period. Therefore, in the case of CV2b, the voltage compensation period is Pb2. However, in the case of CV1b, the voltage compensation period may be prolonged Pb2 and Pb4.

That is, the inverter controller 430 may control to increase the voltage compensation period, as the amount of the voltage change of the DC terminal neutral point (n), during the alignment period Pb3, increases. Accordingly, it is possible to adaptively compensate the voltage change of the DC terminal neutral point (n) when aligning the single-phase motor 230b during the operation of the multi-phase motor 230a.

Meanwhile, in the case of CV1b among the voltage change waveforms (CV1b to CV3b), the voltage change rate during alignment is smaller in comparison with CV2b. Therefore, it is preferable that, during the post-alignment voltage compensation period Pbm, the inverter controller 430 controls the voltage level to decrease to the voltage level of LV1.

Figure 21D:
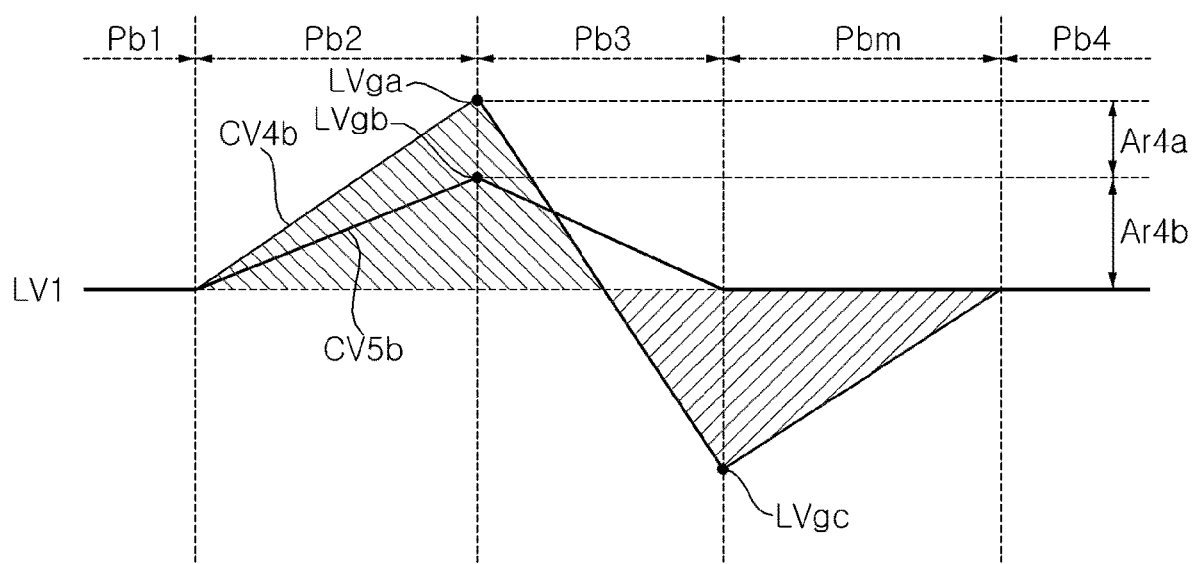

FIG. 21D illustrates voltage change waveforms (CV4b, CV5b) of the DC terminal neutral point (n), when all of a plurality of upper arm switching elements Sa to Sc are turned on, and all of a plurality of lower arm switching elements (S'a to S'c) of the inverter 420 are turned off, according to the switching vector of (0 0 0), as shown in FIG. 20A.

Meanwhile, CV5b among voltage change waveforms (CV4b, CV5b) of the DC terminal neutral point (n) may be similar to Vnb of FIG. 19B. However, there is a difference in that the voltage level in the end of the voltage compensation period Pb2 is LVgb, not LV3.

During the voltage compensation period Pb2, the operation of decreasing from the voltage level of LV1 to LVgb may correspond to an area Ar4b in which weak field control is possible.

Meanwhile, it is illustrated that among the voltage change waveforms (CV4b, CV5b) of the DC terminal neutral point (n), the voltage change rate of CV4b is greater in comparison with CV5b.

According to CV4b, it increases from the voltage level of LV1 to LVga during the voltage compensation period Pb2, decreases from the voltage level of LVga to LVgc during the alignment period Pb3, and r increases from the voltage level of LVgc to the voltage level of LV1 during the post-alignment voltage compensation period Pbm.

At this time, during the voltage compensation period Pb2, the operation of rising from the voltage level of LV1 to LVga may correspond to an area Ar4a in which field control is not possible.

As a result, the inverter controller 430 may control the voltage change amount due to voltage compensation to increase, during Pb2 period or Pb4 period, as the amount of the voltage change of the DC terminal neutral point (n), during the alignment period Pa3, increases. Accordingly, it is possible to adaptively compensate the voltage change of the DC terminal neutral point (n) when aligning the single-phase motor 230b during the operation of the multi-phase motor 230a.

Figure 22:
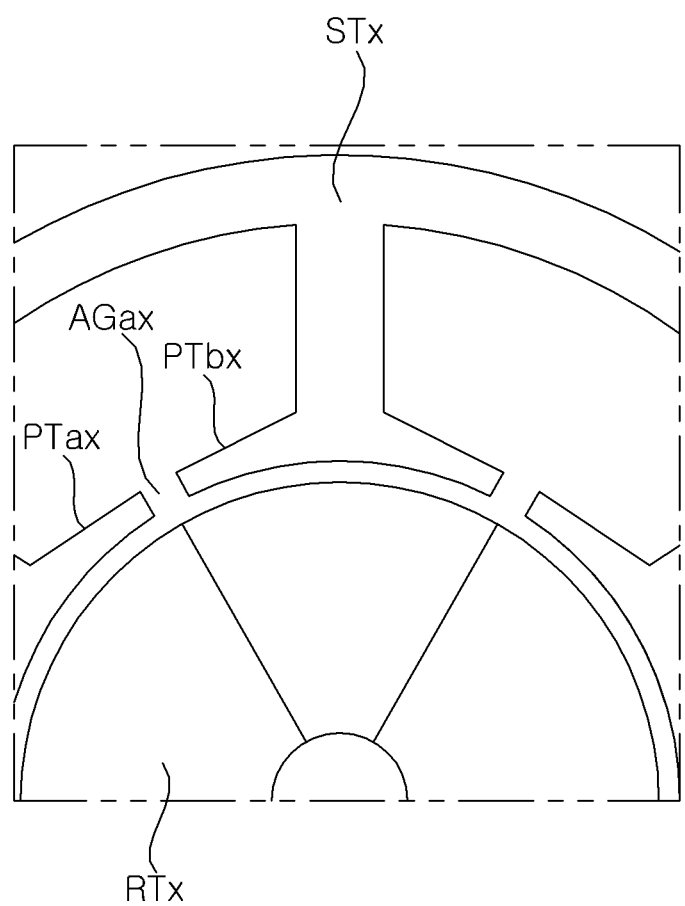

FIG. 22 shows an example of the structure of a single-phase motor related to the present disclosure.

Referring to the drawing, the single-phase motor MOTx may include a rotor RTx and a stator STx spaced apart from the rotor RTx and surrounding the rotor RTx.

The stator STx may include a cylindrical first portion Crx, a second portion VRx connected to the first portion Crx and extending from the first portion Crx in the direction of the rotor RTx, a third portion PTax extending from an end portion of the second portion VRx to both sides intersecting the second portion VRx, and a fourth portion PTbx.

In the drawing, it is illustrated that an air gap AGax is formed between the fourth portion PTbx and the adjacent third portion PTax.

Meanwhile, when the third portion PTax and the fourth portion PTbx are symmetrical based on the end portion of the second portion VRx, it is difficult to set the rotation directivity and a torque dead point of not starting may occur.

Accordingly, in the present disclosure, a single-phase motor can be designed such that the third portion PTa and the fourth portion PTb are asymmetrical based on the end portion of the second portion VR.

Figure 23:
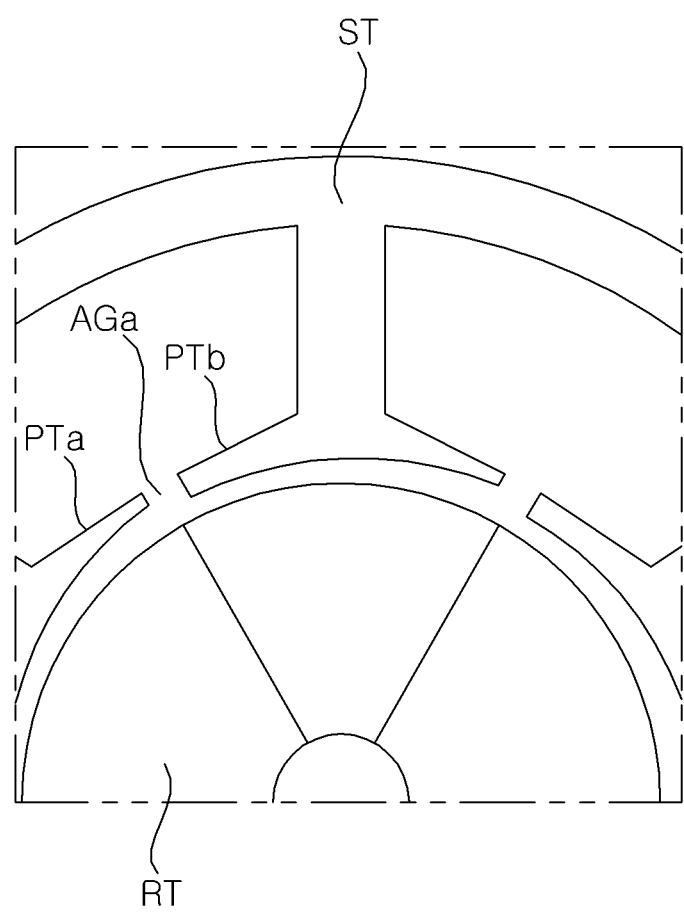

FIG. 23 shows an example of the structure of a single-phase motor related to the present disclosure.

Referring to the drawing, the single-phase motor MOT may include a rotor RT and a stator ST spaced apart from the rotor RT and surrounding the rotor RT.

The stator ST may include a cylindrical first portion Cr, a second portion VR connected to the first portion Cr and extending from the first portion Cr in the direction of the rotor RT, a third portion PTa extending from an end portion of the second portion VR to both sides intersecting the second portion VR, and a fourth portion PTb.

In the drawing, it is illustrated that an air gap AGa is formed between the fourth portion PTb and the adjacent third portion PTa.

Meanwhile, it is preferable that the third portion PTa and the fourth portion PTb are asymmetrical based on the end portion of the second portion VR.

Specifically, the thickness of the third portion PTa and the fourth portion PTb becomes thinner, as it get further away from the end portion of the second portion VR, and in particular, it is preferable that the thickness of the third portion PTa becomes thinner.

Accordingly, an asymmetric single-phase motor can be implemented, rotation directivity can be set, and a torque dead point of not starting can be removed.

Meanwhile, the above-described device for driving a plurality of motors 220 may be applied to various electric apparatuses. For example, it can be applied to a laundry treatment device, a dryer, a dishwasher, an air conditioner, a refrigerator, a water purifier, a cleaner, a vehicle, a robot, a drone, and the like, among electric apparatuses.

For example, an electric apparatus 200 is an electric device for user and, for example, a refrigerator (200a in FIG. 24), a washing machine (200b in FIG. 24), an air conditioner (200c in FIG. 24), a cooking appliance (200d in FIG. 24), a cleaner (200e in FIG. 24), and the like may be exemplified.

FIG. 24A to FIG. 24F are diagrams for explaining various examples of electric apparatuses.

Figure 24A:
FIGS. 24A to 24F are diagrams for explaining various examples of an electric apparatus.

First, FIG. 24A illustrates a laundry treatment device 200a as an example of an electric device. The laundry treatment device 200a may include a washing machine, a dryer, a clothing manager, and the like.

Figure 24B:
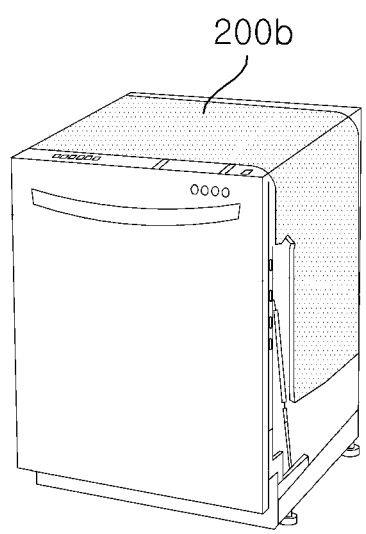
Figure 24C:
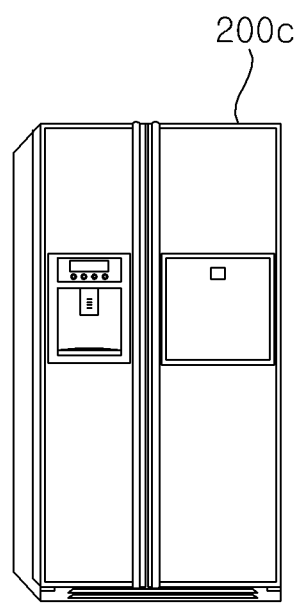
Figure 24D:
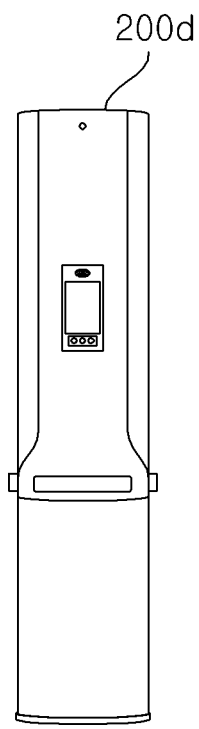

Next, FIG. 24B illustrates a dishwasher 200b as an example of the electric device, FIG. 24C illustrates a refrigerator 200c as an example of the electric device, and FIG. 24D is an air conditioner 200c as an example of the electric device.

Meanwhile, the air conditioner 200c may include an air conditioner, an air purifier, and the like.

Figure 24E:
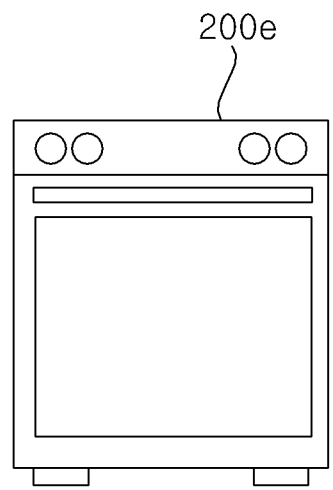
Figure 24F:
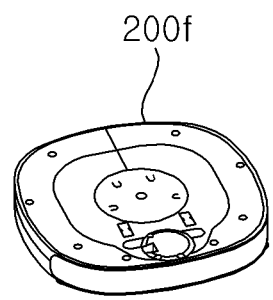

Next, FIG. 24E illustrates a cooking appliance 200d as an example of the electric device, and FIG. 24F illustrates a robot cleaner 200e as an example of the electric device.

Meanwhile, although not shown in FIGS. 24A to 24F, as an electric device, a water purifier, a vehicle, a robot, a drone, and the like may be included.

Figure 25:
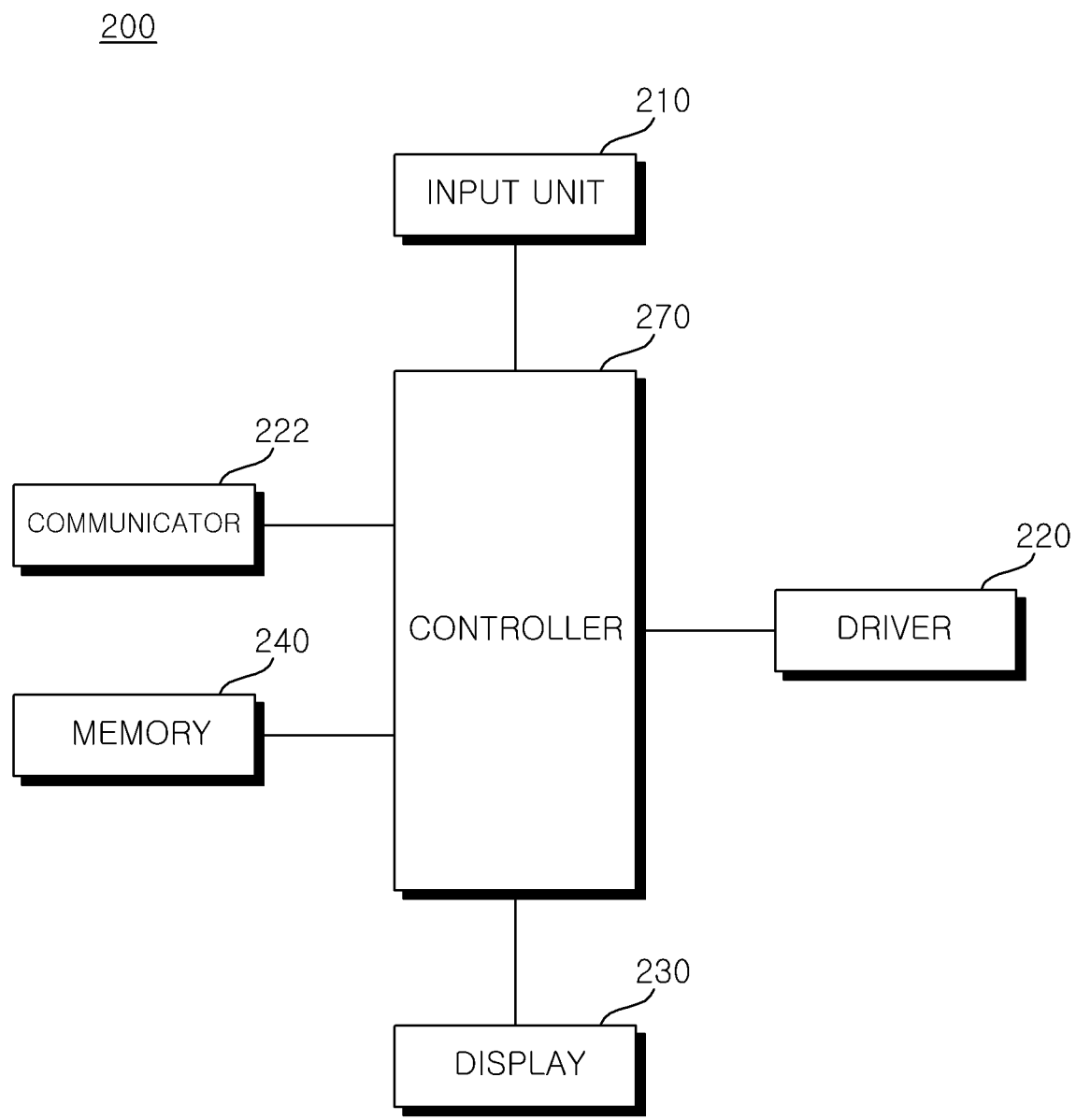
FIG. 25 is a simplified internal block diagram of the electric apparatus of FIGS. 24A to 24F.

FIG. 25 is a simplified internal block diagram of the electric apparatus of FIGS. 24A to 24F.

Referring to the drawing, the electric apparatus 200 may include an input unit 210 for user input, a display 230 for displaying an operating state of the electric apparatus, a communicator 222 for communicating with other external device, a driver 220 for driving an electric apparatus, and a controller 270 for internal control.

The driver 220 may correspond to the device for driving motor described above with reference to FIGS. 1 to 16B.

For example, when the electric device is a laundry treatment device 200a, the driver 220 may drive a fan motor and a pump motor that are electrically serially connected, by using a single inverter 420.

As another example, when the electric device is the dishwasher 200b, the driver 220 may drive a fan motor and a washing motor electrically serially connected, by using a single inverter.

As another example, when the electric device is the refrigerator 200c, the driver 220 may drive a plurality of fan motors electrically serially connected, by using a single inverter.

As another example, when the electric device is the air conditioner 200d, the driver 220 may drive a plurality of fan motors electrically serially connected, by using a single inverter.

As another example, when the electric device is the cooking appliance 200e, the driver 220 may drive a plurality of fan motors electrically serially connected, by using a single inverter.

As another example, when the electric device is a cleaner 200f, the driver 220 may drive a plurality of fan motors electrically serially connected, by using a single inverter.

Figure 26:
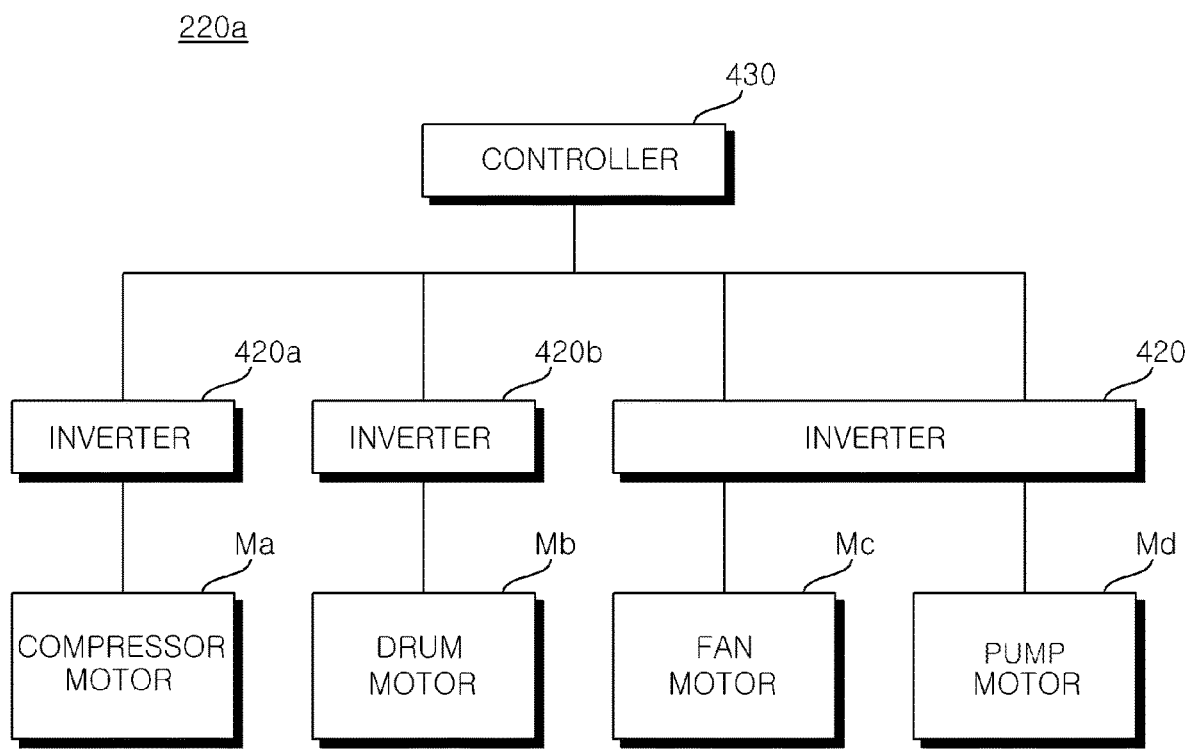
FIG. 26 is an example of a device for driving a plurality of motors according to an embodiment of the present disclosure.

FIG. 26 is an example of a device for driving a plurality of motors according to an embodiment of the present disclosure.

Referring to the drawing, the device for driving a plurality of motors 220 according to the present disclosure may include a single controller 430, a plurality of inverters 420a, 420b, 420d, and a plurality of motors Ma to Md.

In this case, when the device for driving a plurality of motors are a laundry treatment device, particularly, a drive device of a dryer, the plurality of motors Ma to Md may be a compressor motor, a drum motor, a fan motor, and a pump motor, respectively, but are not limited thereto, and various modifications are possible.

Meanwhile, unlike FIG. 1, some inverter 420, among a plurality of inverters 420a, 420b, and 420d, may drive a plurality of motors Mc to Md, by using a single inverter 420.

To this end, a plurality of motors Mc to Md may be connected in parallel with each other, or may be serially connected with each other.

Meanwhile, when a plurality of motors Mc to Md are connected in parallel with each other, the current output from the inverter 420 is distributed to each motor. Therefore, the voltage utilization of the inverter may be lowered to almost half, and voltage imbalance may occur between the plurality of capacitors disposed the DC terminal. According to the imbalance, the driving efficiency of the motor may be reduced due to current harmonics, torque pulsation of the motor, speed pulsation of the motor, noise increase, or the like.

Accordingly, in the present disclosure, a plurality of motors Mc to Md can be serially connected with each other.

Meanwhile, unlike the drawing, the controller 430 may control the inverter 420, and other controller (not shown) may control the plurality of inverters 420a and 420b.

Meanwhile, as shown in the drawing, when a plurality of motors Mc to Md are driven by using a single inverter 420, the number of inverters is reduced in comparison with FIG. 1 or the like, thereby reducing manufacturing cost.

The device for driving a plurality of motors according to the embodiment of the present disclosure and the electric apparatus having the same are not limitedly applied to the configuration and method of the embodiments described above, but may be configured by selectively combining all or part of respective embodiments so that the embodiments can be variously modified.

Meanwhile, the method for driving a plurality of motors or the method for operating an electric device according to the present disclosure may be implemented as a code readable by a processor on a recording medium readable by a processor provided in a motor driving device or an electric apparatus. The processor-readable recording medium includes all types of recording devices in which data that can be read by the processor are stored.

As described above, according to an embodiment of the present disclosure, a device for driving a plurality of motors and an electric apparatus having the same include a first capacitor and a second capacitor serially connected to both ends of a DC terminal; an inverter connected to both ends of the DC terminal; a multi-phase motor connected to the inverter; a single-phase motor serially connected with the multi-phase motor, and through which at least a part of current flowing through the multi-phase motor flows; and a controller to control the inverter, wherein, for starting the single phase motor during operation of the multi-phase motor, the controller controls to perform an alignment period for alignment of a rotor of the single-phase motor and a voltage compensation period for compensating a voltage change of a DC terminal neutral point between the first capacitor and the second capacitor based on the alignment of the rotor of the single-phase motor. Accordingly, it is possible to stably start the single-phase motor while reducing the rotational torque ripple of the multi-phase motor during the multi-phase motor operation. In addition, it is possible to compensate the voltage change in the start of the single-phase motor during the operation of the multi-phase motor. In particular, it is possible to compensate the voltage change when aligning the single-phase motor.

Meanwhile, the controller controls, during the alignment period, to turn on all of a plurality of upper arm switching elements of the inverter and controls to turn off all of a plurality of lower arm switching elements of the inverter, and controls, during the voltage compensation period, to decrease a voltage of the DC terminal neutral point. Accordingly, it is possible to stably start the single-phase motor while reducing the rotational torque ripple of the multi-phase motor during the multi-phase motor operation. In addition, it is possible to compensate the voltage change when aligning the single-phase motor during the operation of the multi-phase motor.

Meanwhile, the controller controls, during the alignment period, to turn off all of a plurality of upper arm switching elements of the inverter and controls to turn on all of a plurality of lower arm switching elements of the inverter, and controls, during the voltage compensation period, to increase a voltage of the DC terminal neutral point. Accordingly, it is possible to stably start the single-phase motor while reducing the rotational torque ripple of the multi-phase motor during the multi-phase motor operation. In addition, it is possible to compensate the voltage change when aligning the single-phase motor during the operation of the multi-phase motor.

Meanwhile, the controller changes the voltage compensation period or changes a voltage change an amount of voltage change according to the voltage compensation, based on an amount of voltage change of the DC terminal neutral point between the first capacitor and the second capacitor during the alignment period. Accordingly, it is possible to adaptively compensate the voltage change of the DC terminal neutral point when aligning the single phase motor during the operation of the multi-phase motor.

Meanwhile, the controller controls to increase the voltage compensation period, or controls to increase the voltage change amount of voltage change according to the voltage compensation, as the amount of voltage change of the DC terminal neutral point during the alignment period increases. Accordingly, it is possible to adaptively compensate the voltage change of the DC terminal neutral point when aligning the single phase motor during the operation of the multi-phase motor.

Meanwhile, when a voltage of the DC terminal neutral point increases during the alignment period, the controller controls to decrease the voltage of the DC terminal neutral point during the voltage compensation period. Accordingly, it is possible to compensate the voltage change in the start of the single-phase motor during the multi-phase motor operation.

Meanwhile, the controller controls to sequentially perform the voltage compensation period and the alignment period, when the voltage of the DC terminal neutral point is within a first range based on a first level during a pre-alignment constant voltage period before the alignment period, and controls to increase a speed of the single-phase motor, when the voltage of the DC terminal neutral point is within the first range based on the first level during a post-alignment constant voltage period after the alignment period. Accordingly, it is possible to compensate the voltage change in the start of the single-phase motor during the multi-phase motor operation.

Meanwhile, the controller controls to sequentially perform the alignment period and the voltage compensation period, when the voltage of the DC terminal neutral point is within a first range based on a first level during a pre-alignment constant voltage period before the alignment period, and controls to increase a speed of the single-phase motor, when the voltage of the DC terminal neutral point is within the first range based on the first level during a post-alignment constant voltage period after the alignment period. Accordingly, it is possible to compensate the voltage change in the start of the single-phase motor during the multi-phase motor operation.

Meanwhile, the controller controls to turn on all of a plurality of upper arm switching elements of the inverter, controls to turn off all of a plurality of lower arm switching elements of the inverter, during the alignment period, and controls to decrease the voltage of the DC terminal neutral point during the voltage compensation period. Accordingly, it is possible to compensate the voltage change in the start of the single-phase motor during the multi-phase motor operation.

Meanwhile, the controller controls to increase the voltage of the DC terminal neutral point during the voltage compensation period, when the voltage of the DC terminal neutral point decreases during the alignment period. Accordingly, it is possible to compensate the voltage change in the start of the single-phase motor during the multi-phase motor operation.

Meanwhile, the controller controls to sequentially perform the voltage compensation period and the alignment period, when the voltage of the DC terminal neutral point is within a first range based on a first level during a pre-alignment constant voltage period before the alignment period, and controls to increase a speed of the single-phase motor, when the voltage of the DC terminal neutral point is within the first range based on the first level during a post-alignment constant voltage period after the alignment period. Accordingly, it is possible to stably start the single-phase motor after compensating the voltage change when aligning the single-phase motor.

Meanwhile, the controller controls to sequentially perform the alignment period and the voltage compensation period, when the voltage of the DC terminal neutral point is within a first range based on a first level during a pre-alignment constant voltage period before the alignment period, and controls to increase a speed of the single-phase motor, when the voltage of the DC terminal neutral point is within the first range based on the first level during a post-alignment constant voltage period after the alignment period. Accordingly, it is possible to stably start the single-phase motor after compensating the voltage change when aligning the single-phase motor.

Meanwhile, the controller controls to turn on all of a plurality of lower arm switching elements of the inverter, controls to turn off all of a plurality of upper arm switching elements of the inverter, during the alignment period, and controls to increase the voltage of the DC terminal neutral point, during the voltage compensation period. Accordingly, it is possible to align the rotor of the single-phase motor during the alignment period, and compensate the voltage change during the alignment period, during the voltage compensation period.

Meanwhile, the controller may control to perform the alignment period for aligning the rotor of the single-phase motor and the voltage compensation period for compensating the voltage change of the DC terminal neutral point, before starting the multi-phase motor. Accordingly, it is possible to compensate the voltage change in the start of the single-phase motor during multi-phase motor operation.

Meanwhile, the controller performs an unbalancing control to change a voltage of the DC terminal neutral point between the first capacitor and the second capacitor, for starting the single phase motor, during operation of the multi-phase motor, and after the unbalancing control, aligns a rotor of the single-phase motor. Accordingly, it is possible to compensate the voltage change in the start of the single-phase motor during multi-phase motor operation.

Meanwhile, the number of frequency of current input to the multi-phase motor when the single-phase motor and the multi-phase motor are driven at a different speed is greater than the number of frequency of current input to the multi-phase motor when the single-phase motor and the multi-phase motor are driven at the same speed. Accordingly, a plurality of motors can be simultaneously driven at different speeds by using one inverter. As a result, it is possible to stably drive a plurality of motors, while preventing the reduction of the voltage utilization rate of the inverter, by using one inverter.

Meanwhile, a neutral point of the multi-phase motor is connected to one end of the single phase motor, and the other end of the single-phase motor is connected to a node between the first capacitor and the second capacitor. Accordingly, a plurality of motors are serially connected with each other, and it is possible to stably drive the plurality of motors while preventing the reduction of voltage imbalance between the first capacitor and the second capacitor and the reduction of the voltage utilization rate of the inverter.

Meanwhile, a device for driving a plurality of motors and an electric apparatus having the same according to an embodiment of present disclosure may further include a first voltage detector for detecting a DC voltage of both ends of a first capacitor, a second voltage detector for detecting a DC voltage of both ends of the second capacitor, a first current detector for detecting a first current input to the multi-phase motor, and a second current detector for detecting a second current input to the single-phase motor. Accordingly, a plurality of motors are serially connected with each other, and it is possible to stably drive the plurality of motors while preventing the reduction of voltage imbalance between the first capacitor and the second capacitor and the reduction of the voltage utilization rate of the inverter.

Meanwhile, the controller controls a frequency of current input to the multi-phase motor to be one, when the single-phase motor and the multi-phase motor are driven at the same speed, and controls a frequency of current input to the multi-phase motor to be two or more, when the single-phase motor and the multi-phase motor are driven at a different speed. Accordingly, it is possible to stably drive a plurality of motors serially connected with each other at different speeds by using one inverter. In addition, by using one inverter, it is possible to stably drive a plurality of motors serially connected with each other at the same speed.

Meanwhile, the controller controls an electric potential between a motor neutral point of the multi-phase motor, and the DC terminal neutral point between the first capacitor and the second capacitor to be the same, when only the multi-phase motor is driven. Accordingly, it is possible to stably drive only the multi-phase motor among a plurality of motors, by using one inverter.

Meanwhile, the controller controls the inverter to perform a zero vector switching, and controls an electric potential between a motor neutral point of the multi-phase motor, and the DC terminal neutral point between the first capacitor and the second capacitor to be different, when only the single-phase motor is driven. Accordingly, it is possible to stably drive a plurality of motors serially connected with each other at different speeds, by using one inverter.

A device for driving a plurality of motors and an electric apparatus having the same according to another embodiment of present disclosure include a first capacitor and a second capacitor serially connected to both ends of a DC terminal; an inverter connected to both ends of the DC terminal; a multi-phase motor connected to the inverter; a single-phase motor serially connected with the multi-phase motor, and through which at least a part of current flowing through the multi-phase motor flows; and a controller to control the inverter, wherein, for starting the single phase motor during operation of the multi-phase motor, the controller controls to perform an unbalancing control to change a voltage of a DC terminal neutral point between the first capacitor and the second capacitor, and after the unbalancing control, aligns a rotor of the single-phase motor. Accordingly, it is possible to stably start the single-phase motor while reducing the rotational torque ripple of the multi-phase motor during the multi-phase motor operation. In addition, it is possible to compensate the voltage change in the start of the single-phase motor during the operation of the multi-phase motor. In particular, it is possible to compensate the voltage change when aligning the single-phase motor.

Meanwhile, when the voltage of the DC terminal neutral point increases during the rotor alignment period of the single-phase motor, the controller controls to decrease the voltage of the DC terminal neutral point, during the unbalancing control period, and controls to increase the voltage of the DC terminal neutral point, during the unbalancing control period, when the voltage of the DC terminal neutral point decreases, during the rotor alignment period of the single-phase motor. Accordingly, it is possible to compensate the voltage change in the start of the single-phase motor during multi-phase motor operation.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device for driving a plurality of motors, the device comprising:
 a first capacitor and a second capacitor serially connected to two ends of a DC terminal;
 an inverter connected to the two ends of the DC terminal;
 a multi-phase motor connected to the inverter;

a single-phase motor serially connected with the multi-phase motor; and a controller configured to control the inverter, wherein, while starting the single phase motor during operation of the multi-phase motor, the controller is configured to perform, during an alignment period, an alignment of a rotor of the single-phase motor and perform, during a voltage compensation period, a voltage compensation for compensating a voltage change of a DC terminal neutral point between the first capacitor and the second capacitor based on the alignment of the rotor of the single-phase motor.

2. The device of claim 1, wherein the controller is configured to, turn on all of a plurality of upper arm switching elements of the inverter and to turn off all of a plurality of lower arm switching elements of the inverter during the alignment period, and decrease a voltage of the DC terminal neutral point during the voltage compensation period.

3. The device of claim 1, wherein the controller is configured to turn off all of a plurality of upper arm switching elements of the inverter and turn on all of a plurality of lower arm switching elements of the inverter during the alignment period, and increase a voltage of the DC terminal neutral point during the voltage compensation period.

4. The device of claim 1, wherein the controller is configured to change the voltage compensation period or change an amount of voltage change according to the voltage compensation, based on an amount of voltage change of the DC terminal neutral point between the first capacitor and the second capacitor during the alignment period.

5. The device of claim 4, wherein the controller is configured to increase the voltage compensation period, or to increase the amount of voltage change according to the voltage compensation, as the amount of voltage change of the DC terminal neutral point during the alignment period increases.

6. The device of claim 1, wherein when a voltage of the DC terminal neutral point increases during the alignment period, the controller is configured to decrease the voltage of the DC terminal neutral point during the voltage compensation period.

7. The device of claim 6, wherein the controller is configured to sequentially perform the voltage compensation during the voltage compensation period and the alignment during the alignment period, when the voltage of the DC terminal neutral point is within a first range based on a first level during a pre-alignment constant voltage period before the alignment period, and increase a speed of the single-phase motor, when the voltage of the DC terminal neutral point is within the first range based on the first level during a post-alignment constant voltage period after the alignment period.

8. The device of claim 6, wherein the controller is configured to sequentially perform the alignment during the alignment period and the voltage compensation during voltage compensation period, when the voltage of the DC terminal neutral point is within a first range based on a first level during a pre-alignment constant voltage period before the alignment period, and increase a speed of the single-phase motor, when the voltage of the DC terminal neutral point is within the first range based on the first level during a post-alignment constant voltage period after the alignment period.

9. The device of claim 1, wherein the controller is configured to turn on all of a plurality of upper arm switching elements of the inverter, turn off all of a plurality of lower arm switching elements of the inverter, during the alignment period, and decrease the voltage of the DC terminal neutral point during the voltage compensation period.

10. The device of claim 1, wherein the controller is configured to increase the voltage of the DC terminal neutral point during the voltage compensation period, when the voltage of the DC terminal neutral point decreases during the alignment period.

11. The device of claim 10, wherein the controller is configured to sequentially perform the voltage compensation during the voltage compensation period and the alignment during the alignment period, when the voltage of the DC terminal neutral point is within a first range based on a first level during a pre-alignment constant voltage period before the alignment period, and increase a speed of the single-phase motor, when the voltage of the DC terminal neutral point is within the first range based on the first level during a post-alignment constant voltage period after the alignment period.

12. The device of claim 10, wherein the controller is configured to sequentially perform the alignment during the alignment period and the voltage compensation during the voltage compensation period, when the voltage of the DC terminal neutral point is within a first range based on a first level during a pre-alignment constant voltage period before the alignment period, and increase a speed of the single-phase motor, when the voltage of the DC terminal neutral point is within the first range based on the first level during a post-alignment constant voltage period after the alignment period.

13. The device of claim 1, wherein the controller is configured to turn on all of a plurality of lower arm switching elements of the inverter, turn off all of a plurality of upper arm switching elements of the inverter, during the alignment period, and increase the voltage of the DC terminal neutral point, during the voltage compensation period.

14. The device of claim 1, wherein the controller is configured to perform an unbalancing control to change a voltage of the DC terminal neutral point between the first capacitor and the second capacitor, for starting the single phase motor, during operation of the multi-phase motor, and align a rotor of the single-phase motor after the unbalancing control.

15. The device of claim 1, wherein the alignment period is greater than or equal to a switching period of the inverter.

16. The device of claim 1, wherein a number of frequencies in a current input to the multi-phase motor when the single-phase motor and the multi-phase motor are driven at a different speed is greater than a number of frequencies in the current input to the multi-phase motor when the single-phase motor and the multi-phase motor are driven at the same speed.

17. The device of claim 1, wherein the controller is configured to control an electric potential between a motor neutral point of the multi-phase motor, and the DC terminal neutral point between the first capacitor and the second capacitor to be the same, when only the multi-phase motor is driven.

18. The device of claim 1, wherein the controller is configured to
control the inverter to perform a zero vector switching, and
control an electric potential between a motor neutral point of the multi-phase motor, and the DC terminal neutral point between the first capacitor and the second capacitor to be different, when only the single-phase motor is driven.

19. A device for driving a plurality of motors, the device comprising:
a first capacitor and a second capacitor serially connected to two ends of a DC terminal;
an inverter connected to the two ends of the DC terminal;
a multi-phase motor connected to the inverter;
a single-phase motor serially connected with the multi-phase motor, and through which at least a part of current flowing through the multi-phase motor is configured to flow; and
a controller configured to control the inverter,
wherein, for starting the single phase motor during operation of the multi-phase motor, the controller is configured to
perform an unbalancing control to change a voltage of a DC terminal neutral point between the first capacitor and the second capacitor, and
align a rotor of the single-phase motor after performing the unbalancing control.

20. An electric apparatus comprising a device configured to drive a plurality of motors, the device comprising:
a first capacitor and a second capacitor serially connected to two ends of a DC terminal;
an inverter connected to the two ends of the DC terminal;
a multi-phase motor connected to the inverter;
a single-phase motor serially connected with the multi-phase motor, and through which at least a part of current flowing through the multi-phase motor is configured to flow; and
a controller configured to control the inverter,
wherein, for starting the single phase motor during operation of the multi-phase motor, the controller is configured to
perform, during an alignment period, an alignment of a rotor of the single-phase motor and
perform, during a voltage compensation period, a voltage compensation for compensating a voltage change of a DC terminal neutral point between the first capacitor and the second capacitor based on the alignment of the rotor of the single-phase motor.

* * * * *